(12) United States Patent
Fujiwara et al.

(10) Patent No.: US 10,428,801 B2
(45) Date of Patent: Oct. 1, 2019

(54) WIND POWER GENERATION DEVICE

(71) Applicant: JTEKT CORPORATION, Osaka-shi, Osaka (JP)

(72) Inventors: Hideki Fujiwara, Kitakatsuragi-gun (JP); Kazushige Ootsuka, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 1050 days.

(21) Appl. No.: 14/773,847

(22) PCT Filed: Mar. 4, 2014

(86) PCT No.: PCT/JP2014/055411
§ 371 (c)(1),
(2) Date: Sep. 9, 2015

(87) PCT Pub. No.: WO2014/141940
PCT Pub. Date: Sep. 18, 2014

(65) Prior Publication Data
US 2016/0010629 A1  Jan. 14, 2016

(30) Foreign Application Priority Data

Mar. 12, 2013 (JP) ................. 2013-048593
Mar. 12, 2013 (JP) ................. 2013-048618
(Continued)

(51) Int. Cl.
*F03D 15/10* (2016.01)
*F03D 9/25* (2016.01)
(Continued)

(52) U.S. Cl.
CPC ............... *F03D 15/10* (2016.05); *F03D 9/25* (2016.05); *F03D 15/00* (2016.05); *F03D 80/70* (2016.05);
(Continued)

(58) Field of Classification Search
CPC . F03D 80/70; F03D 9/002; F03D 9/25; F03D 15/00; F03D 15/10; F03D 11/00;
(Continued)

(56) References Cited

U.S. PATENT DOCUMENTS 2,410,818 A   11/1946  Grant
4,613,763 A    9/1986  Swansen
(Continued)

FOREIGN PATENT DOCUMENTS

CN      1617988 A     5/2005
DE  102012102687 A1  10/2013
(Continued)

OTHER PUBLICATIONS

Jun. 10, 2014 International Search Report issued in International Patent Application No. PCT/JP2014/055411.
(Continued)

*Primary Examiner* — Mark A Laurenzi
*Assistant Examiner* — Mickey H France
(74) *Attorney, Agent, or Firm* — Oliff PLC

(57) ABSTRACT

A one-way clutch used in a wind power generation device integrally rotatably connects an input rotating body and an output rotating body to each other in a state in which a rotational speed of the input rotating body exceeds a rotational speed of the output rotating body, and breaks connection between the input rotating body and the output rotating body in a state in which the rotational speed of the input rotating body is lower than the rotational speed of the output rotating body. The input rotating body and the output
(Continued)

rotating body are allowed to relatively move along an axial direction, and a maximum allowance of movement is set to be larger than variation of a distance along the axial direction between an input shaft and an output shaft caused by state change.

7 Claims, 23 Drawing Sheets

(30) Foreign Application Priority Data

Mar. 12, 2013 (JP) .................................. 2013-048628
Mar. 12, 2013 (JP) .................................. 2013-048642

(51) Int. Cl.
*F03D 80/70* (2016.01)
*F03D 15/00* (2016.01)

(52) U.S. Cl.
CPC ..... *F05B 2260/4031* (2013.01); *Y02E 10/721* (2013.01)

(58) Field of Classification Search
CPC . F03D 11/02; F03D 1/06; F16D 41/06; F16D 41/07; F16D 41/04; F16C 33/00–33/82; F05B 2260/40; F05B 2260/4023; F05B 2260/4031; F05B 2270/335; Y02E 10/721
USPC .......................... 416/132 D, 196 A; 415/123
See application file for complete search history.

(56) References Cited

U.S. PATENT DOCUMENTS

| | | | |
|---|---|---|---|
| 4,887,703 A | 12/1989 | Moore et al. | |
| 5,109,964 A | 5/1992 | Fukui et al. | |
| 5,117,954 A | 6/1992 | Iga | |
| 6,227,803 B1 | 5/2001 | Shim | |
| 6,588,560 B1 | 7/2003 | Fujiwara | |
| 6,856,042 B1 | 2/2005 | Kubota | |
| 7,956,485 B1 | 6/2011 | Simnacher | |
| 2002/0148697 A1 | 10/2002 | Muramatsu et al. | |
| 2002/0183147 A1 | 12/2002 | Fujiwara | |
| 2005/0087417 A1 | 4/2005 | Shimomura et al. | |
| 2005/0280264 A1 | 12/2005 | Nagy | |
| 2008/0053778 A1 | 3/2008 | Shimomura et al. | |
| 2008/0223684 A1 | 9/2008 | Duffey et al. | |
| 2008/0271967 A1 | 11/2008 | Nakatani et al. | |
| 2009/0183594 A1 | 7/2009 | Usami | |
| 2009/0278361 A1 | 11/2009 | Okubo et al. | |
| 2011/0150383 A1* | 6/2011 | Yoshida | F16C 23/08 384/590 |
| 2011/0187119 A1 | 8/2011 | McMaster | |
| 2012/0045335 A1 | 2/2012 | Heidenreich et al. | |
| 2012/0201679 A1 | 8/2012 | Heidenreich et al. | |
| 2013/0062886 A1 | 3/2013 | Fujiwara et al. | |
| 2013/0278100 A1 | 10/2013 | Fujiwara | |
| 2013/0283949 A1 | 10/2013 | Fujiwara | |
| 2014/0090945 A1 | 4/2014 | Fujiwara et al. | |
| 2015/0061436 A1 | 3/2015 | Fujiwara et al. | |
| 2016/0010629 A1 | 1/2016 | Fujiwara et al. | |

FOREIGN PATENT DOCUMENTS

| | | |
|---|---|---|
| EP | 1101978 A1 | 5/2001 |
| EP | 2657521 A2 | 10/2013 |
| EP | 2657560 A2 | 10/2013 |
| EP | 2716909 A2 | 4/2014 |
| EP | 3002456 A1 | 4/2016 |
| JP | S61-228272 A | 10/1986 |
| JP | H01-68901 U | 5/1989 |
| JP | H02-245525 A | 10/1990 |
| JP | H04-344198 A | 11/1992 |
| JP | 2001-349335 A | 12/2001 |
| JP | 2002-310200 A | 10/2002 |
| JP | 2003336571 A | 11/2003 |
| JP | 2004-339953 A | 12/2004 |
| JP | 2006-183755 A | 7/2006 |
| JP | 2006-250034 A | 9/2006 |
| JP | 2006-275036 A | 10/2006 |
| JP | 2007-232186 A | 9/2007 |
| JP | 2009-168181 A | 7/2009 |
| JP | 2010-112213 A | 5/2010 |
| JP | 2010-180932 A | 8/2010 |
| JP | 2013-060825 A | 4/2013 |
| JP | 2013-076395 A | 4/2013 |
| JP | 2014-173547 A | 9/2014 |
| WO | 2012/173139 A1 | 12/2012 |

OTHER PUBLICATIONS

Jun. 10, 2014 International Search Report issued in International Patent Application No. PCT/JP2014/055417.
Dec. 22, 2014 International Search Report issued in International Patent Application No. PCT/JP2014/078166.
U.S. Appl. No. 15/031,837, filed Apr. 25, 2016 in the name of Hideki Fujiwara.
U.S. Appl. No. 14/774,188, filed Sep. 10, 2015 in the name of Hideki Fujiwara.
Oct. 16, 2018 Office Action issued in U.S. Appl. No. 15/031,837.
Oct. 17, 2016 Partial Supplementary Search Report issued in European Patent Application No. 14763635.1.
Nov. 22, 2016 Office Action issued in Japanese Patent Application No. 2013-048628.
Nov. 22, 2016 Office Action issued in Japanese Patent Application No. 2013-048602.
Oct. 6, 2016 Search Report issued in European Patent Application No. 14762655.0.
Jun. 21, 2017 Search Report issued in European Patent Application No. 14858362.8.
May 30, 2018 Office Action issued in U.S. Appl. No. 15/031,837.
Jul. 31, 2017 Office Action issued in Chinese Patent Application No. 201480014495.1.
Apr. 16, 2019 Office Action issued in U.S. Appl. No. 15/031,837.
Mar. 21, 2019 Office Action issued in U.S. Appl. No. 14/774,188.

* cited by examiner

FIG. 3

WIND POWER GENERATION DEVICE

TECHNICAL FIELD

One aspect of the present invention relates to a wind power generation device in which a power generator is driven by increasing, by a speed-up gear, the speed of rotation of a main shaft caused by, for example, a wind force.

BACKGROUND ART

As an example of a wind power generation device of the background art, a wind force is received by a blade to rotate a main shaft connected to the blade, and a speed-up gear is used for increasing the speed of the rotation of the main shaft to drive a power generator. As illustrated in FIG. 23, such a speed-up gear 202 includes a planetary gear mechanism 203 that receives the rotation of a main shaft 200 to increase its speed; a high-speed stage gear mechanism 204 that receives the rotation increased in speed by the planetary gear mechanism 203 to further increase its speed; and an output shaft 205 outputting the running torque of the high-speed stage gear mechanism 204.

In the planetary gear mechanism 203, when an input shaft 203a integrally rotatably connected to the main shaft 200 is rotated, a planetary carrier 203b is rotated to rotate a sun gear 203d at an increasing speed via a planetary gear 203c, so that the rotation of the sun gear can be transmitted to a low-speed shaft 204a of the high-speed stage gear mechanism 204.

In the high-speed stage gear mechanism 204, when the low-speed shaft 204a is rotated, an intermediate shaft 204d is rotated at an increasing speed via a low-speed gear 204b and a first intermediate gear 204c, so that the output shaft 205 can be rotated at an increasing speed further via a second intermediate gear 204e and a high-speed gear 204f.

As bearings for rotatably supporting the low-speed shaft 204a, the intermediate shaft 204d and the output shaft 205 of the speed-up gear 202, roller bearings 206 to 211 are frequently used (see, for example, Patent Document 1).

RELATED ART DOCUMENTS

Patent Documents

Patent Document 1: JP-A-2007-232186
Patent Document 2: JP-A-H04-344198

SUMMARY OF THE INVENTION

Problem to be Solved by the Invention

In the above-described wind power generation device, in the roller bearing supporting the output shaft rotating at a high speed, smearing (a phenomenon in which a seizure is caused in a surface layer) occurs on a rolling contact surface of a roller or a raceway surface of a turning wheel, which causes a problem in which the lifetime of the roller bearing is reduced.

In consideration of this problem, the present applicant has found and proposed, as a result of earnest examination on the occurrence mechanism of the smearing, that it is effective, for suppressing the occurrence of the smearing, to provide a one-way clutch between an output shaft of a speed-up gear and a drive shaft of a power generator. This proposal has been filed to Japanese Patent Office as Japanese Patent Application No. 2011-198354 and published as JP-A-2013-060825. It is noted that Japanese Patent Application No. 2011-198354 was not published (namely, was unknown) when applications to which the present application claims priority (specifically, Japanese Patent Application No. 2013-048593, Japanese Patent Application No. 2013-048618, Japanese Patent Application No. 2013-048628 and Japanese Patent Application No. 2013-048642) were filed. Incidentally, a technique of providing a one-way clutch between an output shaft of a speed-up gear and a drive shaft of a power generator for a different purpose is disclosed in Patent Document 2 mentioned above.

One aspect of the present invention is accomplished in consideration of such actual circumstances, and an object is to provide a wind power generation device in which the occurrence of smearing in a rolling bearing which supports an output shaft of a speed-up gear can be effectively suppressed.

Means for Solving the Problem

A first aspect of the present invention provides a wind power generation device including: a wind receiving member which receives a wind force to rotate a main shaft; a speed-up gear which includes a rotation transmission mechanism which receives rotation of the main shaft to increase the rotation in speed, and a rolling bearing which rotatably supports an output shaft which outputs a running torque of the rotation transmission mechanism; a power generator which includes an input shaft which rotates by receiving rotation of the output shaft and, which generates power in accordance with rotation of a rotor which rotates integrally with the input shaft; an input rotating body which is integrally rotatably provided on the output shaft; an output rotating body which is integrally rotatably provided on the input shaft and which is coaxially disposed radially inside or radially outside the input rotating body; and a one-way clutch which is disposed between the input rotating body and the output rotating body, which integrally rotatably connects the input rotating body and the output rotating body to each other in a state in which a rotational speed of the input rotating body exceeds a rotational speed of the output rotating body, and which breaks connection between the input rotating body and the output rotating body in a state in which the rotational speed of the input rotating body is lower than the rotational speed of the output rotating body, wherein the input rotating body and the output rotating body are allowed to relatively move along an axial direction, and a maximum allowance of movement thereof is set to be larger than variation of a distance along the axial direction between the input shaft and the output shaft caused by state change.

A second aspect of the present invention provides a wind power generation device including: a speed-up gear which increases a speed of rotation of a main shaft caused by a wind force to output the rotation increased in speed from an output shaft; a power generator which includes an input shaft which rotates by receiving the rotation of the output shaft, and which generates power in accordance with rotation of a rotor which rotates integrally with the input shaft; and a one-way clutch which is provided between the output shaft and the input shaft, which integrally rotatably connects the output shaft and the input shaft to each other in a state in which a rotational speed of the output shaft exceeds a rotational speed of the input shaft, and which breaks connection between the output shaft and the input shaft in a state in which the rotational speed of the output shaft is lower than the rotational speed of the input shaft, wherein the one-way clutch includes: a ring which is fit on a rotating body which rotates with the output shaft; another circumferential surface which is disposed to oppose outside or inside of a circumferential surface of the ring in a radial direction and which is provided on a side of the input shaft; and a plurality of engaging elements disposed in a space between the circumferential surfaces, wherein the output shaft and the input shaft are integrally rotatably connected to each other by causing the engaging elements to engage the circumferential surfaces, and the connection is broken by releasing the engagement therebetween, wherein a maximum transmission torque T1max to be transmitted from the rotating body to the ring when a load torque for operating the power generator is maximum and a transmission torque T2 which can be transmitted from the rotating body to the ring with a tightening force obtained by fitting the ring on the rotating body satisfy a relationship of T1max>T2, and wherein a necessary minimum transmission torque T1 to be transmitted from the rotating body to the ring for operating the power generator, a transmission torque T3 which can be transmitted from the rotating body to the ring with a tightening force obtained by engagement of the engaging elements with the circumferential surfaces, and the transmission torque T2 satisfy a relationship of T1<T2+T3.

A third aspect of the present invention provides a wind power generation device including: a speed-up gear which increases a speed of rotation of a main shaft caused by a wind force to output the rotation increased in speed from an output shaft; a power generator which includes an input shaft which rotates by receiving the rotation of the output shaft, and which generates power in accordance with rotation of a rotor which rotates integrally with the input shaft; and a one-way clutch which is provided between the output shaft and the input shaft, which integrally rotatably connects the output shaft and the input shaft to each other in a state in which a rotational speed of the output shaft exceeds a rotational speed of the input shaft, and which breaks connection between the output shaft and the input shaft in a state in which the rotational speed of the output shaft is lower than the rotational speed of the input shaft, wherein the one-way clutch includes: a ring which is fit on a rotating body which rotates with the input shaft; another circumferential surface disposed to oppose outside or inside a circumferential surface of the ring in a radial direction and which is provided on a side of the output shaft; and a plurality of engaging elements disposed in a space between the circumferential surfaces, wherein the output shaft and the input shaft are integrally rotatably connected to each other by causing the engaging elements to engage the circumferential surfaces, and the connection is broken by releasing the engagement therebetween, wherein a maximum transmission torque T1max to be transmitted from the rotating body to the ring when a load torque for operating the power generator is maximum and a transmission torque T2 which can be transmitted from the rotating body to the ring with a tightening force obtained by fitting the ring on the rotating body satisfy a relationship of T1max>T2, and wherein a necessary minimum transmission torque T1 to be transmitted from the rotating body to the ring for operating the power generator, a transmission torque T3 which can be transmitted from the rotating body to the ring with a tightening force obtained by engagement of the engaging elements with the circumferential surfaces, and the transmission torque T2 satisfy a relationship of T1<T2+T3.

A fourth aspect of the present invention provides a wind power generation device including: a main shaft which rotates by a wind force; a speed-up gear which increases a speed of rotation of the main shaft and which outputs the rotation increased in speed from an output shaft; a power generator which includes an input shaft rotated by receiving the rotation of the output shaft and which generates power in accordance with rotation of a rotor which rotates integrally with the input shaft; a casing which houses the speed-up gear and the power generator; an input rotating body which is integrally rotatably provided on the output shaft; an output rotating body which is integrally rotatably provided on the input shaft and which is disposed coaxially radially inside or radially outside the input rotating body; a one-way clutch which is disposed between the input rotating body and the output rotating body, which integrally rotatably connects the input rotating body and the output rotating body to each other in a state in which a rotational speed of the input rotating body exceeds a rotational speed of the output rotating body, and which breaks connection between the input rotating body and the output rotating body in a state in which the rotational speed of the input rotating body is lower than the rotational speed of the output rotating body; and shielding means which shields a region where the one-way clutch is disposed from a space within the casing.

A fifth aspect of the present invention provides a power generation device including: a main shaft which rotates by an external force; a speed-up gear which increases a speed of rotation received from the main shaft and which outputs the rotation increased in speed from an output shaft; a power generator which includes a drive shaft which rotates by receiving the rotation of the output shaft and a rotor which rotates integrally with the drive shaft, and which generates power in accordance with the rotation of the rotor; a one-way clutch which is provided between the output shaft and the drive shaft, which integrally rotatably connects the output shaft and the drive shaft to each other in a first state in which a rotational speed of the output shaft exceeds a rotational speed of the drive shaft, and which breaks connection between the output shaft and the drive shaft in a second state in which the rotational speed of the output shaft is lower than the rotational speed of the drive shaft; connecting means which is provided between the output shaft and the drive shaft and which is capable of integrally rotatably connecting the output shaft and the drive shaft to each other at least in the second state; and a control unit which controls an operation of the connecting means to connect the output shaft and the drive shaft to each other in accordance with a prescribed condition.

Advantages of the Invention

According to the aspects of the present invention, the occurrence of smearing in the rolling bearing which supports the output shaft of the speed-up gear can be effectively suppressed.

BRIEF DESCRIPTION OF THE DRAWINGS

FIG. 3 is a side view (a partial cross-sectional view) of a shaft coupling device.

MODE FOR CARRYING OUT THE INVENTION

Preferred embodiments of the present invention will now be described with reference to the accompanying drawings.

Figure 1:
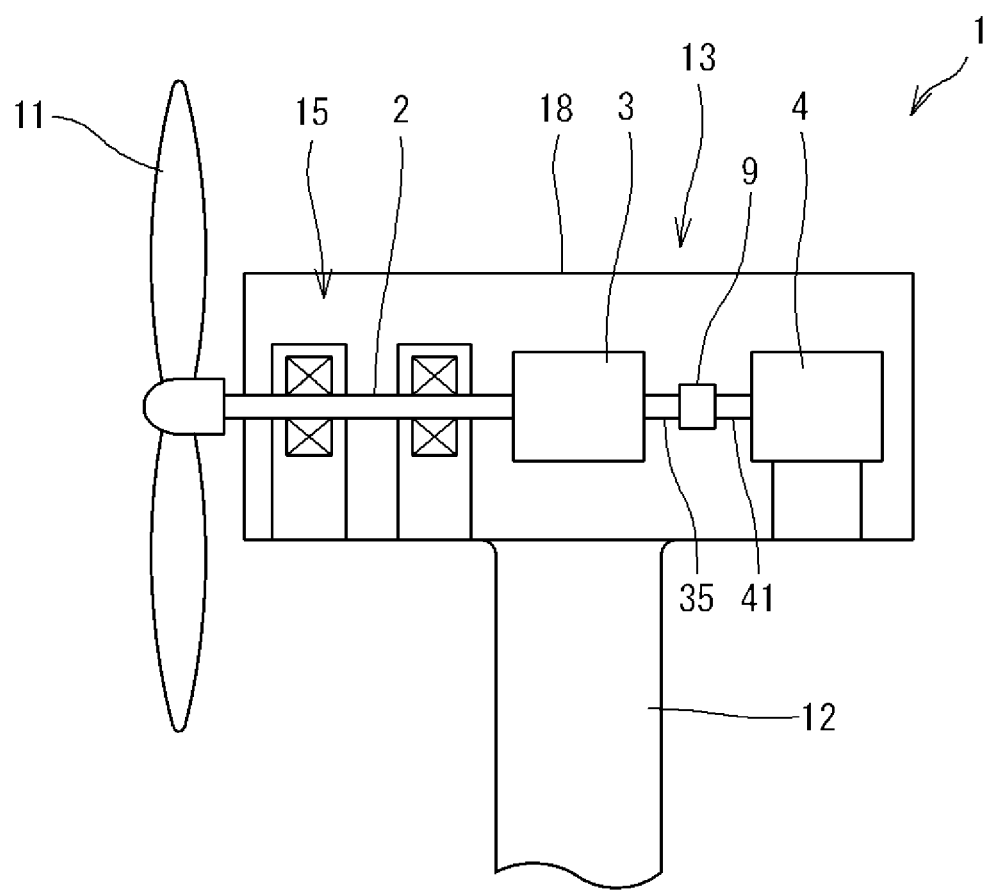
FIG. 1 is a schematic side view of a wind power generation device according to a first embodiment of the present invention.

FIG. 1 is a schematic side view of a wind power generation device according to a first embodiment of the present invention.

The wind power generation device 1 includes a blade (wind receiving member) 11, a column 12 and a nacelle 13. The blade 11 includes a plurality of wings provided at the tip of a main shaft 2, and rotates the main shaft 2 by receiving wind. The nacelle 13 includes the main shaft 2, a support mechanism 15 for supporting the main shaft 2, a speed-up gear 3 for increasing the speed of the rotation of the main shaft 2, a power generator 4 for generating power by a rotational force increased in speed by the speed-up gear 3, a casing 18 for housing these components, and the like. The column 12 supports the nacelle 13 horizontally rotatably around a vertical axis.

Figure 2:
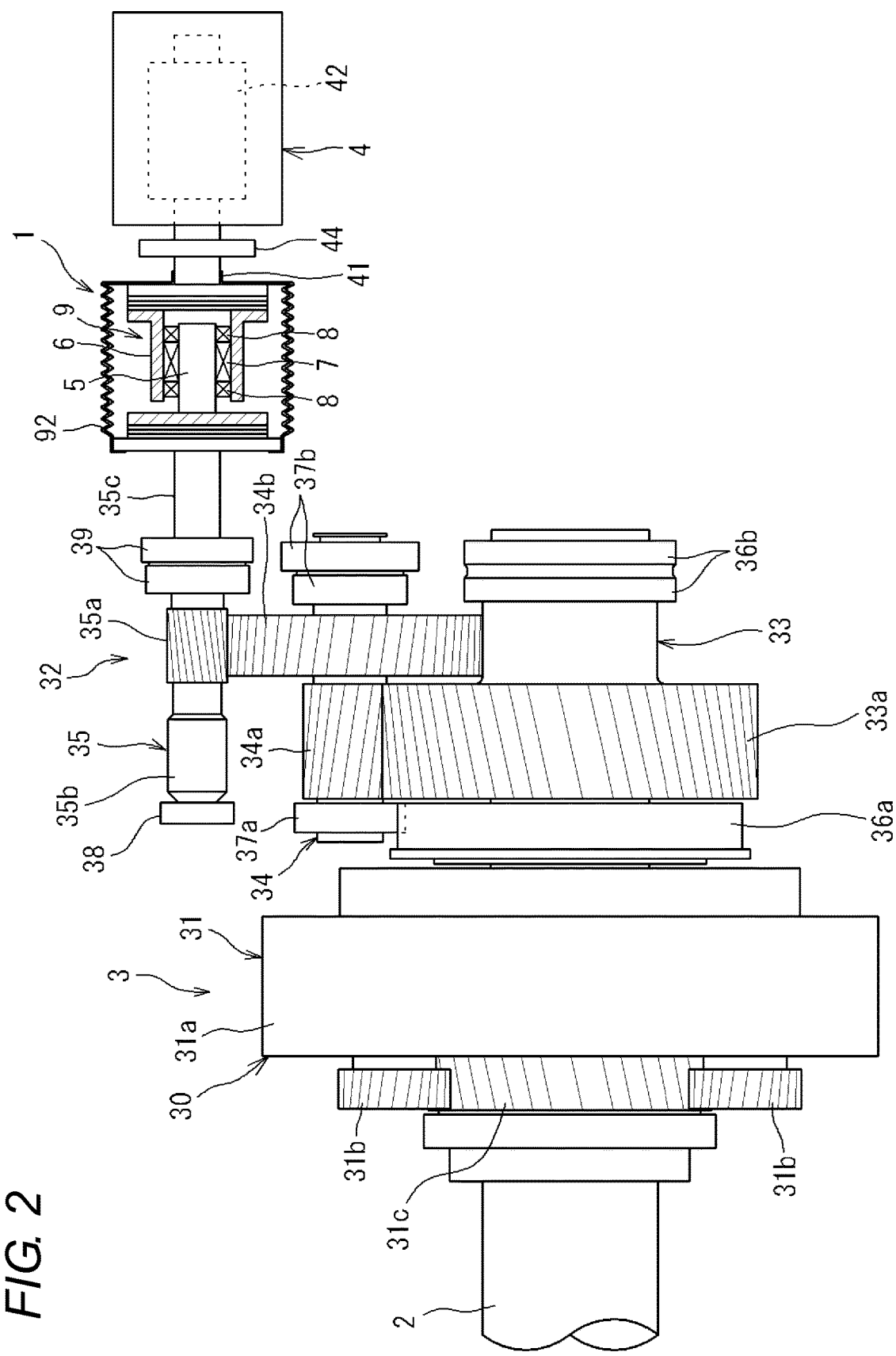
FIG. 2 is a schematic side view of a speed-up gear and a power generator.

FIG. 2 is a schematic side view of the speed-up gear and the power generator.

The power generator 4 is formed by, for example, an induction generator, and includes a drive shaft (input shaft) 41 that is rotated by receiving the rotation, having been increased in speed by the speed-up gear 3, a rotor 42 built in the power generator 4, and a stator and the like not shown. The rotor 42 is integrally rotatably connected to the drive shaft 41, and the power generator 4 is configured to generate power as a result of driving the rotor 42 by the rotation of the drive shaft 41. Besides, the drive shaft 41 is provided with a brake 44 for braking the drive shaft 41.

The speed-up gear 3 includes a gear mechanism (rotation transmission mechanism) 30 that receives the rotation of the main shaft 2 to increase the speed of the rotation. The gear mechanism 30 includes a planetary gear mechanism 31, and a high-speed stage gear mechanism 32 that receives the rotation having been increased in speed by the planetary gear mechanism 31 to further increase its speed.

The planetary gear mechanism 31 includes an internal gear (ring gear) 31a, a plurality of planetary gears 31b held on a planetary carrier (not shown) integrally rotatably connected to the main shaft 2, and a sun gear 31c engaged with the planetary gears 31b. Thus, when the planetary carrier is rotated together with the main shaft 2, the sun gear 31c is rotated via the planetary gears 31b, and the rotation is transmitted to a low-speed shaft 33 of the high-speed stage gear mechanism 32.

The high-speed stage gear mechanism 32 includes the low-speed shaft 33 having a low-speed gear 33a, an intermediate shaft 34 having a first intermediate gear 34a and a second intermediate gear 34b, and an output shaft 35 having a high-speed gear 35a.

The low-speed shaft 33 is formed by a large rotating shaft having a diameter of, for example, about 1 m, and is disposed coaxially with the main shaft 2. Both end portions along the axial direction of the low-speed shaft 33 are rotatably supported by roller bearings 36a and 36b.

The intermediate shaft 34 is disposed above the low-speed shaft 33, and both end portions thereof along the axial direction are rotatably supported by roller bearings 37a and 37b. The first intermediate gear 34a of the intermediate shaft 34 is engaged with the low-speed gear 33a, and the second intermediate gear 34b is engaged with the high-speed gear 35a.

The output shaft 35 is disposed above the intermediate shaft 34, so as to output a running torque. A first end portion 35b and a second end portion (an output end portion) 35c along the axial direction of the output shaft 35 are rotatably supported respectively by roller bearings 38 and 39.

Owing to the above-described structure, the speed of the rotation of the main shaft 2 is increased in three stages by a gear ratio of the planetary gear mechanism 31, a gear ratio between the low-speed gear 33a and the first intermediate gear 34a, and a gear ratio between the second intermediate gear 34b and the high-speed gear 35a, so that the running torque can be output from the output end portion 35c of the output shaft 35. In other words, the rotation of the main shaft 2 caused by wind is increased in speed in three stages by the speed-up gear 3 to drive the power generator 4.

Figure 11:
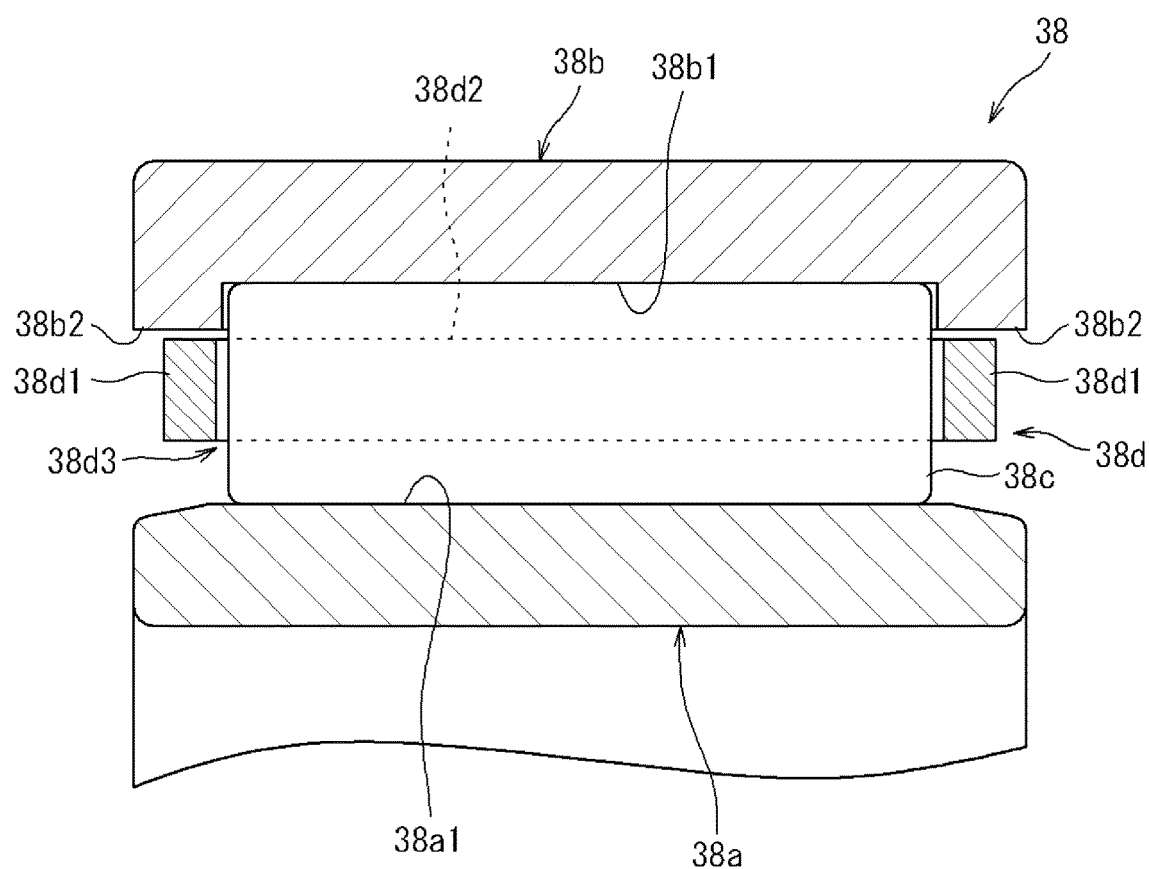
FIG. 11 is a cross-sectional view of a roller bearing of the speed-up gear.

FIG. 11 is a cross-sectional view of the roller bearing of the speed-up gear supporting, for example, the first end portion 35b of the output shaft 35. In FIG. 11, the roller bearing 38 is formed by a cylindrical roller bearing, and includes an inner ring 38a externally fit and fixed on the output shaft 35, an outer ring 38b fixed on a housing (not shown), a plurality of cylindrical rollers 38c disposed to be movable by rolling between the inner ring 38a and the outer ring 38b, and a ring-shaped cage 38d for holding the cylindrical rollers 38c at prescribed intervals along the circumferential direction. The inner ring 38a, the outer ring 38b and the cylindrical rollers 38c are made of, for example, bearing steel, and the cage 38d is made of, for example, a copper alloy.

The inner ring 38a has an inner ring raceway surface 38a1 formed in a center portion along the axial direction on the outer circumference thereof. The outer ring 38b is disposed coaxially with the inner ring 38a, and includes an outer ring raceway surface 38b1 formed in a center portion along the axial direction on the inner circumference thereof, and a pair of outer ring flange portions 38b2 formed on both sides along the axial direction of the outer ring raceway surface 38b1. The outer ring raceway surface 38b1 is disposed to oppose the inner ring raceway surface 38a1. The outer ring flange portions 38b2 are formed to protrude, radially inward, from both end portions along the axial direction of the inner circumference of the outer ring 38b, and the end surfaces of the cylindrical rollers 38c are in sliding contact with these outer ring flange portions 38b2.

The cylindrical rollers 38c are disposed to be movable by rolling between the inner ring raceway surface 38a1 of the inner ring 38a and the outer ring raceway surface 38b1 of the outer ring 38b.

The cage 38d includes a pair of ring portions 38d1 disposed to be spaced from each other along the axial direction, and a plurality of pillar portions 38d2 disposed at equal intervals along the circumferential direction of the ring portions 38d1 to connect the ring portions 38d1 to each other. Pockets 38d3 are formed between the pair of ring portions 38d1 and the pillar portions 38d2 adjacent to each other, and each cylindrical roller 38c is disposed in each pocket 38d3. Incidentally, in the wind power generation device 1 having a large size, a large load is applied to the roller bearing supporting the output shaft 35 of the speed-up gear 3, and therefore, the used roller bearing 38 preferably has high rigidity and can suitably absorb thermal expansion/contraction along the axial direction of the output shaft 35. It is noted that a ball bearing or a conical bearing can be used as the rolling bearing.

In FIG. 2, the wind power generation device 1 includes a shaft coupling device (coupling device) 9 for integrally rotatably connecting the output shaft 35 of the speed-up gear 3 and the drive shaft 41 of the power generator 4 to each other. This shaft coupling device 9 includes an input rotating body (inside rotating body) 5, an output rotating body (outside rotating body) 6, a one-way clutch 7, and rolling bearings 8, and is formed also as a clutch unit. Besides, the shaft coupling device 9 is provided on a side of the brake 44 for the drive shaft 41 closer to the speed-up gear 3.

Figure 3:
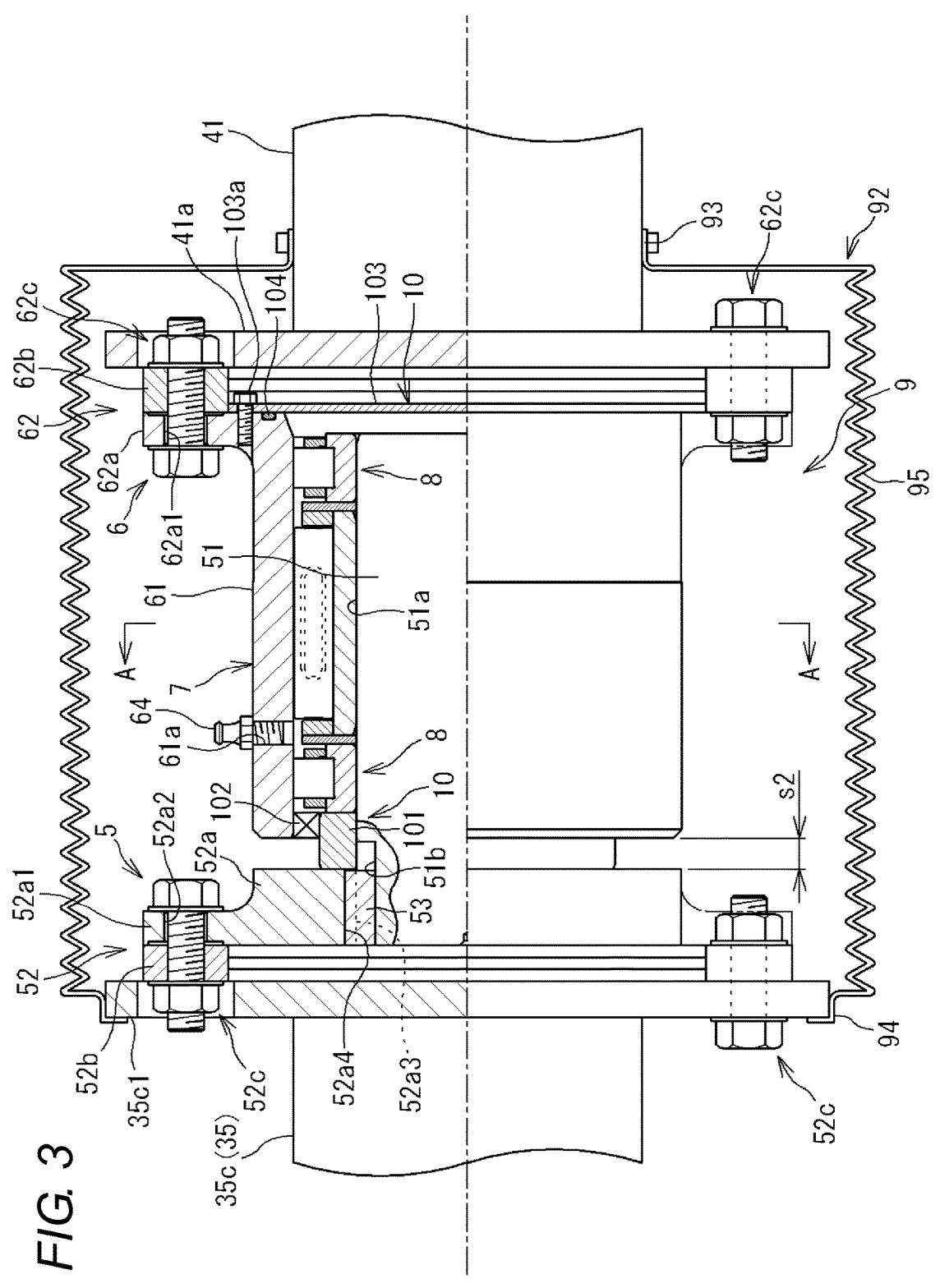
Figure 4:
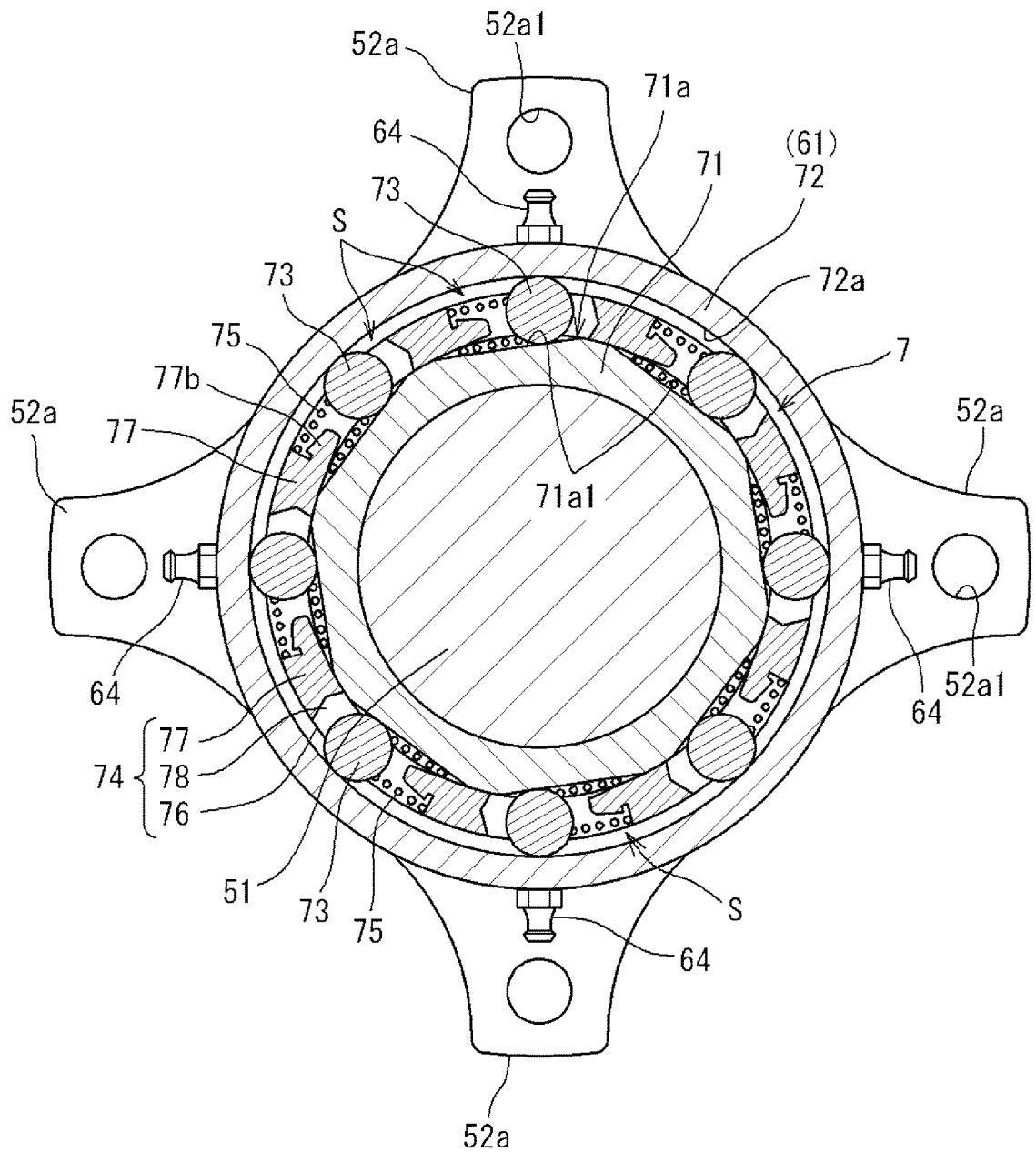
FIG. 4 is a cross-sectional view taken on arrow A-A of FIG. 3.

FIG. 3 is a side view (partial cross-sectional view) of the shaft coupling device. FIG. 4 is a cross-sectional view taken on arrow A-A of FIG. 3.

The input rotating body 5 includes a shaft portion 51 and an input-side connecting portion 52 provided in a first end portion (a left end portion in FIG. 3) along the axial direction of the shaft portion 51. The input-side connecting portion 52 is integrally rotatably and removably connected to the output shaft 35.

The output rotating body 6 is disposed coaxially with the input rotating body 5 and includes a cylindrical portion 61 formed in a cylindrical shape, and an output-side connecting portion 62 provided in a second end portion (a right end portion in FIG. 3) along the axial direction of the cylindrical portion 61. The output-side connecting portion 62 is integrally rotatably and removably connected to the drive shaft 41.

The one-way clutch 7 is disposed in a portion between the input rotating body 5 and the output rotating body 6 where the rotors radially oppose and overlap each other. Besides, the rolling bearings 8 are disposed between the input rotating body 5 and the output rotating body 6 and on both sides along the axial direction of the one-way clutch 7. The one-way clutch 7 is provided for transmitting the rotation of the output shaft 35 via the input rotating body 5 and the output rotating body 6 to the drive shaft 41 in a connectable/disconnectable manner, and the rolling bearings 8 are provided for mutually supporting the output shaft 35 and the drive shaft 41. Incidentally, although the rolling bearings 8 are disposed on both sides along the axial direction of the one-way clutch 7 in the wind power generation device 1 of the present embodiment, a rolling bearing may be disposed on merely one side along the axial direction of the one-way clutch 7.

In FIG. 3, the input-side connecting portion 52 includes a flange portion 52a fixed on one end of the shaft portion 51, and a bending member 52b disposed between the flange portion 52a and the output shaft 35. The shaft portion 51 is formed in a cylindrical shape, and has a keyway 51b formed on an outer circumferential surface in the first end portion (the left end portion in FIG. 3) thereof along the axial direction. The flange portion 52a has, at intervals along the circumferential direction, a plurality of (four, for example) projections 52a1 (see FIG. 4) each in a circular shape and projecting outward in the radial direction. Each projection 52a1 has a bolt insertion hole 52a2 formed therethrough. A fitting hole 52a3 is formed in the center portion of the flange portion 52a, and the first end portion of the shaft portion 51 is fit in this fitting hole 52a3 by press-fitting or the like. Besides, a keyway 52a4 is formed in the fitting hole 52a3. The shaft portion 51 and the flange portion 52a are integrally rotatably connected to each other by providing keys 53 in the two keyways 52a4 and 51b.

The output-side connecting portion 62 includes a flange portion 62a provided in a second end portion along the axial direction of the cylindrical portion 61, and a bending member 62b disposed between the flange portion 62a and the drive shaft 41. The flange portion 62a is integrally molded in a first end portion of the cylindrical portion 61 by forging or the like, protrudes outward in the radial direction from the outer circumferential surface of the cylindrical portion 61, and has a bolt insertion hole 62a1 formed therethrough. Besides, the flange portion 62a is provided in plural number (of, for example, four) at intervals along the circumferential direction in the same manner as the projections 52a1 of the flange portion 52a of the input-side connecting portion 52.

The bending member 52b of the input-side connecting portion 52 is disposed between the flange portion 52a and a flange portion 35c1 provided in the output end portion 35c of the output shaft 35. Besides, the bending member 62b of the output-side connecting portion 62 is disposed between the flange portion 62a and a flange portion 41a provided in the input end portion of the drive shaft 41. Each of these bending members 52b and 62b is formed by a plurality of ring-shaped or disc-shaped members, so as to be connected to the flange portions 52*a* and 35*c*1 or 62*a* and 41*a* with a fastener 52*c* or 62*c* of a bolt and a nut.

Each of these bending members 52*b* and 62*b* has a function to absorb a misalignment, such as eccentricity or angle deviation (deviation of the axial center), between the output shaft 35 and the drive shaft 41 by its own bend (elastic deformation). The structures of these bending members 52*b* and 62*b* and the structures of the flange portions 52*a*, 35*c*1, 62*a* and 41*a* used in combination are not especially limited, and any of known structures (such as structures described in, for example, JP-A-2006-250034 and JP-A-2001-349335) may be employed as long as it has the above-described function. Besides, the input-side connecting portion 52 may include, as its component, the flange portion 35*c*1 on the side of the output shaft 35, and the output-side connecting portion 62 may include, as its component, the flange portion 41*a* on the side of the drive shaft 41.

Between the shaft portion 51 of the input rotating body 5 and the cylindrical portion 61 of the output rotating body 6, a grease (lubricant) is filled for lubricating the one-way clutch 7 and the rolling bearings 8 disposed therein. The shaft coupling device 9 includes sealing means 10 for forming a closed space for filling the grease between the shaft portion 51 and the cylindrical portion 61 where the one-way clutch 7 and the rolling bearings 8 are housed. The sealing means 10 includes a ring-shaped seal receiving member 101 fit around the outer circumferential surface of the shaft portion 51 between the left rolling bearing 8 and the flange portion 52*a* of the input rotating body 5, a ring-shaped first sealing member 102 provided in a gap between the outer circumferential surface of the seal receiving member 101 and the inner circumferential surface of the cylindrical portion 61 of the output rotating body 6, a covering member 103 for covering an opening on a right side of the cylindrical portion 61, and a second sealing member 104 including an O-ring provided between the covering member 103 and the end surface of the cylindrical portion 61. The covering member 103 is made of a metal plate formed in a circular shape, and is removably attached to a base of the flange portion 62*a* with a fitting screw 103*a*. Such sealing means 10 is provided so that the grease can be sealed between the shaft portion 51 of the input rotating body 5 and the cylindrical portion 61 of the output rotating body 6 and that the one-way clutch 7 and the rolling bearings 8 can be suitably lubricated.

Incidentally, the region of the one-way clutch 7 and the regions of the rolling bearings 8 in the closed space between the shaft portion 51 and the cylindrical portion 61 are communicated with each other in the axial direction, so that the grease can be spread between the one-way clutch 7 and the rolling bearings 8. Besides, since the grease is liable to be collected on the radially outside due to the centrifugal force, these regions of the closed space preferably communicate on the side of an outer ring inner circumferential surface 72*a* of the one-way clutch 7 and an outer ring raceway surface 82*a* of the rolling bearing 8 as in the present embodiment.

Besides, on the outer circumference of the cylindrical portion 61, an oil supply hole 61*a* equipped with a grease nipple (an oil supply port equipped with a check valve) 64 is formed to penetrate along the radial direction into the closed space. This oil supply hole 61*a* is provided correspondingly to a position between the one-way clutch 7 and one of the rolling bearings 8. Specifically, the oil supply hole 61*a* is formed correspondingly to a position between the outer ring inner circumferential surface 72*a* of the one-way clutch 7 and the outer ring raceway surface 82*a* of the rolling bearing 8. Besides, the oil supply hole 61*a* is provided in a plurality of positions along the circumferential direction, for example, in four positions at equal intervals as illustrated in FIG. 4, so that the grease can be supplied into the closed space through any of the oil supply holes 61*a*.

Furthermore, in supplying the grease through any of the oil supply holes 61*a*, waste grease can be discharged through another oil supply hole 61*a* by removing the grease nipple 64 from this oil supply hole 61*a*. Accordingly, the oil supply holes 61*a* have not only the function as a grease supply part but also the function as a discharge part. It is noted that the grease can be discharged not only through the oil supply hole 61*a* but also by removing the covering member 103 from the output rotating body 6. In this case, since the opening at the end of the cylindrical portion 61 can be wholly opened, the grease can be efficiently discharged.

When the output rotating body 6 rotates, the positions of the oil supply holes 61*a* are changed, but since the oil supply holes 61*a* are provided in the plural positions along the circumferential direction, the oil supply hole 61*a* disposed in a position where the grease can be most easily supplied can be selectively used for the grease supply. Accordingly, an oil supply operation can be easily performed.

Besides, since the oil supply hole 61*a* is provided correspondingly to the position between the one-way clutch 7 and one of the rolling bearings 8, the grease can be definitely supplied to both of them. The oil supply hole 61*a* can be provided correspondingly to a position between the one-way clutch 7 and the other of the rolling bearings 8, or positions between the one-way clutch 7 and both of the rolling bearings 8. Incidentally, the grease used for lubricating the one-way clutch 7 is preferably a grease containing an ester as a base oil and a urea-based thickener so that it is difficult to be affected by temperature change, which does not limit the present invention.

Between the end surface of the first end portion (the left end portion in FIG. 3) along the axial direction of the cylindrical portion 61 and the end surface of the flange portion 52*a* of the input rotating body 5 opposing the former end surface, a space s2 is formed. Besides, between the tip of the shaft portion 51 and the covering member 103, a space s3 is formed. Owing to these spaces s2 and s3, the output rotating body 6 is movable along the axial direction against the input rotator 5 with the output rotating body 6 disconnected from the drive shaft 41.

Figure 5:
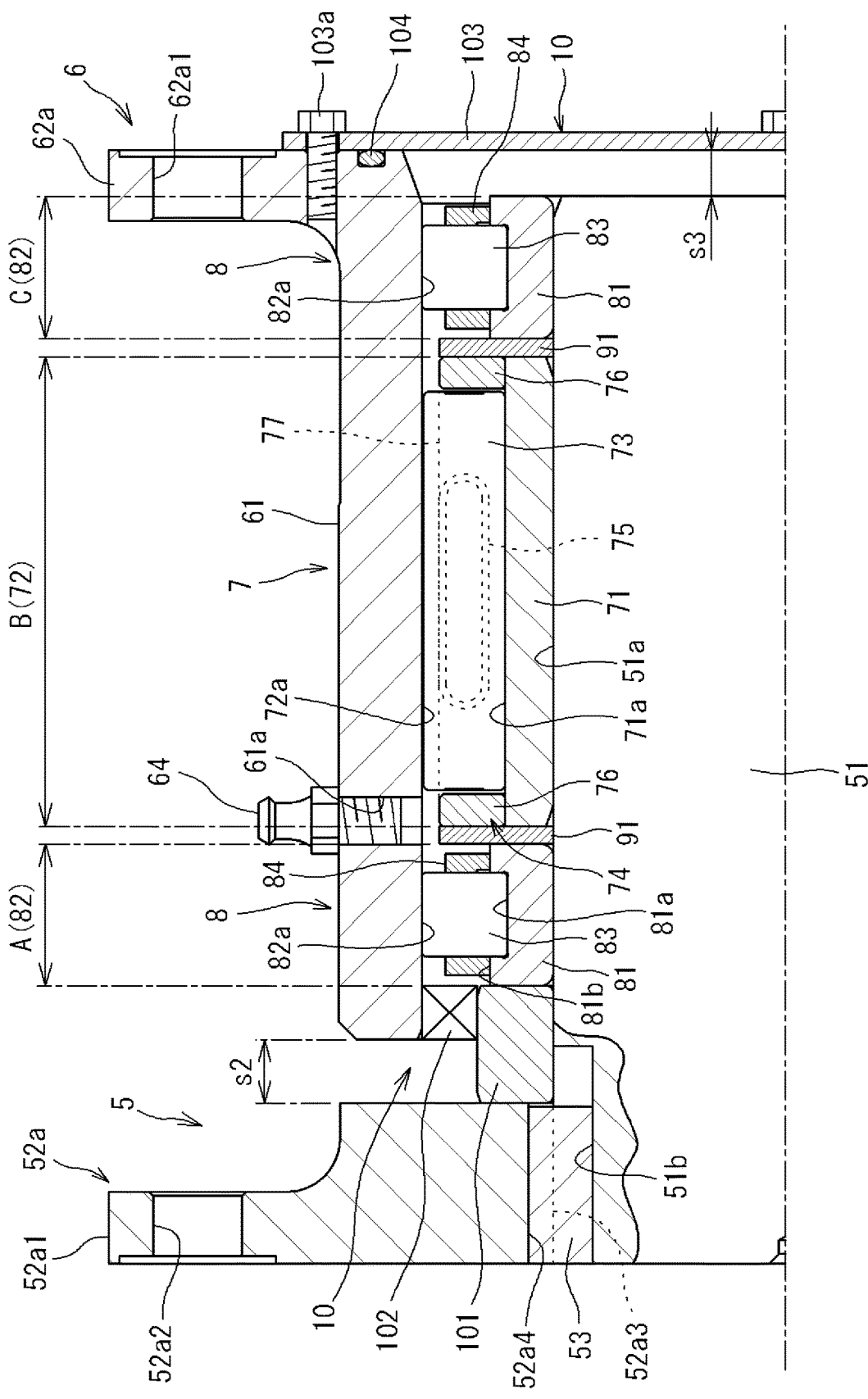
FIG. 5 is a cross-sectional view of a shaft coupling device in which a one-way clutch and a rolling bearing are enlargedly illustrated.

FIG. 5 is a cross-sectional view of the shaft coupling device in which the one-way clutch and the rolling bearings are enlargedly illustrated.

As illustrated in FIGS. 4 and 5, the one-way clutch 7 includes an inner ring 71, an outer ring 72 and a plurality of rollers (engaging elements) 73 disposed between an outer circumferential surface 71*a* of the inner ring 71 and the inner circumferential surface 72*a* of the outer ring 72.

The inner ring 71 is fixed by fitting around a center portion along the axial direction of the shaft portion 51 of the input rotating body 5, so as to be rotated integrally with the shaft portion 51. A region B of a center portion along the axial direction of the cylindrical portion 61 of the outer rotor 6 corresponds to the outer ring 72 of the one-way clutch 7. Accordingly, the inner circumferential surface in the region B of the cylindrical portion 61 corresponds to the outer ring inner circumferential surface 72*a* where the rollers 73 move by rolling. In the present embodiment, the rollers 73 are formed each in a cylindrical shape and are provided in number of eight arranged along the circumferential direction.

The one-way clutch 7 further includes a ring-shaped cage 74 for holding the respective rollers 73 at prescribed intervals along the circumferential direction, and a plurality of elastic members (pressing members) 75 elastically pressing the rollers 73 in one direction.

Figure 7:
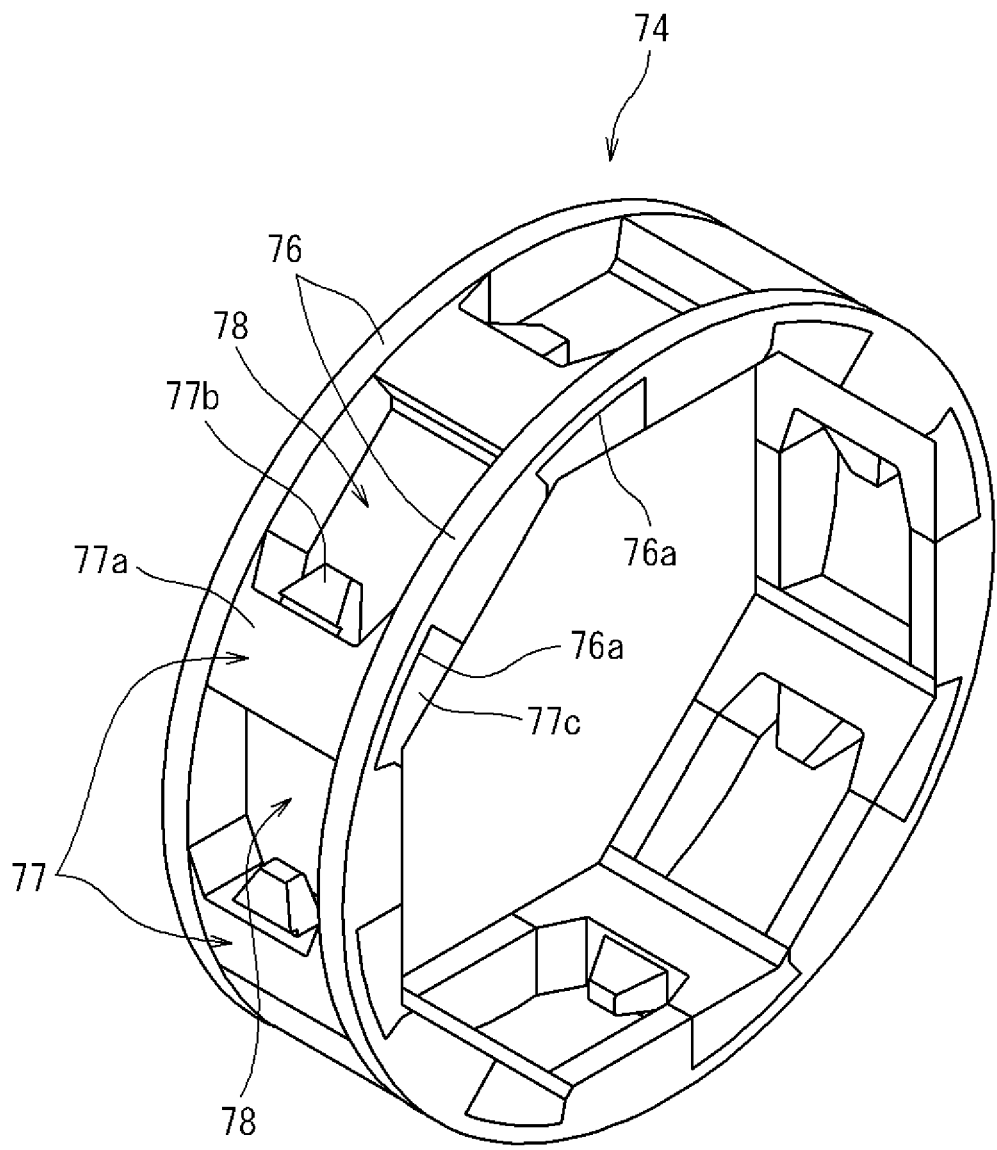
FIG. 7 is a perspective view of a cage of the one-way clutch.

FIG. 7 is a perspective view of the cage of the one-way clutch. In FIG. 7, the cage 74 includes a pair of ring portions 76 opposing each other along the axial direction, and a plurality of pillar portions 77 formed separately from the ring portions 76 and having end portions along the axial directions respectively fit in the ring portions 76. Spaces surrounded by the ring portions 76 and the pillar portions 77 adjacent to each other along the circumferential direction form pockets 78, and each of the rollers 73 is individually held in each pocket 78 (see FIG. 4).

Each of the ring portions 76 is made of a metal material such as carbon steel or aluminum, and is set to have, for example, an outer diameter of 300 mm and a thickness along the axial direction of 15 mm. On the inner circumference of each ring portion 76, a plurality of recesses 76a are formed at prescribed intervals along the circumferential direction.

Each of the pillar portions 77 includes a main body 77a, a projection 77b protruding on one end surface along the circumferential direction of the main body 77a, and a pair of fitting portions 77c formed in both end portions along the axial direction of the main body 77a. The main body 77a, the projection 77b and the fitting portions 77c are integrally molded by injection molding a synthetic resin material.

The projection 77b guides (aligns) the elastic member 75 held in the pocket 78 as illustrated in FIG. 4. Specifically, the projection 77b is formed to be gradually tapered toward the tip thereof. The elastic member 75 is freely fit from the tip side of the projection 77b. It is noted that the elastic member 75 is made of a compression coil spring formed to be elongated along the axial direction. The elastic member 75 may be, however, another type of spring such as a plate spring.

As illustrated in FIG. 7, the fitting portion 77c is formed to have a smaller thickness along the radial direction than the main body 77a, and the thickness of the fitting portion 77c is set so that the outer circumferential surface of the ring portion 76 and the outer circumferential surface of the main body 77a can be substantially at the same level when the fitting portion 77c is fit in the recess 76a.

In this manner, the cage 74 includes the ring portions 76 and the pillar portions 77, and these are formed as separate components, and hence, the ring portions 76 and the pillar portions 77 can be individually produced. Accordingly, as compared with a case where the whole cage 74 is integrally produced, the cage 74 can be easily produced. In particular, the cage 74 used in the wind power generation device 1 has a large size, and it is difficult to integrally produce it, and hence, it is more beneficial to construct the ring portions 76 and the pillar portions 77 as separate components. Besides, since the ring portions 76 are made of a metal, the strength of the cage 74 can be sufficiently secured, and since the pillar portions 77 are made of a synthetic resin, the weight of the whole cage 74 can be reduced.

As illustrated in FIG. 4, flat cam surfaces 71a1 in the same number (namely, eight) as the rollers 73 are formed on the outer circumferential surface 71a of the inner ring 71, and the inner circumferential surface 72a of the outer ring 72 is formed as a cylindrical surface. A plurality of (eight) wedge-shaped spaces S are formed along the circumferential direction between the cam surfaces 71a1 of the inner ring 71 and the cylindrical surface 72a of the outer ring 72.

Figure 6:
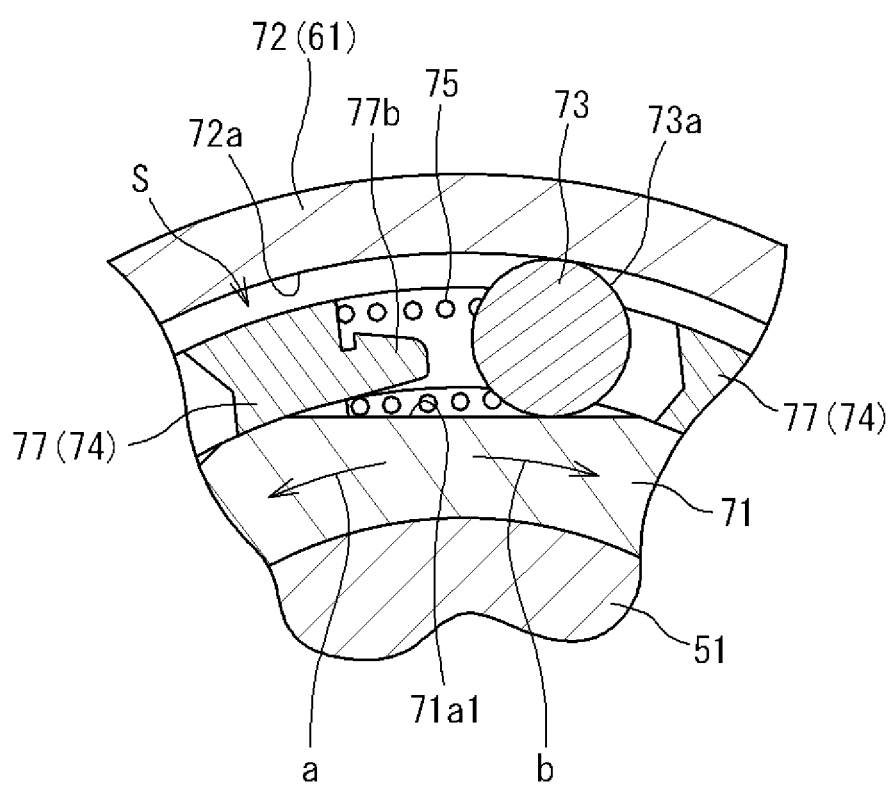
FIG. 6 is an enlarged cross-sectional view of a principal part of the one-way clutch.

FIG. 6 is an enlarged cross-sectional view of a principal part of the one-way clutch.

Each roller 73 is individually disposed in each wedge-shaped space S. Besides, the roller 73 is pressed by the elastic member 75 toward a direction where the wedge-shaped space S becomes smaller. The roller 73 has, as its outer circumferential surface, a contact surface 73a in contact with the cam surface 71a1 of the inner ring 71 and the inner circumferential surface 72a of the outer ring 72, and this contact surface 73a is formed to extend straight along the width direction (the axial direction).

In the one-way clutch 7 having the aforementioned structure, if the input rotating body 5 rotates at an increasing speed and as a result, the rotational speed of the input rotating body 5 exceeds the rotational speed of the output rotating body 6, the inner ring 71 is to rotate relatively against the outer ring 72 in one direction (the counterclockwise direction in FIG. 4; a direction of an arrow a in FIG. 6). In this case, the roller 73 slightly moves, owing to the pressing force applied by the elastic member 75, in the direction where the wedge-shaped space S becomes smaller (in the rightward direction in FIG. 6), the contact surface 73a of the roller 73 is pressed against the outer circumferential surface 71a (the cam surface 71a1; an engaged surface) of the inner ring 71 and the inner circumferential surface (an engaged surface) 72a of the outer ring 72, and hence, the roller 73 is engaged with the inner and outer rings 71 and 72. As a result, the inner and outer rings 71 and 72 can integrally rotate in the direction a, and hence, the input rotating body 5 and the output rotating body 6 can be integrally rotatably connected to each other.

Besides, if the input rotating body 5 rotates at a constant speed after rotating at an increasing speed and as a result, the rotational speed of the input rotating body 5 becomes the same as the rotational speed of the output rotating body 6, the roller 73 is held in a state where it is engaged with the inner and outer rings 71 and 72. Therefore, the one-way clutch 7 retains the integral rotation along the above-described one direction of the inner and outer rings 71 and 72, and hence, the input rotating body 5 and the output rotating body 6 continues to integrally rotate.

On the other hand, if the input rotating body 5 rotates at a decreasing speed and as a result, the rotational speed of the input rotating body 5 becomes lower than the rotational speed of the output rotating body 6, the inner ring 71 is to rotate relatively against the outer ring 72 in another direction (the clockwise direction of FIG. 4; a direction of an arrow b in FIG. 6). In this case, the roller 73 slightly moves, against the pressing force applied by the elastic member 75, in a direction where the wedge-shaped space S becomes larger, and thus, the engagement between the roller 73 and the inner and outer rings 71 and 72 is released. Since the engagement of the roller 73 is thus released, the connection between the input rotating body 5 and the output rotating body 6 is broken.

Incidentally, the outer ring inner circumferential surface 72a forming the respective wedge-shaped spaces S is formed by parts (arc surfaces) of the cylindrical surface continuous along the circumferential direction, but it may be formed by arc surfaces not continuous along the circumferential direction, such as independent arc surfaces having a flat surface or an infection point between portions of the outer ring inner circumferential surface 72a corresponding to the wedge-shaped spaces S adjacent to each other.

In the input rotating body 5, the inner ring 71 of the one-way clutch 7 is fit on the shaft portion 51 by interference fit with a prescribed interference. Accordingly, the shaft portion 51 and the inner ring 71 can integrally rotate owing to a tightening force of the inner ring 71 on the shaft portion 51. Besides, the tightening force of the inner ring 71 on the shaft portion 51 is increased by the engagement between the roller 73 and the inner and outer rings 71 and 72. This action will now be described in details.

Figure 8A:
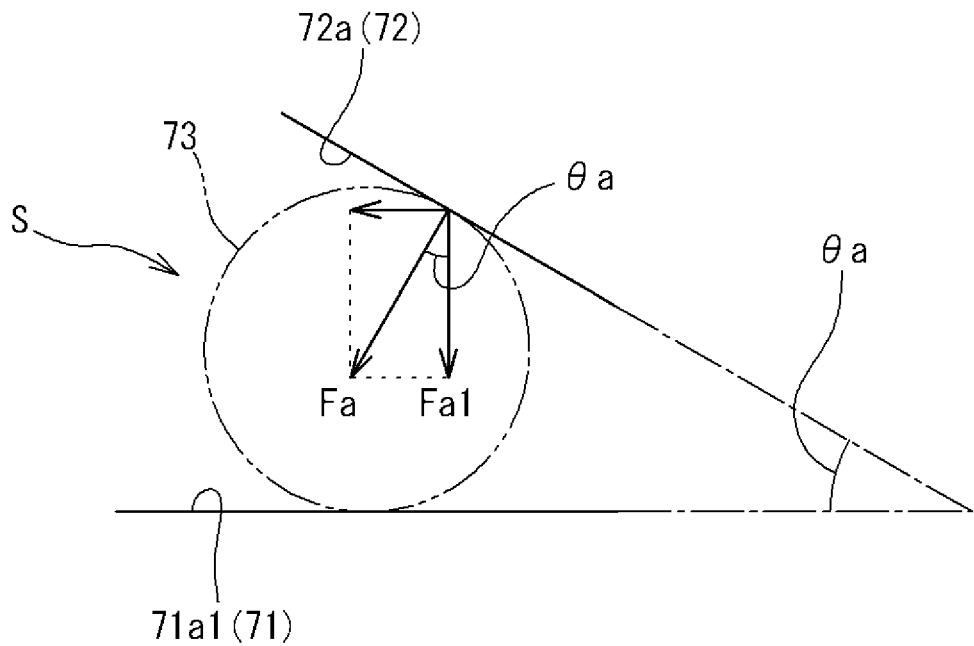
FIGS. 8(a) and 8(b) are explanatory diagrams illustrating the action of the one-way clutch.
Figure 8B:
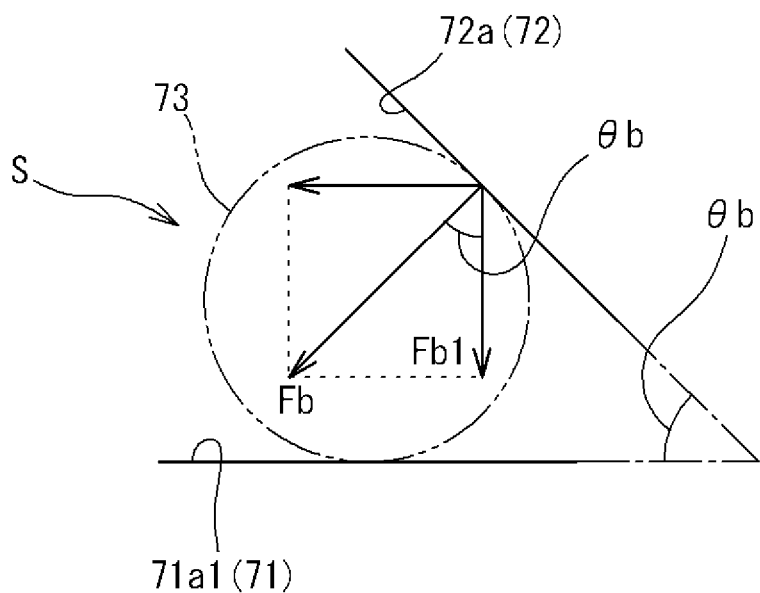

As illustrated in FIG. 6, when the inner ring 71 is to rotate relatively against the outer ring 72 in the direction of the arrow a in FIG. 6, the roller 73 is engaged with the cam surface 71a1 and the outer ring inner circumferential surface 72a, and as a result, as illustrated in FIGS. 8(a) and 8(b), a load Fa or Fb is applied by the outer ring inner circumferential surface 72a to the roller 73, and a vertical component load Fa1 or Fb1, that is, a force component of the load Fa or Fb, is applied by the roller 73 to the cam surface 71a1 of the inner ring 71. Accordingly, the tightening force of the inner ring 71 on the shaft portion 51 is increased by this vertical component load Fa1 or Fb1.

As a result, a torque (transmission torque) T2 that can be transmitted from the shaft portion 51 to the inner ring 71 owing to the tightening force caused by the fit between the shaft portion 51 and the inner ring 71 (hereinafter also referred to as the "initial tightening force") can be set to be smaller than a maximum transmission torque T1max to be transmitted from the shaft portion 51 to the inner ring 71 when a load torque for operating the wind power generation device 1 (such as a power-generation torque for driving the rotor 42 of the power generator 4 and an inertia torque) is the maximum. In other words, the following relationship can be set between T2 and T1max:

$$T1max > T2 \quad (1)$$

Besides, assuming that a transmission torque that can be transmitted from the shaft portion 51 to the inner ring 71 owing to a tightening force caused by the engagement between the roller 73 and the inner and outer rings 71 and 72 (hereinafter also referred to as the "additional tightening force") is T3, a sum of T2 and T3 is always larger than a minimum transmission torque T1 necessary for operating the wind power generation device 1. In other words, the following relationship holds:

$$T1 < T2 + T3 \quad (2)$$

In particular, a transmission torque T3max that can be transmitted from the shaft portion 51 to the inner ring 71 owing to the additional tightening force when the load torque is the maximum satisfies the following condition:

$$T1max < T2 + T3max \quad (3)$$

Figure 9:
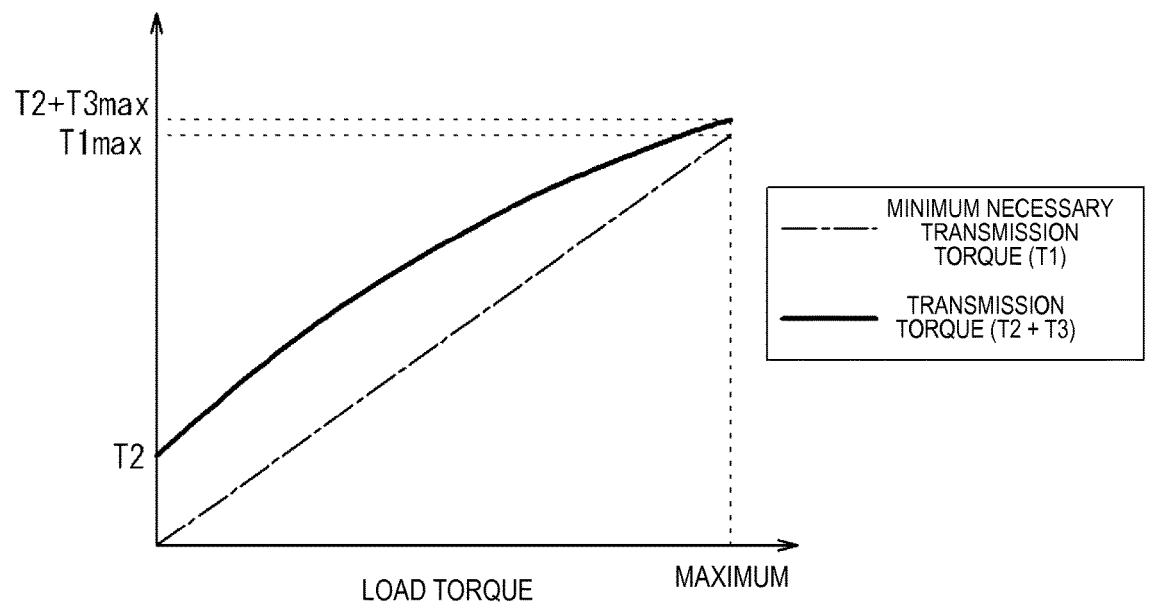
FIG. 9 is a graph explaining the relationship between a load torque and a transmission torque.

The relationships among the load torque and the respective transmission torques T1 to T3 are illustrated in a graph of FIG. 9. Incidentally, the above-described maximum load torque refers to a maximum load torque assumed as a design condition of the wind power generation device 1, and is not an excessive load torque occurring when the wind power generation device 1 has a malfunction or when the wind speed is unexpectedly abruptly varied due to abnormal weather.

When the aforementioned relationships (1) to (3) are satisfied, the initial tightening force caused by the fit between the shaft portion 51 and the inner ring 71 can be made as small as possible, and hence the interference necessary for the fit therebetween can be reduced, so that an internal stress (in particular, a stress along the circumferential direction) caused in the inner ring 71 due to the fit therebetween can be reduced. Since the internal stress of the inner ring 71 is reduced, the durability of the inner ring 71 can be increased, so that the lifetime of the one-way clutch 7, and the lifetime of the shaft coupling device 9 in the end can be increased. It is noted that the interference between the shaft portion 51 and the inner ring 71 can be set to 10 µm at a minimum.

Incidentally, if the inner ring 71 of the one-way clutch 7 is omitted and the cam surface is directly formed on the shaft portion 51, concentration of the stress described above caused due to the fit can be suitably suppressed. Since the one-way clutch 7 used in the wind power generation device 1 as in the present embodiment has a large size, however, it is difficult and is not realistic to form the cam surface directly on the shaft portion 51. Accordingly, it is the most effective to set the relationships among the transmission torque T1 to T3 and the load torque as the aforementioned conditions (1) to (3).

On the other hand, if the tightening force obtained through the engagement between the roller 73 and the inner and outer rings 71 and 72 becomes excessively large when the load torque is increased, the burden of the inner ring 71 is increased, and hence, it is apprehended that the durability may be lowered on the contrary. Therefore, in the present embodiment, as the load torque is increased, the increment of the vertical component load applied by the roller 73 to the inner ring 71 (the cam surface 71a1) corresponding to the increment of the load torque is reduced, so that the burden of the inner ring 71 can be reduced as much as possible.

Specifically, as illustrated in FIG. 6, the outer ring inner circumferential surface 72a is formed as an arc surface, and therefore, as the wedge-shaped space S is smaller, the wedge angle is larger. FIG. 8(a) illustrates a state where the roller 73 is positioned in a region where the wedge-shaped space S is comparatively large and a wedge angle θa is small, and FIG. 8(b) illustrates a state where the roller 73 is positioned in a region where the wedge-shaped space S is comparatively small and a wedge angle θb is large.

Besides, the roller 73 is positioned in the region where the wedge-shaped space S is comparatively large in a case where the load torque is small, such as an initial stage of the engagement between the roller 73 and the inner and outer rings 71 and 72, for example, when a cut-in wind speed (a minimum wind speed necessary for power generation) is attained from a non-rotating state for starting the rotation, or when the rotation becomes constant and stable at the cut-in wind speed. Alternatively, the roller 73 is positioned in the region where the wedge-shaped space S is small in a case where the load torque is large, such as when a wind speed beyond a rated wind speed is attained to obtain a rated output. The cut-in wind speed may be an instantaneous wind speed or an average wind speed of a prescribed time.

Accordingly, in FIGS. 8(a) and 8(b), the loads Fa and Fb applied from the outer ring inner circumferential surface 72a to the roller 73 are in the following relationship:

$$Fa < Fb \quad (4)$$

A ratio of the vertical component load Fb1 to the load Fb applied from the outer ring inner circumferential surface 72a to the roller 73 (Fb/Fb1) illustrated in FIG. 8(b) is smaller than a ratio of the vertical component load Fa1 to the load Fa (Fa/Fa1) illustrated in FIG. 8(a). Therefore, even when the load torque is increased, the vertical component load Fb1 is not much increased, and hence the burden of the inner ring 71 can be reduced.

The wedge angle θa obtained when the load torque at the initial stage of the engagement between the roller 73 and the inner and outer rings 71 and 72 is applied and the wedge angle θb obtained when the maximum load torque is applied are set to be in the following relationship:

$$1.0° < θb - θa < 1.5° \quad (5)$$

The wedge angle θa is preferably in a range of 4° to 9°, and the wedge angle θb is preferably in a range of 5.5° to 10°. If the wedge angle θa is smaller than 4°, there is a possibility that the vertical component load Fa1 applied from the roller 73 to the cam surface 71a1 may become larger than necessary, and if the wedge angle θa exceeds 9°, the other wedge angle θb becomes too large, and hence there is a possibility that the engagement between the roller and the circumferential surfaces may become insufficient. Besides, if the wedge angle θb is smaller than 5.5°, the other wedge angle θa becomes too small, and hence there is a possibility that the vertical component load Fa1 applied from the roller 73 to the cam surface 71a1 may become larger than necessary, and if the wedge angle θb exceeds 10°, there is a possibility that the engagement between the roller 73 and the inner and outer rings 71 and 72 may become insufficient.

In addition, a ratio between the wedge angles θa and θb is set as:

$$1.1 < θb/θa < 1.4 \quad (6)$$

(more preferably, 1.11<θb/θa<1.38)

If the wedge angles θa and θb are set to be in the above-described relationship, the torque transmission between the shaft portion 51 and the inner ring 71 can be definitely performed, and in addition, the burden of the inner ring 71 can be reduced from the initial stage of the engagement between the roller 73 and the inner ring 71 and the outer ring 72 until the load torque becomes the maximum.

The above-described relationships (5) and (6) can be set by adjusting the inner diameter of the outer ring 72, the outer diameter and the P. C. D. of the roller 73, the distance between the outer ring inner circumferential surface 72a and the cam surface 71a1, and the like. Besides, the number of the rollers 73 used in the one-way clutch 7 is set preferably to four to eight. If the number of the rollers 73 exceeds eight, the loads Fa and Fb applied from the outer ring inner circumferential surface 72a to each roller 73 are dispersed to reduce the vertical component loads Fa1 and Fb1 applied from the roller 73 to the cam surface 71a1, and there is a possibility that the tightening force of the inner ring 71 on the shaft portion 51 cannot be sufficiently obtained. Alternatively, if the number of the rollers 73 is smaller than four, the tightening force of the inner ring 71 on the shaft portion 51 becomes too large, and hence a local burden of the inner ring 71 becomes large.

In FIG. 5, the pair of rolling bearings 8 are disposed between the shaft portion 51 of the input rotating body 5 and the cylindrical portion 61 of the output rotating body 6, so as to relatively rotatably support the input rotating body 5 and the output rotating body 6. Besides, the respective rolling bearings 8 are disposed on both sides along the axial direction of the one-way clutch 7 to be adjacent with washers (positioning members) 91 sandwiched therebetween.

Each rolling bearing 8 is formed by a cylindrical roller bearing including an inner ring 81 and an outer ring 82 working as bearing rings, a plurality of cylindrical rollers (rolling elements) 83 disposed between the inner ring 81 and the outer ring 82 movably by rolling, and a cage 84 for holding a distance between the plural cylindrical rollers 83 along the circumferential direction.

The inner ring 81 has an inner ring raceway surface 81a formed on its outer circumference, and inner ring flange portions 81b formed on both sides along the axial direction of the inner ring raceway surface 81a to protrude outward in the radial direction. The end surfaces of the cylindrical roller 83 are in sliding contact with the inside surfaces of the inner ring flange portions 81b. Besides, the inner ring flange portion 81b adjacent to the one-way clutch 7 has a radial outer end portion protruding radially outward beyond the inner ring 71 of the one-way clutch 7 so as to be positioned on a side along the axial direction of the cage 74 of the one-way clutch 7.

Regions A and C of both end portions along the axial direction of the cylindrical portion 61 of the output rotating body 6 correspond to the outer rings 82 of the rolling bearings 8, and the outer ring raceway surfaces 82a of the outer rings 82 are formed on the inner circumferential surfaces in these regions A and C. The cylindrical roller 83 is provided movably by rolling between the outer ring raceway surface 82a and the inner ring raceway surface 81a. Accordingly, the cylindrical portion 61 of the outer rotor 6 works also as the outer ring 72 of the one-way clutch 7 and the outer rings 82 of the rolling bearings 8, and the outer ring inner circumferential surface 72a of the one-way clutch 7 and the outer ring raceway surfaces 82a of the rolling bearings 8 are formed on the same inner circumference. In other words, the outer ring 72 of the one-way clutch 7 and the outer rings 82 of the rolling bearings 8 are integrally formed.

Each washer 91 is configured by forming a thin plate material of a metal such as an SPCC into a ring shape, and the thickness along the axial direction of its cross section is set to be smaller than the width along the radial direction. Besides, the washer 91 is fit (freely fit) on the outer circumferential surface of the shaft portion 51 of the input rotating body 5, so as to be sandwiched between the inner ring 71 of the one-way clutch 7 and the inner ring 81 of the rolling bearing 8. Furthermore, the washer 91 protrudes outward in the radial direction beyond the inner ring 71 of the one-way clutch 7, and can come into contact with the side surface along the axial direction of the cage 74 of the one-way clutch 7.

Accordingly, the cage 74 of the one-way clutch 7 is positioned along the axial direction by the washer 91. Besides, since the washer 91 is disposed between the cage 74 of the one-way clutch 7 and the cage 84 of the rolling bearing 8, these cages do not directly come into contact with each other. Therefore, abrasion and seizure caused through the contact between the cages 74 and 84 can be prevented. Furthermore, since the washer 91 is sandwiched between the inner ring 71 of the one-way clutch 7 and the inner ring 81 of the rolling bearing 8, the washer 91 can be firmly fixed even if the washer 91 is freely fit on the shaft portion 51. Accordingly, the washer 91 can be formed to be as thin as possible, and the cage 74 can be definitely positioned. Besides, the flange portion 81b formed on the inner ring 81 of the rolling bearing 8 protrudes radially outward beyond the inner ring 71 of the one-way clutch 7 to be positioned on the side along the axial direction of the cage 74, and therefore, the washer 91 can be backed up by the flange portion 81b of the inner ring 81, and the washer 91 can be more firmly supported. As a result, the washer 91 can be formed in a further smaller thickness, and the dimensional increase in the axial direction of the one-way clutch 7 otherwise caused by providing the washer 91 can be suppressed.

Incidentally, the washer 91 is disposed with a gap serving as a passage of the grease provided between the washer and the cylindrical portion 61 so as not to inhibit the flow of the grease between the one-way clutch 7 and the rolling bearing 8.

FIGS. 10(a) to 10(d) are explanatory diagrams illustrating assembly procedures of the shaft coupling device.

Now, the assembly procedures of the shaft coupling device 9 will be described with reference to FIGS. 10(a) to 10(d). First, as illustrated in FIG. 10(a), one of the rolling bearings 8, the washer 91, the inner ring 71 of the one-way clutch 7, the ring portion 76, the pillar portions 77 and the other ring portion 76 of the cage 74, the other rolling bearing 8 are successively attached to the outer circumferential surface of the shaft portion 51 of the input rotating body 5. At this point, the cage 84 and the cylindrical rollers 83 are mounted to the inner ring 81 of each rolling bearing 8 in advance. The inner ring 81 of the rolling bearing 8 and the inner ring 71 of the one-way clutch 7 are attached by fitting on the outer circumferential surface 51a of the shaft portion 51 by shrink fitting or expansion fitting. Accordingly, the inner rings 81 and 71 are firmly fit on the shaft portion 51 by the interference fit with a prescribed interference. The cage 74 is attached by freely fitting one of the ring portions 76 on the outer circumferential surface of the inner ring 71 first, fitting one of the fitting portions 77c (see FIG. 7) of the pillar portion 77 in each recess 76a (see FIG. 7) of this ring portion 76, and then fitting the recess 76a of the other ring portion 76 in the other fitting portion 77c of the pillar portion 77 while freely fitting this ring portion 76 on the inner ring 71.

Next, as illustrated in FIG. 10(b), the seal receiving member 101 is fit on the outer circumferential surface of the shaft portion 51 by the shrink fitting or the like. Besides, the elastic members 75 and the rollers 73 of the one-way clutch 7 are attached to the cage 74.

Then, as illustrated in FIG. 10(c), the cylindrical portion 61 of the output rotating body 6 is attached to the radial outside of the cylindrical rollers 83 of the rolling bearings 8 and the rollers 73 of the one-way clutch 7 having been attached to the input rotating body 5. At this point, as illustrated in FIG. 6, each roller 73 of the one-way clutch 7 is pressed by the elastic member 75 within the pocket 78 and is positioned on a side of the end of the cam surface 71a1, and therefore, the roller 73 is in a state where it protrudes radially outward beyond the inner circumferential surface of the cylindrical portion 61 of the output rotating body 6, namely, the outer ring inner circumferential surface 72a of the one-way clutch 7. Accordingly, when the cylindrical portion 61 is to be fit to the radial outside of the rollers 73, the cylindrical portion 61 is rotated in an opposite direction to the direction of pressing the rollers 73 by the elastic member 75 with the tip (the lower tip in the drawing) of the cylindrical portion 61 kept in contact with the ends of the rollers 73.

In this manner, the rollers 73 can be moved backward to the radial inside while moving toward the center of the cam surface 71a1, and hence, the inner circumferential surface of the cylindrical portion 61 can be easily fit to the radial outside of the rollers 73.

Besides, since the wind power generation device 1 has a large size and the respective components of the shaft coupling device 9 are also large, the assembly is performed in an unstable state where these components are craned. Therefore, in attaching the cylindrical portion 61 of the output rotating body 6 to the radial outside of the rollers 73 of the one-way clutch 7 having been attached to the input rotating body 5, it is difficult to adjust the positions of the tip of the cylindrical portion 61 and the ends of the rollers 73 of the one-way clutch 7. Besides, since the roller 73 is pressed by the elastic member 75 to be positioned on the side of the radial end of the cam surface 71a1, it is necessary to move the roller 73 toward the radial center of the cam surface 71a1 for attaching the cylindrical portion 61 to the radial outside of the roller 73, but the assembly operation is extremely difficult to perform if the positions of the end of the cylindrical portion 61 and the ends of the rollers 73 of the one-way clutch 7 are difficult to adjust. In the present embodiment, a tapered surface 61b for increasing the inner diameter is formed on the inner circumferential surface at the tip of the cylindrical portion 61. When this tapered surface 61b is pressed against the end of the roller 73, the positions of the tip of the cylindrical portion 61 and the end of the roller 73 can be easily adjusted, and the tip of the cylindrical portion 61 can be easily engaged with the end of the roller 73. Furthermore, since the cylindrical portion 61 can be easily held in a state where the tapered surface 61b is pressed against the end of the roller 73, the roller 73 can be easily moved toward the radial center of the cam surface 71a1, and thus, the cylindrical portion 61 can be more easily assembled.

Incidentally, it is preferable to form a tapered surface on an outer edge 73e in an end portion along the axial direction of each roller 73 of the one-way clutch 7 so as to be easily positioned against the tapered surface 61b in assembling the cylindrical portion 61. Besides, when a tapered surface or an R surface is formed on the outer circumferential surface in an end portion along the axial direction of the shaft portion 51 and the inner circumferential surfaces in end portions along the axial direction of the inner rings 71 and 81 to be fit on the shaft portion 51, the alignment and the assembly of these can be easily performed.

Ultimately, as illustrated in FIG. 10(d), the key 53 is attached to the keyway 51b of the shaft portion 51, and the flange portion 52a is fit on the outer circumferential surface 51a of the shaft portion 51.

Incidentally, as the assembly method for the one-way clutch 7, a method in which one of the rolling bearings 8 is first mounted to the outer circumference of the shaft portion 51 of the input rotating body 5, the cylindrical portion 61 of the output rotating body 6 is then mounted, and the one-way clutch assembled in advance is inserted between the shaft portion 51 and the cylindrical portion 61 may be employed. Since the one-way clutch used in the wind power generation device 1 is large, however, it is extremely difficult to insert the one-way clutch assembled in advance into a small space between the shaft portion 51 and the cylindrical portion 61. In addition, each roller 73 protrudes radially outward beyond the inner circumferential surface 72a of the cylindrical portion 61 owing to the action of the elastic member 75 and the cam surface 71a1, and therefore, it is necessary to press each roller 73 radially inward for inserting the one-way clutch 7 inside the cylindrical portion 61, which makes the assembly operation extremely complicated.

In contrast, in the assembly method of the present embodiment described with reference to FIGS. 10(a) to 10(d), the output rotating body 6 is mounted to the one-way clutch 7 and the rolling bearings 8, excluding the outer rings 72 and 82, attached to the shaft portion 51 of the input rotating body 5, and during this assembly, the plural rollers 73 can be simultaneously moved back radially inward by rotating the cylindrical portion 61 of the output rotating body 6, and thus, the shaft coupling device 9 can be easily assembled.

Incidentally, in the large-scaled wind power generation device 1 having a rated output exceeding 1 MW, the shaft diameters of the output shaft 35 of the speed-up gear 3 and the drive shaft 41 of the power generator 4 are also large, and the weight of the shaft coupling device 9 is consequently large. Accordingly, it is extremely difficult to perform the assembly operation by directly manually holding the components in assembling the shaft coupling device 9. In the wind power generation device 1 including the power generator 4 of, for example, 2 MW class, the weight of the shaft coupling device 9 exceeds 100 kg in some cases, and the labor necessary for the assembly operation, such as attaching a craned component in an unstable state and using a special jig, is extremely large. Therefore, it is extremely effective to assemble the shaft coupling device 9 as described above.

Figure 10:
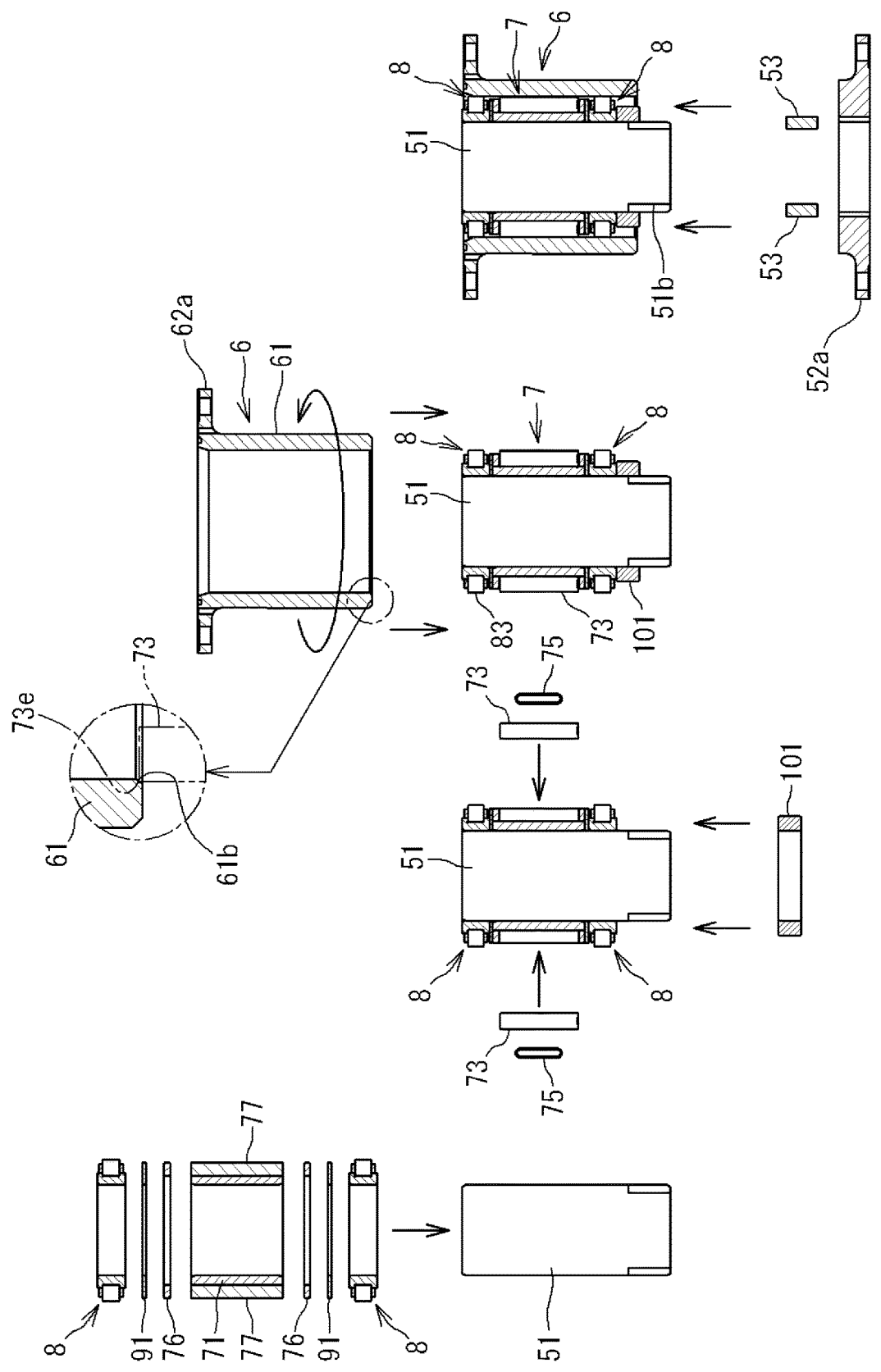
FIGS. 10(a) to 10(d) are explanatory diagrams illustrating assembly procedures of the shaft coupling device.

Incidentally, the assembly procedures up to FIG. 10(*c*) can be appropriately changed. For example, the inner ring 81, the cage 84 and the cylindrical rollers 83 of the rolling bearing 8 can be respectively individually attached to the shaft portion 51.

As illustrated in FIG. 2, the wind power generation device 1 of the present embodiment is provided with a covering member (shielding means) 92 covering the shaft coupling device 9. This covering member 92 is made of an elastically deformable synthetic resin, rubber, or the like. Besides, as illustrated also in FIG. 3, the covering member 92 is formed in a cylindrical shape, and includes connecting portions 93 and 94 provided at both ends along the axial direction, and a bellows portion 95 is provided between the connecting portions 93 and 94. One connecting portion 93 is fixed on the outer circumferential surface (or possibly on the flange portion 41*a*) of the drive shaft 41 with a fixing band or the like. Besides, the other connecting portion 94 is connected by engaging with the flange portion 35*c*1 of the output shaft 35. The bellows portion 95 is expandable/contractible along the axial direction, and bendable or deformable along the radial direction.

Figure 12:
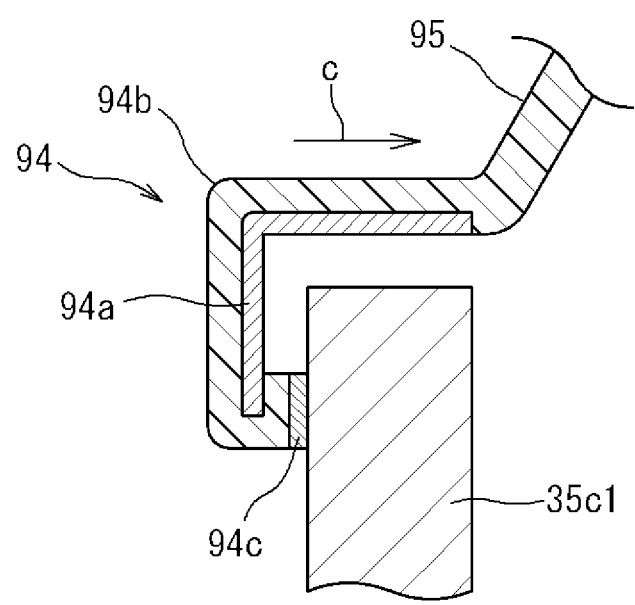
FIG. 12 is an enlarged cross-sectional view of a connecting portion of a covering member.

FIG. 12 is an enlarged cross-sectional view of the connecting portion of the covering member.

The connecting portion 94 includes a core metal 94*a* having an L-shaped cross section, and an elastic member 94*b* adhering to the outer surface of the core metal 94*a*. Besides, at the tip of the connecting portion 94, a sliding member 94*c* brought into contact with the side surface, on a side closer to the speed-up gear 3, of the flange portion 35*c*1 is provided. This sliding member 94*c* is made of a member having small sliding friction against the flange portion 35*c*1, such as a member obtained by coating a surface of a metal plate for lowering a friction coefficient. Besides, the sliding member 94*c* is pressed against the flange portion 35*c*1 by a force caused when the bellows portion 95 contracts in a direction of an arrow c, and the sealing action of this sliding member 94*c* inhibits the flow of air coming into and going out of the covering member 92.

The wind power generation device 1 installed on the coast or offshore is operated by receiving wind containing a large amount of a salt content, and if an outside air flow enters equipment housed in the nacelle 13, there arises a problem of metal corrosion due to a salt damage, which largely affects the durability. In the wind power generation device 1 of the present embodiment, the shaft coupling device 9 is covered by the covering member 92, so as to inhibit foreign matters and an air flow from entering the shaft coupling device 9. Therefore, the functional deterioration of the shaft coupling device 9 caused by a salt damage or the like, in particular, the functional deterioration of the one-way clutch 7 can be prevented.

Besides, the covering member 92 is fixed, with its one end along the axial direction, on the drive shaft 41, for example, relatively unrotatably, but the other end thereof along the axial direction is connected to the output shaft 35 relatively rotatably, and therefore, the covering member 92 is prevented from being twisted by the relative rotation of the output shaft 35 and the drive shaft 41 caused by the one-way clutch 7. Furthermore, the sliding member 94*c* of the connecting portion 94 is pressed against the flange portion 35*c*1 by utilizing the elastic deformation (contraction) of the bellows portion 95, and therefore, the relative rotation of these shafts can be allowed while inhibiting the entrance of foreign matters and an air flow.

According to the wind power generation device 1 of the present embodiment, if the rotational speed of the input rotating body 5 becomes lower than the rotational speed of the output rotating body 6, the connection between the input rotating body 5 and the output rotating body 6 can be broken by the one-way clutch 7, which is disposed between the input rotating body 5 rotating integrally with the output shaft 35 of the speed-up gear 3 and the output rotating body 6 rotating integrally with the drive shaft 41 of the power generator 4. In other words, even if the rotational speed of the output shaft 35 is abruptly lowered via the main shaft 2 due to lowering of the wind force, the inertial rotation of the rotor 42 of the power generator 4 can be prevented from being transmitted to the output shaft 35 via the drive shaft 41. As a result, the reduction of a radial load applied to the roller bearing 38 supporting the output shaft 35 and the rotation delay of the cylindrical roller 38*c* accompanying the reduction can be suppressed. Accordingly, if the rotational speed of the main shaft 2 is abruptly increased from this state due to change of the wind force and hence a high load is applied to the cylindrical roller 38*c*, the cylindrical roller 38*c* is difficult to slide on the contact surface in contact with the inner ring 38*a*, and thus, the occurrence of the smearing in the roller bearing 38 can be effectively suppressed.

Furthermore, since the inertial rotation of the rotor 42 is prevented from being transmitted to the output shaft 35, loads applied to the roller bearings 36*a*, 36*b*, 37*a*, 37*b*, 38, 39 and the like of the speed-up gear 3 can be reduced. As a result, the sizes of all of the gears 31*b* and 31*c* of the planetary gear system 31, the shafts 33 to 35 of the high-speed stage gear system 32 and the roller bearings 36*a*, 36*b*, 37*a*, 37*b*, 38 and 39 can be reduced, and hence the speed-up gear 3 can be reduced in its weight and can be produced at low cost.

Besides, since the connection between the input rotating body 5 and the output rotating body 6 is broken, the rotor 42 of the power generator 4 continuously rotates due to inertia without abruptly lowering its rotational speed, and hence, the average rotational speed of the rotor 42 can be increased. As a result, the power generation efficiency of the power generator 4 can be improved.

In addition, since the rolling bearings 8 are disposed between the input rotating body 5 and the output rotating body 6 for relatively rotatably supporting these rotors, if a gap is formed between the roller 73 and the inner and outer rings 71 and 72 in the wedge-shaped space S because the engagement between the roller 73 and the inner and outer rings 71 and 72 is released in the one-way clutch 7, the rolling bearings 8 prevent the input rotating body 5 and the output rotating body 6 from moving relatively along the radial direction. Accordingly, during the operation of the wind power generation device 1, the input rotating body 5 and the output rotating body 6 can be prevented from wobbling in the radial direction.

Besides, the outer ring inner circumferential surface 72a of the one-way clutch 7 and the outer ring raceway surfaces 82a of the rolling bearings 8 are formed on the inner circumferential surface of the cylindrical portion 61 of the output rotating body 6 serving as a common member. Therefore, the output rotating body 6 can work both as the outer ring 72 of the one-way clutch 7 and the outer ring 82 of each rolling bearing 8. Thus, the structure of the whole wind power generation device 1 can be simplified.

Furthermore, the output rotating body 6 is fixed removably on the drive shaft 41 of the power generator 4 and is disposed movably along the axial direction against the input rotating body 5, and therefore, the output rotating body 6 can be removed from the input rotating body 5 by removing the output rotating body 6 from the drive shaft 41 and moving it along the axial direction against the input rotating body 5. As a result, the outer ring 72 of the one-way clutch 7 and the outer rings 82 of the rolling bearings 8 can be simultaneously removed, and hence, a maintenance operation for the one-way clutch 7 and the rolling bearings 8 can be easily performed. At this point, there is no need to move the power generator 4, and hence the maintenance operation can be more easily performed.

As illustrated in FIG. 5, the input rotating body 5 and the output rotating body 6 are allowed to relatively move along the axial direction, for example, because the spaces s2 and s3 are provided, because the engaging element 73 of the one-way clutch 7 and the rolling element 83 of the rolling bearing 8 are formed as cylindrical rollers, and because the outer ring inner circumferential surface 72a and the outer ring raceway surface 82a on which the cylindrical rollers 73 and 83 move by rolling are formed as cylindrical surfaces (arc surfaces). Therefore, even when the output shaft 35 and the drive shaft 41 are expanded/contracted along the axial direction (namely, the distance therebetween along the axial direction is varied) due to the change in ambient conditions, such as temperature change, the expansion/contraction can be absorbed by the relative movement along the axial direction of the input rotating body 5 and the output rotating body 6. As a result, a load along the axial direction can be inhibited from being applied to the members supporting the output shaft 35 and the drive shaft 41 (such as the rolling bearings and the like).

Besides, if the outer ring inner circumferential surface 72a of the one-way clutch 7 and the outer ring raceway surfaces 82a of the rolling bearings 8 are moved against the cylindrical rollers 73 and 83 along the axial direction due to the relative movement along the axial direction of the input rotating body 5 and the output rotating body 6, the outer ring inner circumferential surface 72a and the outer ring raceway surface 82a are substantially positionally shifted along the axial direction. In particular, since the wind power generation device 1 has a large size, the positional shift is inevitably large. In order to cope with such a positional shift, the inner circumferential surface of the cylindrical portion 61 is preferably, in advance, subjected to a surface treatment necessary for the outer ring cylindrical surface 72a and the outer ring raceway surface 82a over a range covering a conceivable positional shift. Incidentally, this positional shift can be estimated by obtaining, by calculation or experiment, expansion/contraction of the respective members within a temperature change region (of, for example, −40° C. to 60° C.) assumed on the basis of the environment temperature at which the wind power generation device 1 is used, the temperature within the nacelle estimated in consideration of the amount of heat generated by the power generator 4, and the like. Besides, the spaces s2 and s3 are preferably set to be larger than the amount of the expansion along the axial direction of each shaft expected at the upper limit (the highest temperature) of the assumed temperature change region. Furthermore, the surface treatment for the outer ring inner circumferential surface 72a and the outer ring raceway surface 82a may be, for example, a surface modifying treatment such as a carbonitriding treatment, or a coating treatment such as a blackening treatment or DLC coating. Alternatively, it may be a heat treatment such as quenching or tempering.

As illustrated in FIG. 2, if the brake 44 for braking the drive shaft 41 is provided, the one-way clutch 7 or the shaft coupling device 9 including it is preferably disposed between the speed-up gear 3 and the brake 44. In the case where the one-way clutch 7 is disposed, for example, between the brake 44 and the power generator 4, even if the brake 44 is operated during the rotation, merely the rotation on the side of the speed-up gear 3 is lowered in speed, but the rotation on the side of the power generator 4 is continued by the one-way clutch 7 to be idled, and it is difficult to rapidly stop the power generator 4 at the time of, for example, occurrence of abnormality of the power generator 4.

Figure 16:
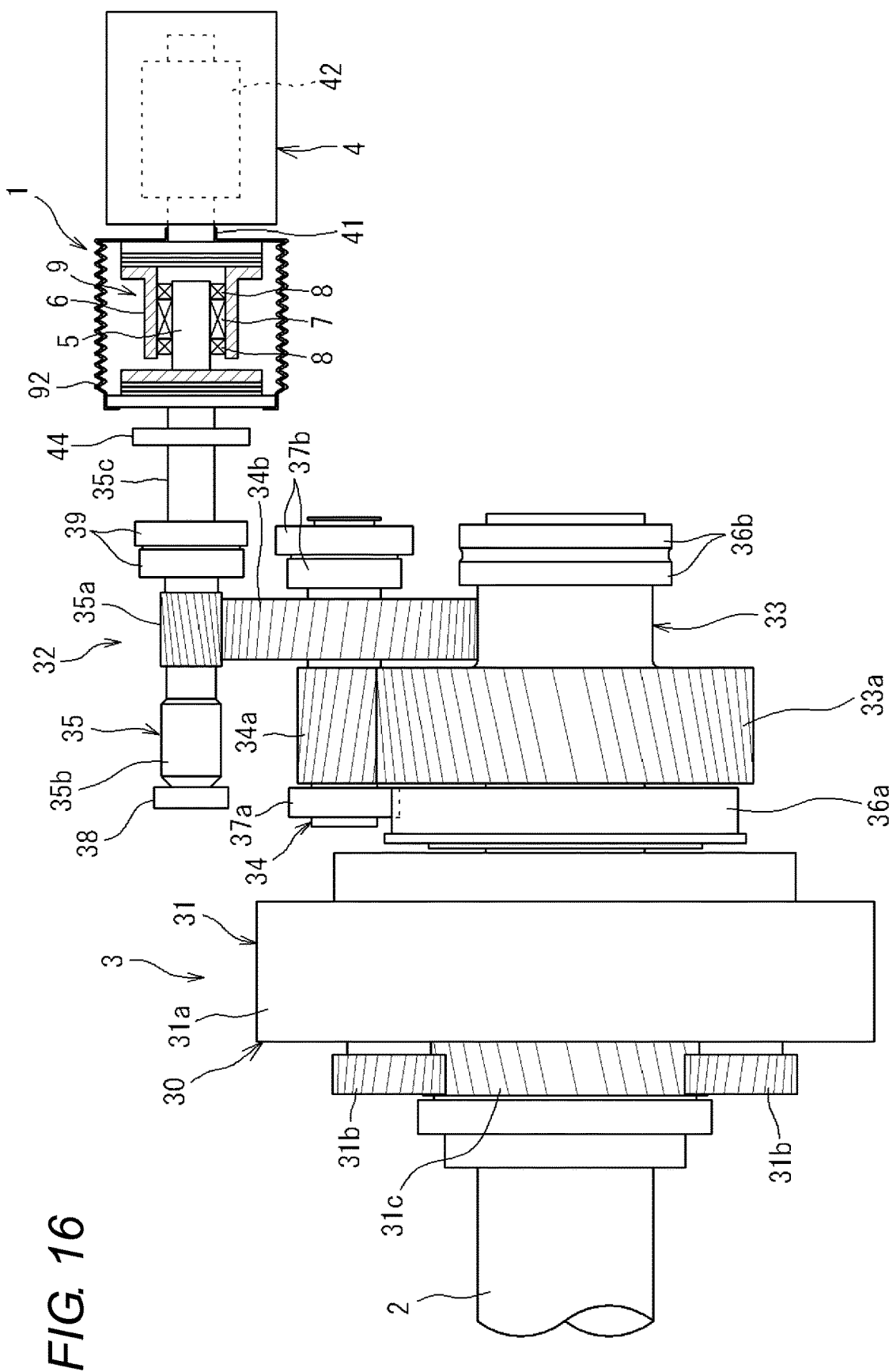
FIG. 16 is a schematic side view of a speed-up gear and a power generator according to another embodiment.

It is not always necessary, however, to provide the one-way clutch 7 or the shaft coupling device 9 between the brake 44 and the power generator 4, but it may be provided between the brake 44 and the power generator 4 as illustrated in FIG. 16. Besides, if a brake for the output shaft 35 and a brake for the drive shaft 41 are respectively provided, the one-way clutch 7 and the shaft coupling device 9 may be provided between these brakes.

Figure 13:
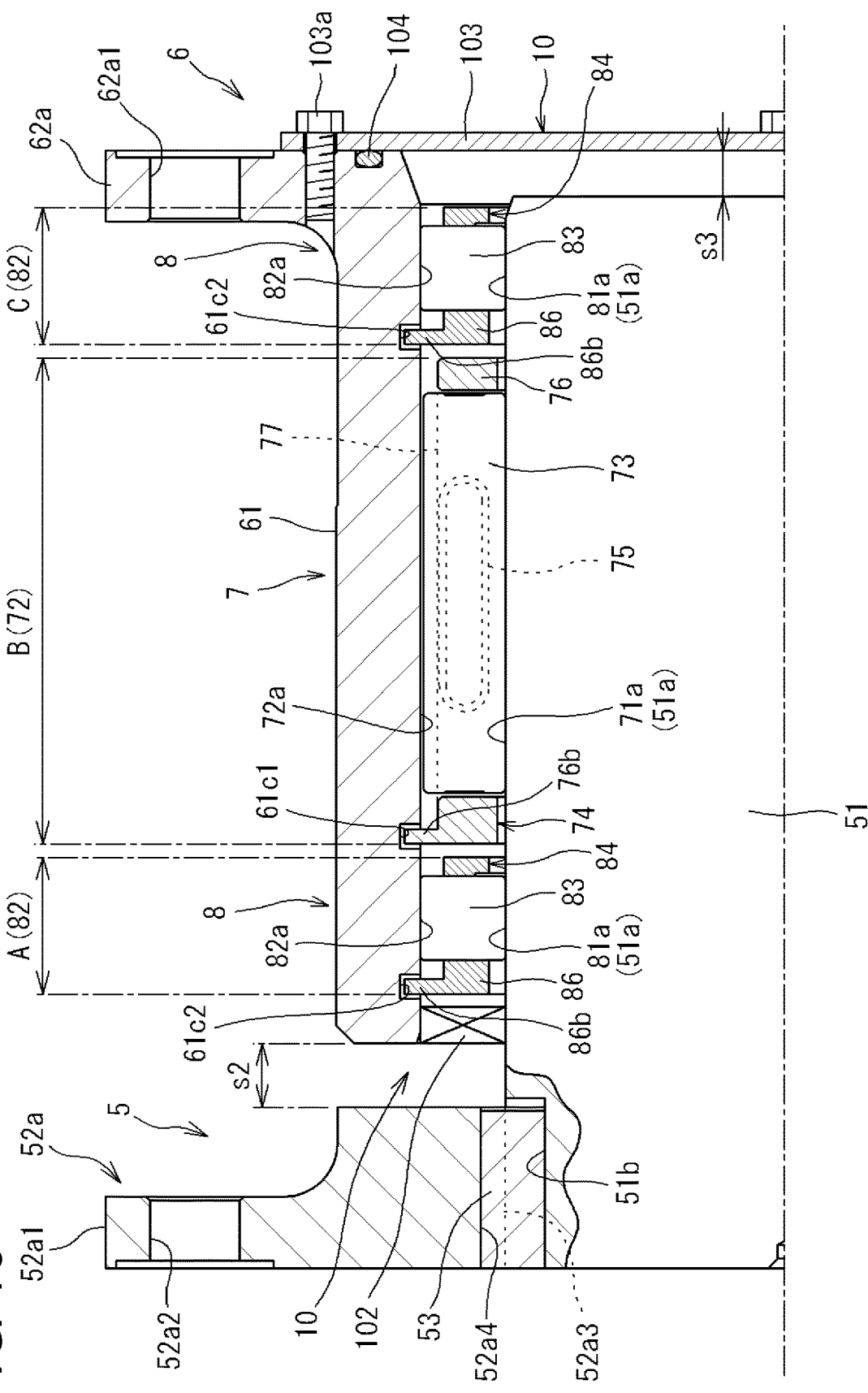
FIG. 13 is a cross-sectional view of a shaft coupling device of a wind power generation device according to a second embodiment of the present invention.
Figure 14:
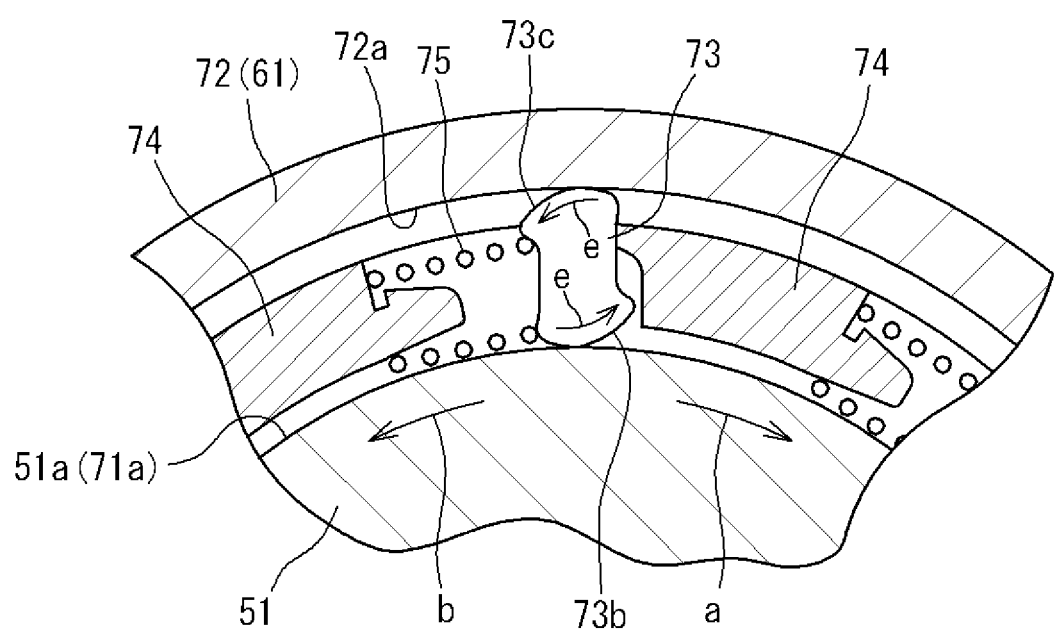
FIG. 14 is an enlarged cross-sectional view of a principal part of a one-way clutch.

FIG. 13 is a cross-sectional view of a shaft coupling device according to a second embodiment of the present invention, and FIG. 14 is an enlarged cross-sectional view of a principal part of a one-way clutch 7 of FIG. 13.

The shaft coupling device 9 of the present embodiment uses a sprag as an engaging element 73. Besides, an inner ring of the one-way clutch 7 is formed by a shaft portion 51 of an input rotating body 5, and an outer circumferential surface 71a of the inner ring is formed by an outer circumferential surface 51a of the shaft portion 51. The inner ring outer circumferential surface 71a is formed as a cylindrical surface without forming a cam surface as in the first embodiment.

Besides, an inner ring of a rolling bearing 8 is also formed by the shaft portion 51 of the input rotating body 5, and an outer circumferential surface 81a of the inner ring is formed by the outer circumferential surface 51a of the shaft portion 51.

One ring portion 76 of a cage 74 of the one-way clutch 7 has a ridge portion 76b protruding radially outward. This ridge portion 76b is slidably fit in a circumferential groove 61c1 formed on an inner circumferential surface of a cylindrical portion 61 of an output rotating body 6, so as to regulate the position along the axial direction of the cage 74.

Similarly, one ring portion 86 of a cage 84 of the rolling bearing 8 has a ridge portion 86b protruding radially outward. This ridge portion 86b is slidably fit in a circumferential groove 61c2 formed on the inner circumferential surface of the cylindrical portion 61, so as to regulate the position along the axial direction of the cage 84.

The sprag 73 includes a first contact surface 73b coming into contact with the outer circumferential surface 51a of the shaft portion 51 (the inner ring outer circumferential surface 71a), and a second contact surface 73c coming into contact with an inner circumferential surface 72a of an outer ring 72 (the cylindrical portion 61), and each of the first contact surface 73b and the second contact surface 73c is formed in a projecting and substantially arc shape. Besides, a distance between the first contact surface 73b and the second contact surface 73c respectively in contact with the outer circumferential surface 51a of the shaft portion 51 and the outer ring inner circumferential surface 72a is changed in accordance with the inclination of the sprag 73, and when the shaft portion 51 is rotated in a direction of an arrow a, the sprag 73 inclines in a direction of an arrow e, and hence the distance between the first contact surface 73b and the second contact surface 73c is increased. On the contrary, when the shaft portion 51 is rotated in a direction of an arrow b, the sprag 73 inclines in an opposite direction to the arrow e, and hence the distance between the first contact surface 73b and the second contact surface 73c is reduced.

When the distance between the first contact surface 73b and the second contact surface 73c is increased, the sprag 73 engages the outer circumferential surface 51a of the shaft portion 51 and the inner circumferential surface 72a of the outer ring 72, and on the contrary, when the distance between the first contact surface 73b and the second contact surface 73c is reduced, the engagement of the sprag 73 with the outer circumferential surface 51a of the shaft portion 51 and the inner circumferential surface 72a of the outer ring 72 is released. Accordingly, when the shaft portion 51 is to relatively rotate in the direction of the arrow a against the outer ring 72, the shaft portion 51 and the outer ring 72 are integrally rotatably connected to each other, and when the shaft portion 51 relatively rotates in the direction of the arrow b against the outer ring 72, the connection between the shaft portion 51 and the outer ring is broken.

In the present embodiment, the same effects as those of the first embodiment can be attained, and in addition, since there is no need to form a cam surface on the inner ring of the one-way clutch 7 (the shaft portion 51), the production cost can be reduced. Besides, since the shaft portion 51 can be used as the inner ring, the production cost can be further reduced, and in addition, the structure of the one-way clutch 7 can be simplified and its diameter can be reduced. Furthermore, the torque capacity can be more easily increased by increasing the rigidity in using the sprag 73 than in using a roller, and therefore, the dimensions along the radial direction and the axial direction of the sprag 73 itself can be reduced. Accordingly, the dimensions along the radial direction and the axial direction of the one-way clutch 7 can be reduced to attain compactness. When the one-way clutch 7 is thus made compact, the shaft coupling device 9 can be made compact as a whole along the radial direction and the axial direction. As a result, even if a space between an output shaft 35 of a speed-up gear 3 and a drive shaft 41 of a power generator 4 is small, the shaft coupling device 9 can be suitably provided.

Incidentally, in the second embodiment, the sprag 73 and a cylindrical roller 83 are movable along the axial direction on the outer circumferential surface 51a of the shaft portion 51, and therefore, the input rotating body 5 and the output rotating body 6 are allowed to relatively move along the axial direction. Besides, this relative movement shifts the positions along the axial direction of the inner ring outer circumferential surface 71a and the inner ring raceway surface 81a corresponding to the sprag 73 and the cylindrical roller 83, and hence, the inner ring outer circumferential surface 71a and the inner ring raceway surface 81a are preferably subjected to a necessary surface treatment (such as a surface modifying treatment, a coating treatment or a heat treatment) over a range covering a conceivable positional shift.

Furthermore, in the second embodiment, the inner ring may be fit on the outer circumferential surface of the shaft portion 51 with the sprag 73 engaged with the outer circumferential surface of the inner ring. In this case, the shaft portion 51 and the inner ring are preferably fit by the interference fit so as to satisfy the conditions (1) to (3) described above.

The present invention is not limited to the aforementioned embodiments but can be practiced with appropriate modification.

Figure 18:
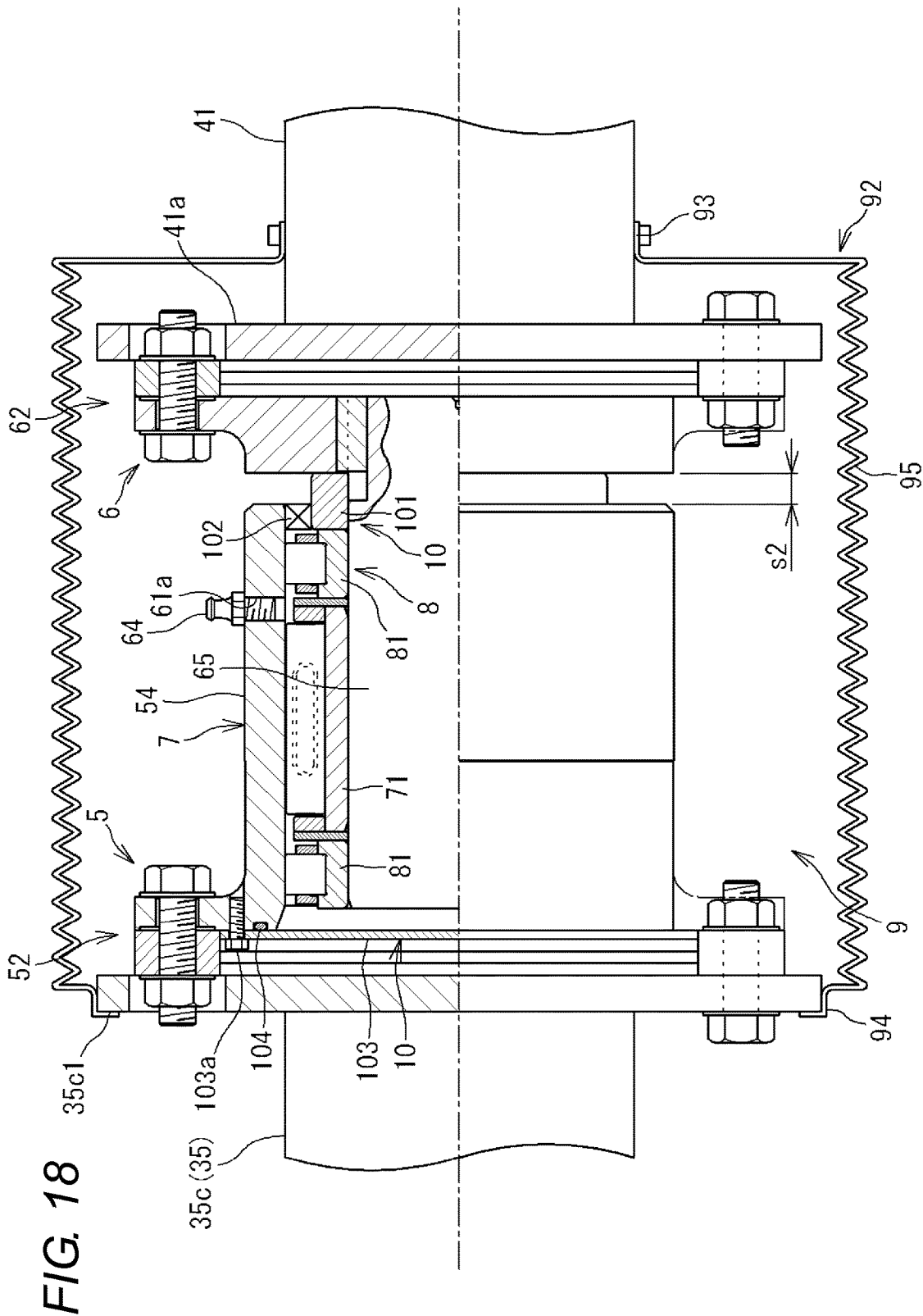
FIG. 18 is a cross-sectional view of a shaft coupling device according to still another embodiment in which a one-way clutch and a rolling bearing are enlargedly illustrated.

For example, although the output rotating body 6 is provided radially outside the input rotating body 5, it may be provided radially inside the input rotating body 5 as illustrated in FIG. 18. Specifically, the output rotating body 6 may be provided with a shaft portion 65 and the input rotating body 5 may be provided with a cylindrical portion 54, so that the cylindrical portion 54 can be coaxially provided radially outside the shaft portion 65. Besides, the inner circumferential surface of the cylindrical portion 54 may be formed as the outer ring inner circumferential surface of the one-way clutch 7 and the outer ring raceway surfaces of the rolling bearings 8, so that the inner rings 71 and 81 of the one-way clutch 7 and the rolling bearings 8 can be fit on the shaft portion 65 of the output rotating body 6.

Furthermore, in this case, the outer ring inner circumferential surface of the one-way clutch 7 may be formed as a cam surface, and the inner ring outer circumferential surface may be formed as a cylindrical surface. In addition, in this case, the inner ring outer circumferential surface may be formed on the outer circumferential surface of the shaft portion 65 of the output rotating body 6, so as to use the shaft portion 65 also as the inner ring.

Moreover, although the output rotating body is used as the outer ring of the one-way clutch and the outer rings of the rolling bearings, these outer rings may be provided on the output rotating body as separate members.

Besides, although each rolling bearing provided between the input rotating body and the output rotating body is a cylindrical roller bearing for moving the output rotating body along the axial direction, it may be a ball bearing if the output rotating body is not moved along the axial direction.

The ring portions and the pillar portions of the cage of the one-way clutch may be integrally formed by using the same material, and the material may be a metal or a synthetic resin. As the synthetic resin material used for forming the cage, a phenol resin, a polyamide resin, a PEEK (polyether ether ketone) resin or the like can be used.

Figure 15:
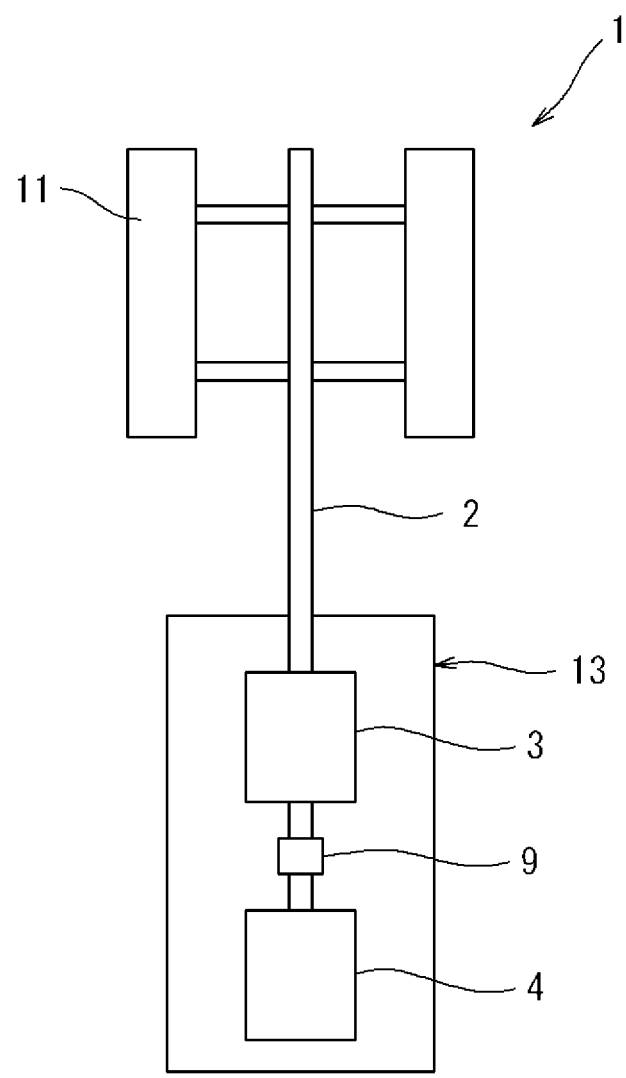
FIG. 15 is a schematic side view of a modification of the wind power generation device.

The wind power generation device 1 of the present invention is not limited to the horizontal axis type illustrated in FIG. 1 but may be a vertical axis type illustrated in FIG. 15. Also in this case, the shaft coupling device 9 including the one-way clutch can be provided between the speed-up gear 3 and the power generator 4.

Figure 17:
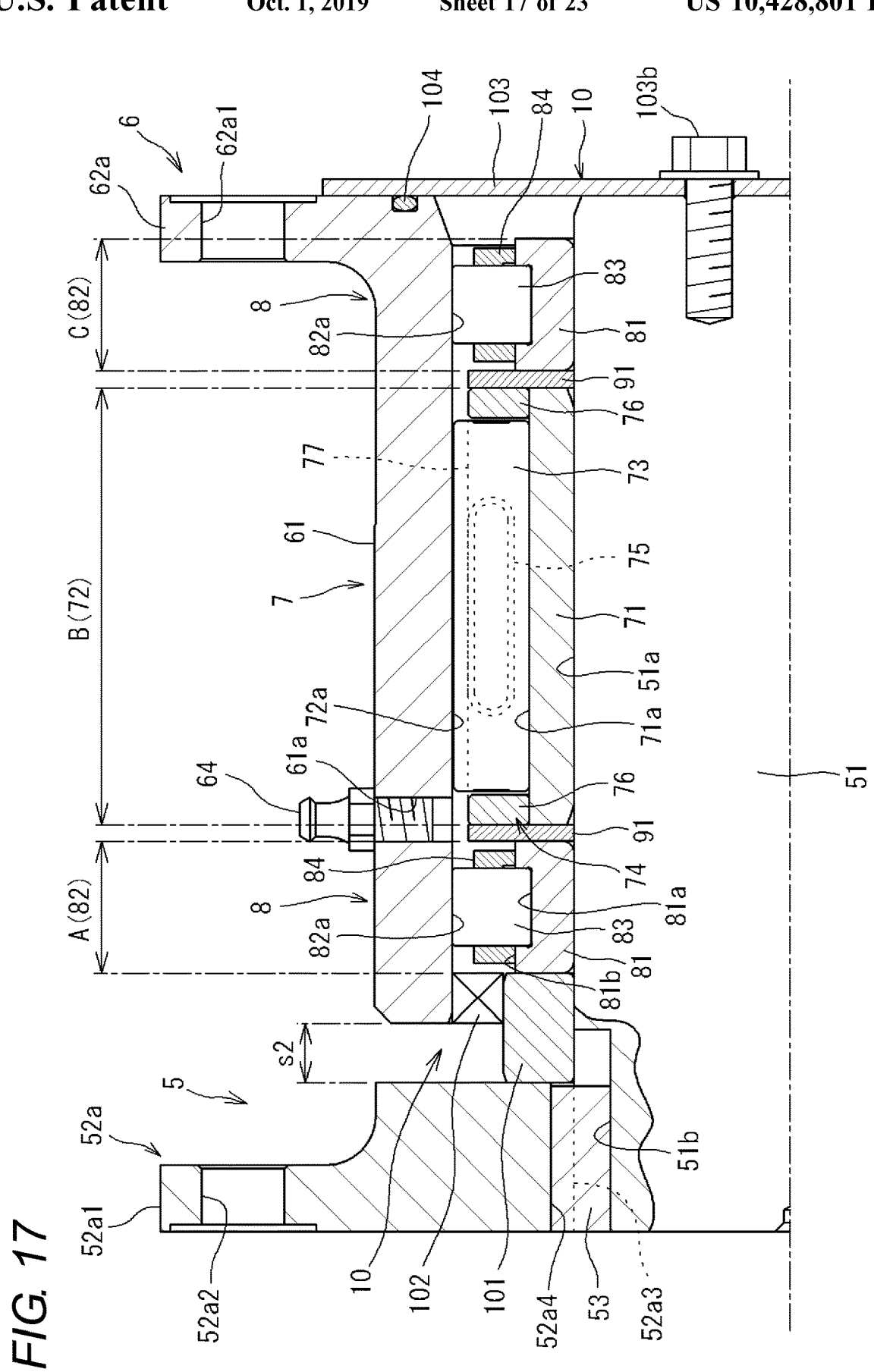
FIG. 17 is a cross-sectional view of a shaft coupling device according to still another embodiment in which a one-way clutch and a rolling bearing are enlargedly illustrated.

The covering member 103 included in the sealing means 10 may be attached to the shaft portion 51 of the input rotating body 5 with a fixing screw 103b as illustrated in FIG. 17. In this case, the covering member 103 not only forms the sealing means 10 but also functions as a "shift preventing member" for preventing the shift along the axial direction between the input rotating body 5 and the output rotating body 6. Since such a shift preventing member 103 is provided, the input rotating body 5 and the output rotating body 6 can be prevented from separating from each other when, for example, the shaft coupling device 9 is mounted between the speed-up gear 3 and the power generator 4, or when the shaft coupling device 9 is craned in transporting it for shipping. Besides, if merely the function as the shift preventing member is necessary, the sealing member 104 can be omitted.

The present invention is not limited to the structure in which the output shaft 35 of the speed-up gear 3 and the drive shaft 41 of the power generator 4 are connected via the shaft coupling device 9, but may employ a structure in which the one-way clutch 7 is directly mounted between the output shaft 35 and the drive shaft 41.

Furthermore, the output shaft 35 of the embodiment of the present invention may embrace a portion of the shaft coupling device 9 connected to the output shaft 35, and similarly, the drive shaft 41 may embrace a portion of the shaft coupling device 9 connected to the drive shaft 41.

Now, a third embodiment of the present invention will be described with reference to the accompanying drawings. In the present embodiment, like reference numerals are used to refer to like or similar elements to those used in the first and second embodiments, so as to omit the detailed description.

Figure 19:
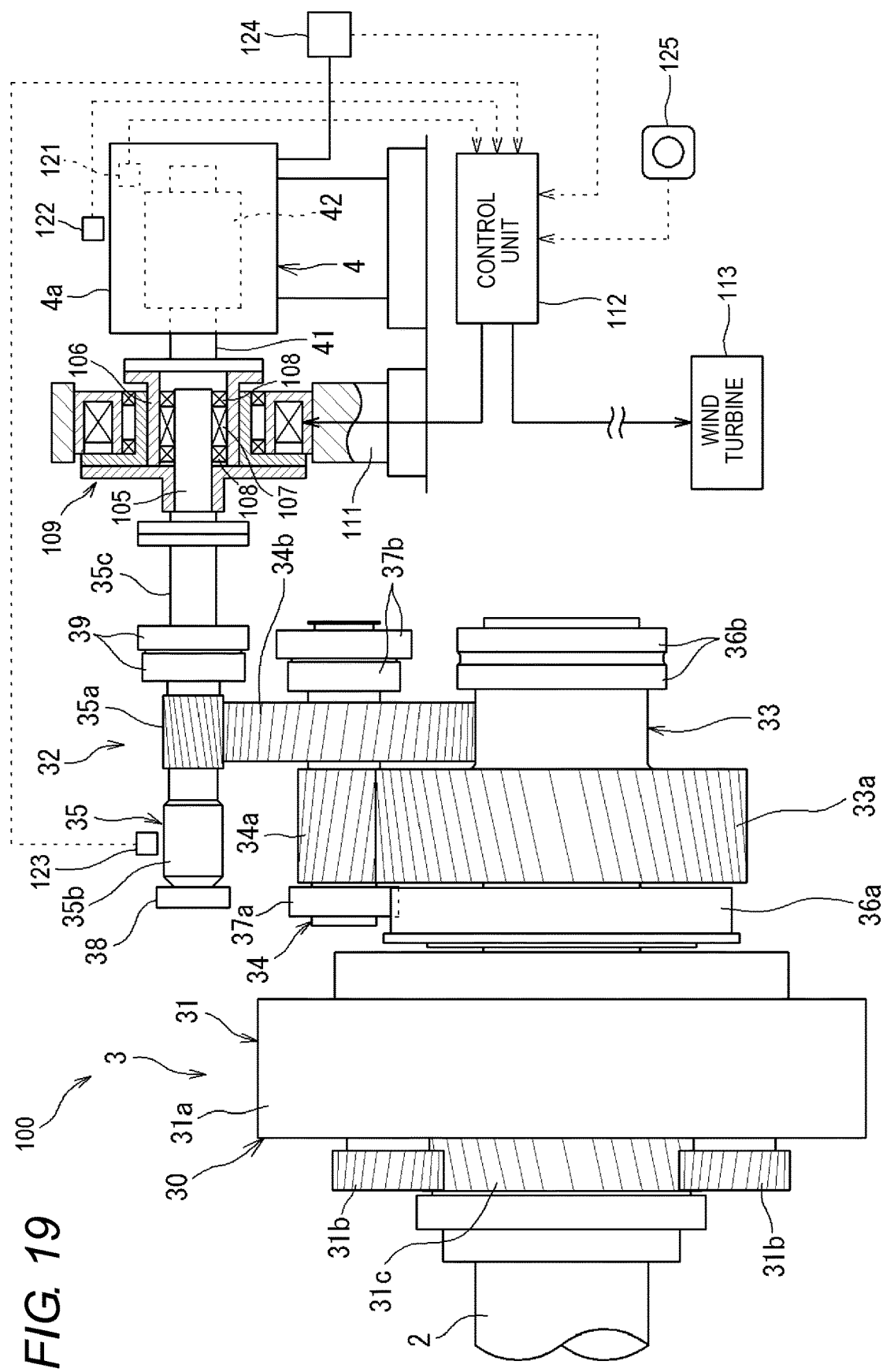
FIG. 19 is a schematic side view of a wind power generation device according to a third embodiment of the present invention.

FIG. 19 is a schematic side view of a wind power generation device according to the third embodiment of the present invention. This wind power generation device (power generation device) 100 includes a main shaft 2 rotated by receiving a wind force (an external force), a speed-up gear 3 connected to the main shaft 2, and a power generator 4 connected to the speed-up gear 3, and the power generator 4 is driven with the rotation of the main shaft 2 increased in speed by the speed-up gear 3.

At the tip of the main shaft 2, a wind turbine 113 having, for example, a blade (not shown) is integrally rotatably connected, and the wind turbine 113 rotates together with the main shaft 2 by receiving the wind force with the blade.

The power generator 4 includes a drive shaft 41 rotated by receiving the rotation increased in speed by the speed-up gear 3, a rotor 42 housed in a casing 4a of the power generator 4, and a stator and the like not shown. The rotor 42 is integrally rotatably connected to the drive shaft 41, and power is generated by rotating the rotor 42 together with the drive shaft 41.

In FIG. 19, the wind power generation device 100 further includes an input rotating body 105 integrally rotatably provided on an output shaft 35 of the speed-up gear 3, an output rotating body 106 integrally rotatably provided on the drive shaft 41 of the power generator 4, a one-way clutch 107 and an electromagnetic clutch (connecting means) 109 disposed between the input rotating body 105 and the output rotating body 106, and a pair of rolling bearings 108 disposed on both sides along the axial direction of the one-way clutch 107.

The one-way clutch 107 and the electromagnetic clutch 109 transmit the rotation of the output shaft 35 to the drive shaft 41 via the input rotating body 105 and the output rotating body 106. The electromagnetic clutch 109 is supported by a housing 111. Besides, the electromagnetic clutch 109 can be operated mainly when the power generator 4 is to be stopped without connecting the input rotating body 105 and the output rotating body 106 during a normal operation of the power generator 4. The electromagnetic clutch 109 will be described in detail later. The rolling bearings 108 are disposed on both sides along the axial direction of the one-way clutch 107, but the rolling bearing may be disposed on merely one side along the axial direction of the one-way clutch 107.

Figure 20:
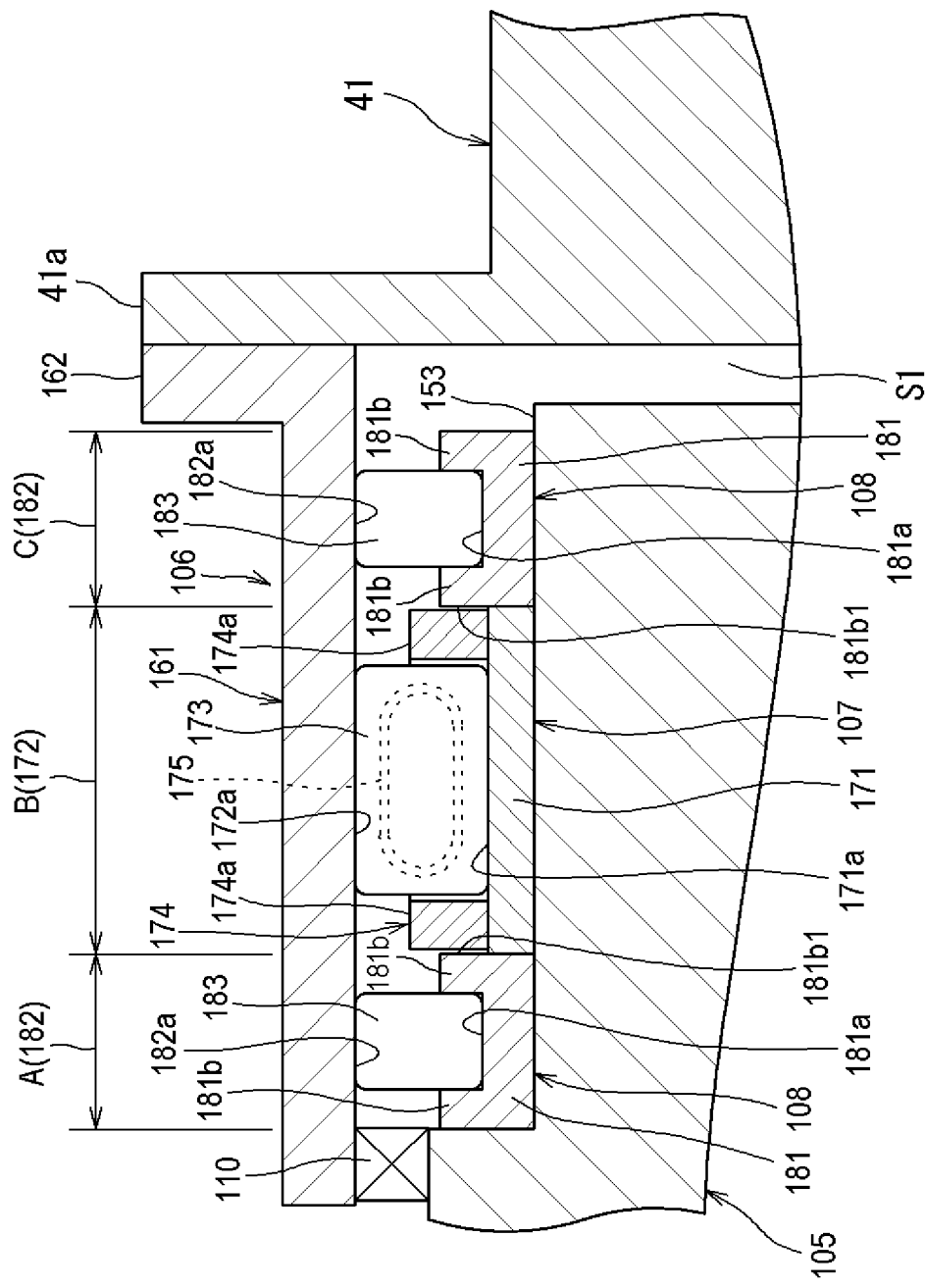
FIG. 20 is a cross-sectional view of a connecting portion between an output shaft of a speed-up gear and a drive shaft of a power generator in the wind power generation device in which structures of a one-way clutch and a rolling bearing are illustrated particularly in details.
Figure 22:
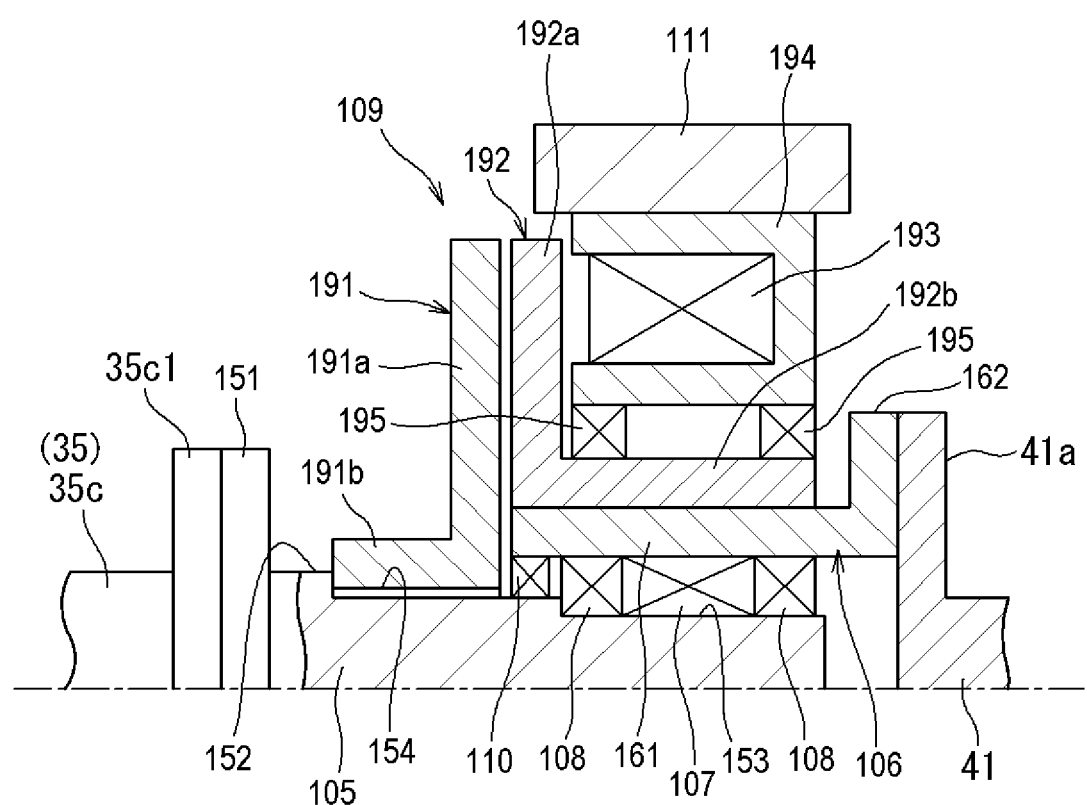
FIG. 22 is a cross-sectional view of the connecting portion between the output shaft of the speed-up gear and the drive shaft of the power generator in the wind power generation device in which structures of the one-way clutch, an electromagnetic clutch and the rolling bearing are illustrated particularly in details.

FIG. 20 is a cross-sectional view illustrating a connecting portion between the output shaft 35 of the speed-up gear 3 and the drive shaft 41 of the power generator 4, particularly illustrating the structures of the one-way clutch 107 and the rolling bearing 108 in detail. Accordingly, in this drawing, the electromagnetic clutch 109 is omitted. Besides, FIG. 22 is a schematic cross-sectional view of the connecting portion between the output shaft 35 and the drive shaft 41, particularly illustrating the structures of the one-way clutch 107, the rolling bearing 108 and the electromagnetic clutch 109. In FIGS. 20 and 22, the input rotating body 105 is disposed coaxially with the output shaft 35. Besides, the input rotating body 105 has a flange portion 151, a large diameter portion 152, a spline portion 154 and a small diameter portion 153 arranged in this order from a first end portion (a left end portion in FIG. 22) to a second end portion (a right end portion in FIG. 22) thereof along the axial direction.

The flange portion 151 is formed to extend radially outward beyond the outer circumferential surface of the large diameter portion 152, and is removably fixed on an output end portion 35c of the output shaft 35. Specifically, the flange portion 151 is in contact with a flange portion 35c1 formed on the output end portion 35c to be fastened and fixed on the flange portion 35c1 with a bolt and a nut not shown. As illustrated in FIG. 20, a space S1 is formed between an end surface of the small diameter portion 153 and an end surface of a flange portion 41a of the drive shaft 41.

The output rotating body 106 is coaxially disposed radially outside the input rotating body 105, and has a cylindrical portion 161 and a flange portion 162 formed on a second end portion (a right end portion in FIG. 20) along the axial direction of the cylindrical portion 161.

The flange portion 162 is formed to extend radially outward beyond the outer circumferential surface of the cylindrical portion 161, and is removably fixed in a first end portion of the drive shaft 41. Specifically, the flange portion 162 is in contact with the flange portion 41a formed in the first end portion of the drive shaft 41 to be fastened and fixed on the flange portion 41a with a bolt and a nut not shown.

The inner circumferential surface of the cylindrical portion 161 is formed as a cylindrical surface, and in a space between the inner circumferential surface of a first end (a left end in FIG. 20) along the axial direction of the cylindrical portion 161 and the outer circumferential surface of the input rotating body 105, a ring-shaped sealing member 110 for sealing a ring-shaped space formed between the cylindrical portion 161 and the input rotating body 105 is provided. With the output rotating body 106 separated from the drive shaft 41, the output rotating body 106 can be moved along the axial direction against the input rotating body 105.

Figure 21:
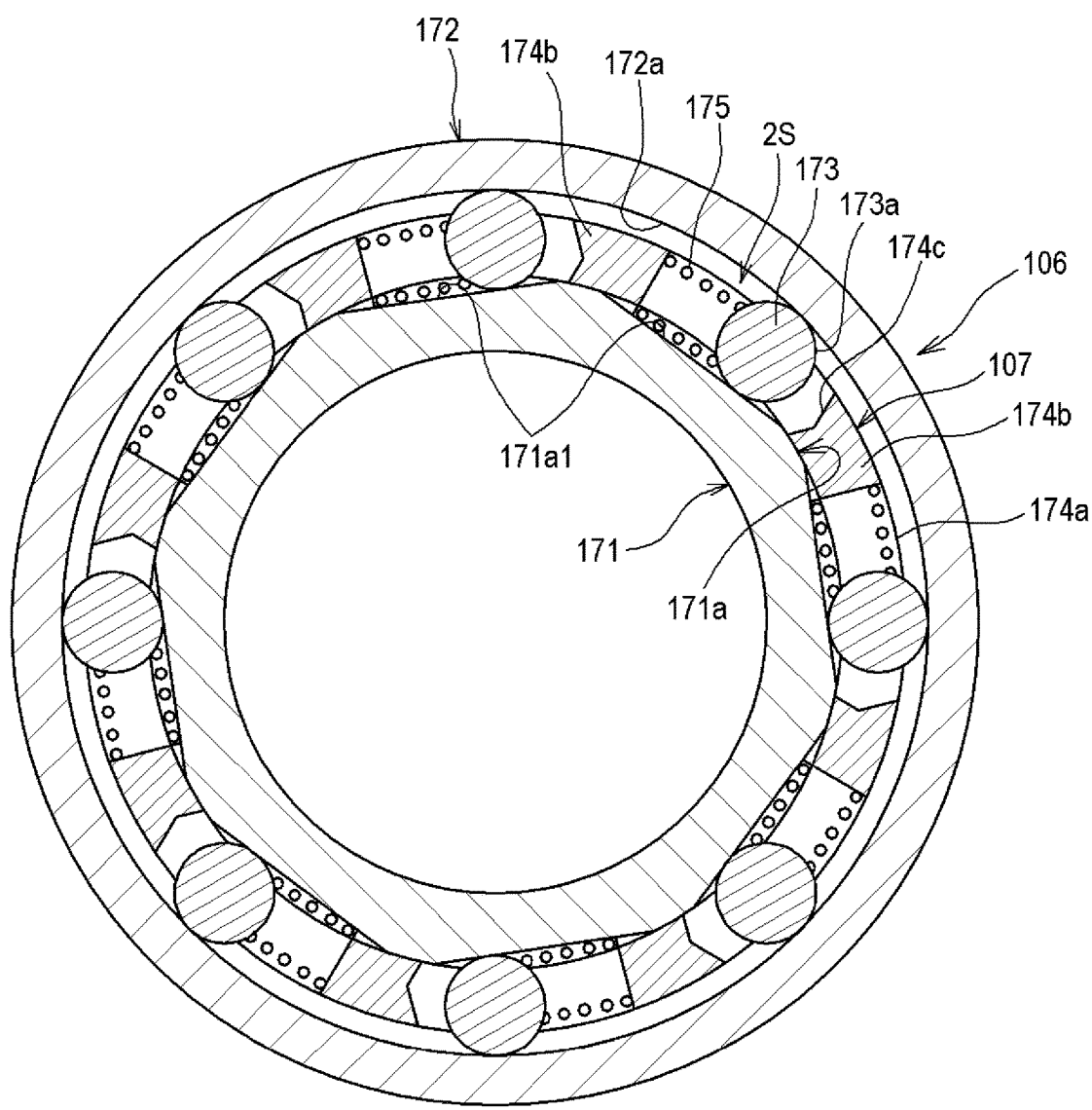
FIG. 21 is a cross-sectional view of the one-way clutch of the wind power generation device.

FIG. 21 is a cross-sectional view of the one-way clutch 107. In FIGS. 20 and 21, the one-way clutch 107 includes an inner ring 171, an outer ring 172, and a plurality of rollers 173 disposed between an outer circumferential surface 171a of the inner ring 171 and an inner circumferential surface 172a of the outer ring 172.

The inner ring 171 is fit and fixed on a center portion along the axial direction of the small diameter portion 153 of the input rotating body 105, so as to rotate integrally with the small diameter portion 153. A region B of a center portion along the axial direction of the cylindrical portion 161 of the output rotating body 106 corresponds to the outer ring 172 of the one-way clutch 107. Accordingly, the inner circumferential surface 172a is formed on the inner circumference of the region B of the cylindrical portion 161. Each roller 173 is in a cylindrical shape and is provided in number of eight arranged along the circumferential direction in this embodiment.

The one-way clutch 107 further includes a ring-shaped cage 174 for holding the respective rollers 173 at prescribed intervals along the circumferential direction, and a plurality of elastic members 175 elastically pressing the rollers 173 in one direction.

The cage 174 includes a pair of ring portions 174a opposing each other along the axial direction, and a plurality of pillar portions 174b extending along the axial direction between the ring portions 174a and arranged at equal intervals along the circumferential direction to connect the ring portions 174a. A plurality of pockets 174c are formed between the ring portions 174a and the pillar portions 174b adjacent to each other, and each of the rollers 173 is individually held in each pocket 174c.

The elastic member 175 is made of a compression coil spring, and is held in each of the pockets 174c of the cage 174 to be attached to the corresponding pillar portion 174b.

In FIG. 21, flat cam surfaces 171a1 in the same number as the rollers 173 (namely, eight) are formed on the outer circumferential surface 171a of the inner ring 171, and the inner circumferential surface 172a of the outer ring 172 is formed as a cylindrical surface. Between the cam surfaces 171a1 of the inner ring 171 and the cylindrical surface of the outer ring 172, a plurality of (eight) wedge-shaped spaces S2 are formed along the circumferential direction. The rollers 173 are individually disposed respectively in the wedge-shaped spaces S2, and each elastic member 175 presses the corresponding roller 173 toward a direction where the wedge-shaped space S2 becomes smaller. The outer circumferential surface of each roller 173 works as a contact surface 173a to be brought into contact with the cam surface 171a1 of the inner ring 171 and the cylindrical surface of the outer ring 172, and the contact surface 173a is formed to be straight (parallel to the center of the roller) in the width direction (the axial direction). Incidentally, the one-way clutch 107 is in an environment where a grease, that is, a lubricant difficult to be affected by temperature change, containing a base oil of an ester and a urea-based thickener is provided between the inner and outer rings 171 and 172.

In the one-way clutch 107 having the aforementioned structure, if the input rotating body 105 rotates at an increasing speed and as a result, the rotational speed of the input rotating body 105 exceeds the rotational speed of the output rotating body 106, the inner ring 171 is to rotate relatively against the outer ring 172 in a first direction (the counter-clockwise direction in FIG. 21). In this case, the roller 173 slightly moves, owing to the pressing force applied by the elastic member 175, in the direction where the wedge-shaped space 2S becomes smaller, the contact surface 173a of the roller 173 is pressed against the outer circumferential surface 171a of the inner ring 171 and the inner circumferential surface 172a of the outer ring 172, and hence, the one-way clutch 107 is placed in a state where the roller 173 is engaged with the inner and outer rings 171 and 172. As a result, the inner and outer rings 171 and 172 can integrally rotate in the first direction, and hence, the input rotating body 105 and the output rotating body 106 can be integrally rotatably connected to each other.

Besides, if the input rotating body 105 rotates at a constant speed after rotating at an increasing speed and as a result, the rotational speed of the input rotating body 105 becomes the same as the rotational speed of the output rotating body 106, the roller 173 is held in a state where it is engaged with the inner and outer rings 171 and 172. Therefore, the one-way clutch 107 retains the integral rotation in the above-described first direction of the inner and outer rings 171 and 172, and hence, the input rotating body 105 and the output rotating body 106 continues to integrally rotate.

On the other hand, if the input rotating body 105 rotates at a decreasing speed and as a result, the rotational speed of the input rotating body 105 becomes lower than the rotational speed of the output rotating body 106, the inner ring 171 is to rotate relatively against the outer ring 172 in a second direction (the clockwise direction of FIG. 21). In this case, the roller 173 slightly moves, against the pressing force applied by the elastic member 175, in a direction where the wedge-shaped space 2S becomes larger, and thus, the engagement between the roller 173 and the inner and outer rings 171 and 172 is released. Since the engagement of the roller 173 is thus released, the connection between the input rotating body 105 and the output rotating body 106 is broken.

In FIG. 20, the pair of rolling bearings 108 are disposed between the small diameter portion 153 of the input rotating body 105 and the cylindrical portion 161 of the output rotating body 106, so as to relatively rotatably support the input rotating body 105 and the output rotating body 106. Besides, the rolling bearings 108 are disposed respectively adjacent on both sides along the axial direction of the one-way clutch 107 so that their end portions along the axial direction can come into contact with the end surfaces along the axial direction of the cage 174 of the one-way clutch 107.

The rolling bearing 108 is formed by a cylindrical roller bearing including an inner ring 181, an outer ring 182, and a plurality of cylindrical rollers 183 disposed between the inner ring 181 and the outer ring 182 to be movable by rolling.

The inner ring 181 includes an inner ring raceway surface 181a formed on the outer circumference, and inner ring flange portions 181b protruding radially outward on both sides along the axial direction of the inner ring raceway surface 181a. Both the end surfaces of each cylindrical roller 183 are in sliding contact respectively with the inner side surfaces of the respective inner ring flange portions 181b. Besides, an outer side surface 181b1 of the inner ring flange portion 181b adjacent to the one-way clutch 107 is formed as a contact surface to be in contact with the outer side surface of the ring portion 174a corresponding to the end surface along the axial direction of the cage 174 of the one-way clutch 107.

A region A and a region C of both end portions along the axial direction of the cylindrical portion 161 of the output rotating body 106 correspond to the outer rings 182 of the rolling bearings 108, and outer ring raceway surfaces 182a of the outer rings 182 are respectively formed on the inner circumferential surfaces of the regions A and C. Between the outer ring raceway surface 182a and the inner ring raceway surface 181a, the cylindrical roller 183 is disposed to be movable by rolling.

In this wind power generation device 100, if the rotational speed of the input rotating body 105 becomes lower than the rotational speed of the output rotating body 106, the connection between the input rotating body 105 and the output rotating body 106 can be broken by the one-way clutch 107, which is disposed between the input rotating body 105 rotating integrally with the output shaft 35 of the speed-up gear 3 and the output rotating body 106 rotating integrally with the drive shaft 41 of the power generator 4. In other words, even if the rotational speed of the output shaft 35 is abruptly lowered via the main shaft 2 due to lowering of the wind force, the inertial rotation of the rotor 42 of the power generator 4 can be prevented from being transmitted to the output shaft 35 via the drive shaft 41. As a result, the reduction of a radial load applied to the roller bearing 38 supporting the output shaft 35 and the rotation delay of the cylindrical roller 38*c* accompanying the reduction can be suppressed. Accordingly, if the rotational speed of the main shaft 2 is abruptly increased from this state due to change of the wind force and hence a high load is applied to the cylindrical roller 38*c*, the cylindrical roller 38*c* is difficult to slide on the contact surface in contact with the inner ring 38*a*, and thus, the occurrence of the smearing in the roller bearing 38 can be effectively suppressed.

Furthermore, since the inertial rotation of the rotor 42 is prevented from being transmitted to the output shaft 35, loads applied to the roller bearings 36*a*, 36*b*, 37*a*, 37*b*, 38, 39 and the like of the speed-up gear 3 can be reduced. As a result, the sizes of all of the gears 31*b* and 31*c* of the planetary gear system 31, the shafts 33 to 35 of the high-speed stage gear system 32 and the roller bearings 36*a*, 36*b*, 37*a*, 37*b*, 38 and 39 can be reduced, and hence the speed-up gear 3 can be reduced in its weight and can be produced at low cost.

Besides, since the connection between the input rotating body 105 and the output rotating body 106 is broken, the rotor 42 of the power generator 4 continuously rotates due to inertia without abruptly lowering the rotational speed, and hence, the average rotational speed of the rotor 42 can be increased. As a result, the power generation efficiency of the power generator 4 can be improved.

In addition, since the rolling bearings 108 are disposed between the input rotating body 105 and the output rotating body 106 for relatively rotatably supporting these rotors, if a gap is formed between the roller 173 and the inner and outer rings 171 and 172 in the wedge-shaped space 2S because the engagement between the roller 173 and the inner and outer rings 171 and 172 is released in the one-way clutch 107, the rolling bearings 108 can prevent the input rotating body 105 and the output rotating body 106 from moving relatively along the radial direction. Accordingly, during the operation of the wind power generation device 100, the input rotating body 105 and the output rotating body 106 can be prevented from wobbling in the radial direction.

Besides, since the pair of rolling bearings 108 are disposed respectively adjacent on both sides along the axial direction of the one-way clutch 107 so that their end portions along the axial direction can come into contact with the end surfaces along the axial direction of the cage 174 of the one-way clutch 107, the movement of the cage 174 along the axial direction can be regulated by causing the end surfaces along the axial direction of the cage 174 to come into contact with the end portions along the axial direction of the rolling bearings 108.

Furthermore, since the end surface along the axial direction of the cage 174 of the one-way clutch 107 (the outer side surface of the ring portion 174*a*) is brought into contact with the inner ring flange portion 181*b* of the rolling bearing 108, the inner ring flange portion 181*b* of the rolling bearing 108 can be used also as a member for regulating the movement along the axial direction of the cage 174. Thus, the structure of the rolling bearing 108 can be simplified.

Besides, since the outer ring inner circumferential surface 172*a* of the one-way clutch 107 and the outer ring raceway surfaces 182*a* of the rolling bearings 108 are formed on the inner circumferential surface of the output rotating body 106, the output rotating body 106 can be used both as the outer ring 172 of the one-way clutch 107 and the outer ring 182 of each rolling bearing 108. Thus, the structure of the whole wind power generation device 100 can be simplified.

Moreover, the inner circumferential surface of the output rotating body 106 including the outer ring inner circumferential surface 172*a* and the outer ring raceway surface 182*a* is formed to have a prescribed inner diameter, and the output rotating body 106 is removably fixed on the drive shaft 41 of the power generator 4, and is disposed movably along the axial direction against the input rotating body 105. Therefore, the output rotating body 106 can be removed from the input rotating body 105 by removing the output rotating body 106 from the drive shaft 41 and moving it along the axial direction against the input rotating body 105. As a result, the outer ring 172 of the one-way clutch 107 and the outer rings 182 of the rolling bearings 108 can be simultaneously removed, and hence, a maintenance operation for the one-way clutch 107 and the rolling bearings 108 can be easily performed. At this point, there is no need to move the power generator 4, and hence the maintenance operation can be more easily performed.

Next, the structure and the control of the electromagnetic clutch 109 will be described in detail.

As illustrated in FIG. 22, the electromagnetic clutch 109 serves as connecting means for connecting (coupling) the input rotating body 105 connected to the output shaft 35 and the output rotating body 106 connected to the drive shaft 41 to each other in a connectable/disconnectable manner. This electromagnetic clutch 109 is what is called a friction type clutch, and includes a first clutch member 191 and a second clutch member 192 mutually frictionally connected, and a clutch coil 193. The first clutch member 191 includes a first disk portion 191*a* formed in a disk shape of a steel material, and a first cylindrical portion 191*b* provided radially inside the first disk portion 191*a*, and this first cylindrical portion 191*b* is spline fit in the spline portion 154 of the input rotating body 105, so that the first clutch member 191 can be attached to the input rotating body 105 so as to be integrally rotatable and movable along the axial direction.

The second clutch member 192 includes a second disk portion 192*a* formed in a disk shape, and a second cylindrical portion 192*b* provided radially inside the second disk portion 192*a*, and this second cylindrical portion 192*b* is integrally rotatably fit on the outer circumferential surface of the output rotating body 106.

The clutch coil 193 is held in a coil holder 194 and disposed behind the second disk portion 192*a*, namely, on the opposite side to the first clutch member 191, so as to generate a magnetic force when power is supplied from a control unit 112 (see FIG. 19). The coil holder 194 is supported on its outer circumferential side by the housing 111, and the second clutch member 192 is rotatably connected via a bearing 195 on the inner circumferential side. When a magnetic power is generated in the clutch coil 193, the first clutch member 191 and the second clutch member 192 move in directions where they come close to each other, and their disk portions 191*a* and 192*a* are pressed against each other to be frictionally connected to each other. In this manner, the input rotating body 105 and the output rotating body 106 are connected to each other, so that the rotation of the output shaft 35 can be transmitted to the drive shaft 41.

The electromagnetic clutch 109 is controlled by the control unit 112 so that the output shaft 35 and the drive shaft 41 can be connected to each other when a prescribed condition is satisfied. Specifically, in the present embodiment, a prescribed condition is set as a condition for stopping the power generator 4. It is determined, by the control unit 112 on the basis of a detection result of detection means for detecting various states of the wind power generation device 100, whether or not the condition for stopping the power generator 4 is satisfied.

As illustrated in FIG. 19, a temperature sensor 121, that is, one of the detection means, is provided inside the casing 4a of the power generator 4. This temperature sensor 121 always detects the temperature within the casing 4a, and inputs a detection signal to the control unit 112.

Besides, a vibration sensor 122, that is, one of the detection means, is provided within or in the vicinity of the casing 4a of the power generator 4. This vibration sensor 122 always detects the vibration of the casing 4a, and inputs a detection signal to the control unit 112.

A power generation measuring device 124 for measuring the amount of generated power is connected to the power generator 4. On the other hand, a speed sensor 123 for detecting the rotational speed of the output shaft 35 is provided on the output shaft 35. The power generation measurement device 124 and the speed sensor 123 are also one of the detection means, and an amount of generated power measured by the power generation measuring device 124 and a detection value of the speed sensor 123 are respectively input to the control unit 112.

Besides, in the wind power generation device 100 of the present embodiment, separately from the detection means described above, accepting means 125 for accepting an input of an instruction to stop the power generator 4 is provided. The accepting means 125 of the present embodiment is provided as a stop switch for stopping the power generator 4, and when this stop switch 125 is operated, a signal corresponding to the operation is input to the control unit 112.

The control unit 112 controls the operation of the electromagnetic clutch 109 on the basis of signals from the respective sensors 121 to 123 and the measuring device 124 (hereinafter designated as the "sensors") or a signal from the stop switch 125. Specifically, when it is determined, on the basis of a detection signal of the sensors, that the power generator 4 has a problem, the control unit 112 controls the electromagnetic clutch 109 to connect the output shaft 35 and the drive shaft 41 to each other. Besides, in order to stop the power generator 4, the control unit 112 also performs control to stop the rotation of the wind turbine 113 to stop the external force supply to the main shaft 2. For example, the control unit 112 can stop the rotation of the wind turbine 113 by controlling a pitch angle of the blade of the wind turbine 113 to place it in a feathering state.

If the temperature within the casing 4a of the power generator 4 is abnormally increased, it can be regarded that a problem such as a seizure has occurred in the casing 4a. Therefore, the control unit 112 determines whether or not a detection signal from the temperature sensor 121 exceeds a prescribed threshold value (such as a temperature at which a seizure or the like is liable to occur), and performs the control to stop the wind turbine 113 as well as controls the electromagnetic clutch 109 to connect the output shaft 35 and the drive shaft 41 to each other. When the wind turbine 113 is stopped, the external force supply to the main shaft 2 is also stopped, and hence, the output shaft 35 of the speed-up gear 3 stops after abrupt rotational speed lowering. Therefore, the rotational speed of the output shaft 35 becomes lower than the rotational speed of the drive shaft 41 of the power generator 4, and hence the connection between the output shaft 35 and the drive shaft 41 via the one-way clutch 107 is broken. At this point, if the electromagnetic clutch 109 is not operated, even when the output shaft 35 is stopped, the drive shaft 41 does not stop but continuously rotates due to the inertial force of the rotor 42, and hence the power generator 4 cannot be rapidly stopped. In the present embodiment, however, the electromagnetic clutch 109 is operated to connect the output shaft 35 and the drive shaft 41 to each other, and therefore, not only the output shaft 35 but also the drive shaft 41 can be stopped with the rotational speed abruptly lowered. At this point, the speed-up gear 3 works as a brake for the power generator 4, and thus, the power generator 4 can be rapidly stopped.

Similarly, if the vibration of the power generator 4 is abnormally increased, it can be regarded that a problem such as a damage has occurred in a shaft or a bearing used in the power generator 4. Therefore, the control unit 112 determines whether or not a detection signal from the vibration sensor 122 exceeds a prescribed threshold value, and if it does, performs the control to stop the wind turbine 113 as well as controls the electromagnetic clutch 109 to connect the output shaft 35 and the drive shaft 41 to each other.

Besides, also in the case where the amount of power generated by the power generator 4 is small in terms of the rotational speed of the output shaft 35, it can be regarded that any problem has occurred in the power generator 4. Therefore, the control unit 112 estimates a suitable amount of power generation on the basis of a detection signal from the speed sensor 123, and compares the estimated amount with an output signal from the power generation measuring device 124. Then, it is determined whether or not a difference therebetween exceeds a prescribed threshold value, and if it does, the control unit 112 performs the control to stop the wind turbine 113 as well as controls the electromagnetic clutch 109 to connect the output shaft 35 and the drive shaft 41 to each other.

Through the aforementioned control, the power generator 4 can be automatically and rapidly stopped when the condition for stopping the power generator 4 is satisfied. Therefore, the power generator 4 can be prevented from continuously working with a problem not settled.

Besides, in the present embodiment, the power generator 4 can be rapidly stopped by operating the stop switch 125. Accordingly, when an operation such as maintenance of the power generator 4 is to be performed, the power generator 4 can be rapidly stopped for performing the operation.

The present invention is not limited to the aforementioned embodiment but can be practiced with appropriate modification.

For example, as the connecting means for connecting the output shaft of the speed-up gear and the drive shaft of the power generator to each other, means different from the electromagnetic clutch can be used. When the electromagnetic clutch is used as the connecting means, however, the connection of the output shaft and the drive shaft and the release thereof can be rapidly and accurately switched. Besides, the connecting means may be any means as long as it can integrally rotatably connect the output shaft and the drive shaft to each other at least in a second state where the rotational speed of the output shaft is lower than the rotational speed of the drive shaft.

Instead of the speed sensor for detecting the rotational speed of the output shaft, a speed sensor for detecting the rotational speed of the drive shaft or the main shaft may be provided. Besides, as the detection means, at least some of the aforementioned sensors may be provided, or another detection means may be provided.

Although the input rotating body and the output rotating body are provided respectively as separate members from the output shaft and the drive shaft in the present embodiment, these rotors may be formed integrally respectively with the output shaft and the drive shaft.

Besides, although the output rotating body is disposed radially outside the input rotating body, it may be disposed radially inside the input rotating body. In this case, the one-way clutch may have the outer ring inner circumferential surface formed as the cam surface and the inner ring outer circumferential surface formed as the cylindrical surface. Furthermore, in this case, the inner ring outer circumferential surface may be formed on the outer circumferential surface of the output rotating body, so as to use the output rotating body also as the inner ring.

In other words, in the power generation device of the present invention, either of the structure in which the input rotating body is provided inside (on the side of the inner ring) with the output rotating body provided outside (on the side of the outer ring) as in the aforementioned embodiment and the structure in which the input rotating body is provided outside (on the side of the outer ring) with the output rotating body provided inside (on the side of the inner ring) may be employed.

Furthermore, although the output rotating body is used as the outer ring of the one-way clutch and the outer rings of the rolling bearings, these outer rings may be provided as members separate from the output rotating body.

Besides, each rolling bearing disposed between the input rotating body and the output rotating body is a cylindrical roller bearing for moving the output rotating body in the axial direction, but if the output rotating body is not moved in the axial direction, a ball bearing may be used.

Moreover, although the cage of the one-way clutch is in contact with the inner ring of the rolling bearing, the outer ring of the rolling bearing may be provided as a member separate from the output rotating body, so that the cage of the one-way clutch may be in contact with this outer ring.

Furthermore, although the power generation device of the present embodiment is described exemplarily on the assumption that the wind force is used as the external force, it can be applied to a power generation device for generating power by using another external force such as a water force or a heat force.

The detection means may be a sensor (such as a state monitoring sensor like a temperature sensor, a vibration sensor or the like) provided in the vicinity of the one-way clutch or the rolling bearings, for example, on a housing disposed radially outside the output rotating body or the input rotating body for housing the one-way clutch or the rolling bearings. It is determined whether or not an abnormality possibly causing a failure or the like has occurred by inputting a detection value of the state monitoring sensor to the control unit for comparing the detection value with a prescribed threshold value, and if it is determined that the abnormality has occurred, the control for stopping the power generator is executed. Besides, the detection means may be a state monitoring sensor provided on a bearing or a gear used within the speed-up gear, the blade of the wind turbine, a bearing supporting the main shaft, or the like.

Regarding the first aspect of the present invention, the inventors of the present application made earnest studies on the occurrence mechanism of the smearing. As a result, the following was found, based on which the present invention was accomplished: When the rotational speed of the main shaft is abruptly lowered due to the lowering of the wind force, what is called a leak of torque (a leak of load) is caused because the rotational speed of the drive shaft of the power generator exceeds the rotational speed of the output shaft owing to the inertia of the rotor of the power generator having a large weight. This leak of torque reduces the radial load applied to the rolling bearing supporting the output shaft, and hence the sliding frictional resistance and the like between the rolling element of the rolling bearing and the cage holding the rolling element becomes larger than the rolling frictional resistance between the rolling element and the turning wheel, and as a result, the rotation of the rolling element is delayed. When the rotational speed of the main shaft is abruptly increased from this state due to the increase of the wind force, an inertia torque of the speed increase is applied to increase the radial load applied to the rolling bearing supporting the output shaft. Therefore, the rolling element slides on the contact surface in contact with the turning wheel with the high load applied to the rolling element at this point, which increases the temperature of the contact surface, and this is the cause of the smearing.

Specifically, the first aspect of the present invention provides a wind power generation device including: a wind receiving member which receives a wind force to rotate a main shaft; a speed-up gear which includes a rotation transmission mechanism which receives rotation of the main shaft to increase the rotation in speed, and a rolling bearing which rotatably supports an output shaft which outputs a running torque of the rotation transmission mechanism; a power generator which includes an input shaft which rotates by receiving rotation of the output shaft, and which generates power in accordance with rotation of a rotor which rotates integrally with the input shaft; an input rotating body which is integrally rotatably provided on the output shaft; an output rotating body which is integrally rotatably provided on the input shaft and which is coaxially disposed radially inside or radially outside the input rotating body; and a one-way clutch which is disposed between the input rotating body and the output rotating body, which integrally rotatably connects the input rotating body and the output rotating body to each other in a state in which a rotational speed of the input rotating body exceeds a rotational speed of the output rotating body, and which breaks connection between the input rotating body and the output rotating body in a state in which the rotational speed of the input rotating body is lower than the rotational speed of the output rotating body, wherein the input rotating body and the output rotating body are allowed to relatively move along an axial direction, and a maximum allowance of movement thereof is set to be larger than variation of a distance along the axial direction between the input shaft and the output shaft caused by state change.

In the wind power generation device having the aforementioned structure, when the rotational speed of the input rotating body exceeds the rotational speed of the output rotating body, the input rotating body and the output rotating body can be integrally rotatably connected to each other by the one-way clutch, and when the rotational speed of the input rotating body is lower than the rotational speed of the output rotating body, the connection between the input rotating body and the output rotating body can be broken. In other words, even when the rotational speed of the output shaft is abruptly lowered via the main shaft due to the lowering of the wind force, the inertial rotation of the rotor of the power generator can be prevented from being transmitted via the input shaft to the output shaft. Therefore, the decrease of the radial load applied to the rolling bearing supporting the output shaft and the delay of the rotation of the rolling element accompanying the decrease can be suppressed. Accordingly, if the rotational speed of the main shaft is abruptly increased from this state due to change of the wind force and hence a high load is applied to the rolling element of the rolling bearing, the rolling element is difficult to slide on the contact surface in contact with the turning wheel, and thus, the occurrence of the smearing in the rolling bearing can be effectively suppressed.

Besides, the input rotating body and the output rotating body are allowed to relatively move along the axial direction, and the maximum allowance of their movement is set to be larger than the variation of the distance along the axial direction between the input shaft and the output shaft caused by state change. Therefore, even if the input shaft and the output shaft expand or contract due to change of the environmental temperature of the wind power generation device or change of the temperature within the nacelle, the input rotating body and the output rotating body relatively move in accordance with the expansion or contraction, so that occurrence of a load along the axial direction to any of the input shaft, the output shaft and members supporting these shafts can be suppressed.

Preferably, the one-way clutch includes: an inner ring outer circumferential surface provided on a side of one rotating body out of the input rotating body and the output rotating body; an outer ring inner circumferential surface provided on a side of the other rotating body and disposed radially outside the inner ring outer circumferential surface; and a plurality of engaging elements disposed along a circumferential direction at intervals in a space formed between the inner ring outer circumferential surface and the outer ring inner circumferential surface, the input rotating body and the output rotating body are integrally rotatably connected to each other when the engaging elements engaged with the inner ring outer circumferential surface and the outer ring inner circumferential surface, and the connection is broken when the engagement therebetween is released, and a cylindrical roller bearing which relatively rotatably supports the input rotating body and the output rotating body is provided between the input rotating body and the output rotating body.

In this case, when the engagement between the engaging elements of the one-way clutch and the inner ring outer circumferential surface and the outer ring inner circumferential surface is released, the relative movement along the radial direction of the input rotating body and the output rotating body against each other due to a gap caused therebetween can be prevented by a second rolling bearing. Accordingly, during the operation of the wind power generation device, the input rotating body and the output rotating body can be prevented from wobbling along the radial direction.

Preferably, the inner ring outer circumferential surface and the outer ring inner circumferential surface are formed as cylindrical surfaces, and the engaging elements are formed by sprags.

If a sprag is used as each engaging element, both the inner ring outer circumferential surface and the outer ring inner circumferential surface can be formed as cylindrical surfaces, and hence, the inner ring outer circumferential surface and the outer ring inner circumferential surface can be easily formed. Besides, the torque capacity can be more easily increased by increasing the rigidity in using the sprag than in using a roller as the engaging element, and therefore, the dimensions along the radial direction and the axial direction of the sprag can be reduced. As a result, the dimension of the other rotating body having the outer ring circumferential surface can be reduced, so that the one-way clutch 7 can be made compact.

Furthermore, if the engaging element is formed by a sprag, the inner ring outer circumferential surface is preferably formed by an outer circumferential surface of one rotating body disposed radially inside, out of the input rotating body and the output rotating body. When this structure is employed, there is no need to provide an inner ring or the like having an inner ring outer circumferential surface separately from the one rotating body, and hence, the one-way clutch can be made more compact along the radial direction.

However, each of the engaging elements may be formed by a cylindrical roller disposed in each of a plurality of wedge-shaped spaces formed between the inner ring outer circumferential surface and the outer ring inner circumferential surface.

Preferably, an inner circumferential surface of one rotating body disposed radially outside, out of the input rotating body and the output rotating body, is formed as a cylindrical surface, and configures the outer ring inner circumferential surface and an outer ring raceway surface.

When this structure is employed, since the inner circumferential surface of the one rotating body configures the outer ring inner circumferential surface and the outer ring raceway surface, this one rotating body can be used both as an outer ring having the outer ring inner circumferential surface and an outer ring having the outer ring raceway surface, and hence, the structures of the one-way clutch and the second rolling bearing can be simplified. Besides, when the inner circumferential surface of one of the rotating body is formed as a cylindrical surface having a prescribed inner diameter, the rotating body can be moved along the axial direction against the engaging element and the roller. Accordingly, the relative positions along the axial direction of the input rotating body and the output rotating body can be adjusted in accordance with the distance along the axial direction between the output shaft and the input shaft, and the like.

Preferably, the input rotating body and the output rotating body form a shaft coupling device which integrally rotatably connects the output shaft and the input shaft to each other, and the one-way clutch is incorporated in the shaft coupling device.

When this structure is employed, even if a space between the output shaft and the input shaft is small, the one-way clutch can be suitably provided by utilizing the shaft coupling device connecting the output shaft and the input shaft to each other.

Next, regarding the second and third aspects of the present invention, if a one-way clutch includes a rotating body provided on a side of an output shaft of a speed-up gear or on a side of an input shaft of a power generator, a ring fit on the rotating body, and an engaging element to be engaged with the ring, in order to perform power transmission from the rotating body to the ring by using a frictional force working therebetween, it is necessary to connect them by the interference fit. In this case, if the power transmission therebetween is performed merely by using the frictional force obtained by the interference fit when a load for operating the power generator is maximum, it is necessary to set an interference between a rotational shaft and the ring extremely large, which excessively increases internal stress caused in the ring, and as a result, the lifetime of the ring, and the lifetime of the one-way clutch in the end is reduced.

Incidentally, a rotating body provided on a side of an output shaft of a speed-up gear or on a side of an input shaft of a power generator in a wind power generation device has a very large size, it is difficult to directly machine the rotating body for obtaining a one-way clutch. Therefore, a ring separately processed is mounted to the rotating body in general, and therefore, it is extremely significant to solve the aforementioned problem.

The second and third aspects of the present invention were accomplished in consideration of, for example, such an actual situation, and an object is to provide a wind power generation device in which the lifetime of a one-way clutch provided between an output shaft of a speed-up gear and an input shaft (a drive shaft) of a power generator can be increased.

The second aspect of the present invention provides a wind power generation device including: a speed-up gear which increases a speed of rotation of a main shaft caused by a wind force to output the rotation increased in speed from an output shaft; a power generator which includes an input shaft which rotates by receiving the rotation of the output shaft, and which generates power in accordance with rotation of a rotor which rotates integrally with the input shaft; and a one-way clutch which is provided between the output shaft and the input shaft, which integrally rotatably connects the output shaft and the input shaft to each other in a state in which a rotational speed of the output shaft exceeds a rotational speed of the input shaft, and which breaks connection between the output shaft and the input shaft in a state in which the rotational speed of the output shaft is lower than the rotational speed of the input shaft, wherein the one-way clutch includes: a ring which is fit on a rotating body which rotates with the output shaft; another circumferential surface which is disposed to oppose outside or inside of a circumferential surface of the ring in a radial direction and which is provided on a side of the input shaft; and a plurality of engaging elements disposed in a space between the circumferential surfaces, wherein the output shaft and the input shaft are integrally rotatably connected to each other by causing the engaging elements to engage the circumferential surfaces, and the connection is broken by releasing the engagement therebetween, wherein a maximum transmission torque T1 max to be transmitted from the rotating body to the ring when a load torque for operating the power generator is maximum and a transmission torque T2 which can be transmitted from the rotating body to the ring with a tightening force obtained by fitting the ring on the rotating body satisfy a relationship of T1max>T2, and wherein a necessary minimum transmission torque T1 to be transmitted from the rotating body to the ring for operating the power generator, a transmission torque T3 which can be transmitted from the rotating body to the ring with a tightening force obtained by engagement of the engaging elements with the circumferential surfaces, and the transmission torque T2 satisfy a relationship of T1<T2+T3.

Besides, the third aspect of the present invention provides a wind power generation device including: a speed-up gear which increases a speed of rotation of a main shaft caused by a wind force to output the rotation increased in speed from an output shaft; a power generator which includes an input shaft which rotates by receiving the rotation of the output shaft, and which generates power in accordance with rotation of a rotor which rotates integrally with the input shaft; and a one-way clutch which is provided between the output shaft and the input shaft, which integrally rotatably connects the output shaft and the input shaft to each other in a state in which a rotational speed of the output shaft exceeds a rotational speed of the input shaft, and which breaks connection between the output shaft and the input shaft in a state in which the rotational speed of the output shaft is lower than the rotational speed of the input shaft, wherein the one-way clutch includes: a ring which is fit on a rotating body which rotates with the input shaft; another circumferential surface disposed to oppose outside or inside a circumferential surface of the ring in a radial direction and which is provided on a side of the output shaft; and a plurality of engaging elements disposed in a space between the circumferential surfaces, wherein the output shaft and the input shaft are integrally rotatably connected to each other by causing the engaging elements to engage the circumferential surfaces, and the connection is broken by releasing the engagement therebetween, wherein a maximum transmission torque T1max to be transmitted from the rotating body to the ring when a load torque for operating the power generator is maximum and a transmission torque T2 which can be transmitted from the rotating body to the ring with a tightening force obtained by fitting the ring on the rotating body satisfy a relationship of T1max>T2, and wherein a necessary minimum transmission torque T1 to be transmitted from the rotating body to the ring for operating the power generator, a transmission torque T3 which can be transmitted from the rotating body to the ring with a tightening force obtained by engagement of the engaging elements with the circumferential surfaces, and the transmission torque T2 satisfy a relationship of T1<T2+T3.

When these structures are employed, in consideration of not only the tightening force caused by the fitting between the rotating body and the ring (the initial tightening force) but also the tightening force caused by the engagement between the ring and the engaging elements (the additional tightening force), the transmission torque between the rotating body and the ring is set to satisfy the necessary minimum transmission torque for operating the power generator. Therefore, there is no need to excessively increase the initial tightening force, and stress caused in the ring can be reduced as much as possible. Accordingly, the lifetime of the ring, and the lifetime of the one-way clutch in the end can be increased.

Incidentally, an interference between the rotating body and the ring is preferably equal to or larger than 10 μm. Thus, the transmission torque between the ring and the rotating body can be sufficiently secured at an initial stage of the engagement between the engaging elements and the ring.

Besides, the engaging elements are preferably provided in number of four to eight arranged along a circumferential direction.

If the number of engaging elements exceeds eight, a force applied from the engaging elements to the circumferential surface of the ring is dispersed, and hence the tightening force obtained by the engagement therebetween is reduced, and as a result, the transmission torque T3 is difficult to sufficiently secure. If the number of engaging elements is smaller than four, the transmission torque T3 becomes too large on the contrary, and there is a possibility that a burden to the ring may be increased.

The one-way clutch is preferably incorporated in a shaft coupling device which integrally rotatably connects the output shaft and the input shaft to each other.

When this structure is employed, even if a space along the axial direction cannot be secured between the output shaft of the speed-up gear and the input shaft of the power generator, the one-way clutch can be provided by utilizing the shaft coupling device for connecting the shafts to each other.

According to the second or third aspect of the present invention, the lifetime of the one-way clutch provided, for example, between the output shaft of the speed-up gear and the input shaft of the power generator can be increased.

Next, regarding the fourth aspect of the present invention, a wind power generation device is generally installed in an environment where a strong wind force can be obtained and little influence of noise or the like is given, such as on the coast or offshore. On the coast or the like, however, the wind power generation device is exposed to an air flow containing a large amount of a salt content, and hence, it is necessary to take measures against a salt damage. In particular, in a case where a one-way clutch is provided between a speed-up gear and a power generator, if metal corrosion or the like is caused by the salt damage, transmission/non-transmission (connection/disconnection) of the power between an output shaft and a drive shaft cannot be properly performed, which harmfully affects power generation efficiency and the like.

An object of the fourth aspect of the present invention is to provide a wind power generation device in which the function of a one-way clutch connecting an output shaft of a speed-up gear and an input shaft (a drive shaft) of a power generator to each other cannot be impaired by influence of an ambient environment.

The fourth aspect of the present invention provides a wind power generation device including: a main shaft which rotates by a wind force; a speed-up gear which increases a speed of rotation of the main shaft and which outputs the rotation increased in speed from an output shaft; a power generator which includes an input shaft rotated by receiving the rotation of the output shaft and which generates power in accordance with rotation of a rotor which rotates integrally with the input shaft; a casing which houses the speed-up gear and the power generator; an input rotating body which is integrally rotatably provided on the output shaft; an output rotating body which is integrally rotatably provided on the input shaft and which is disposed coaxially radially inside or radially outside the input rotating body; a one-way clutch which is disposed between the input rotating body and the output rotating body, which integrally rotatably connects the input rotating body and the output rotating body to each other in a state in which a rotational speed of the input rotating body exceeds a rotational speed of the output rotating body, and which breaks connection between the input rotating body and the output rotating body in a state in which the rotational speed of the input rotating body is lower than the rotational speed of the output rotating body; and shielding means which shields a region where the one-way clutch is disposed from a space within the casing.

In the wind power generation device according to the fourth aspect of the present invention, the one-way clutch is provided between the output shaft of the speed-up gear and the input shaft of the power generator, and the shielding means for sealing the region where this one-way clutch is disposed from its surrounding space, that is, the space within the casing, is provided. Therefore, the shielding means inhibits a foreign matter, an air flow or the like from entering the region where the one-way clutch is disposed, and hence the one-way clutch is difficult to be affected by a salt damage or the like, and as a result, the function of the one-way clutch, such as the transmission/non-transmission of the power between the output shaft and the input shaft, can be suitably retained. Incidentally, the region where the one-way clutch is disposed refers to a portion where the one-way clutch is disposed within a range where the input rotating body and the output rotating body oppose each other along the radial direction.

Preferably, the shielding means includes a covering member covering the input rotating body and the output rotating body from outside along the radial direction, and the covering member is relatively unrotatably connected to one of the input rotating body and the output rotating body and relatively rotatably connected to the other.

When this structure is employed, even if the connection between the output shaft and the input shaft is broken by the one-way clutch and these shafts are relatively rotated against each other, the covering member can follow the rotation.

The covering member is preferably expandable/contractible along the axial direction. When this structure is employed, the covering member can be caused to follow variation of a distance along the axial direction of the output shaft and the input shaft, or the like.

Preferably, the input rotating body and the output rotating body are included in a shaft coupling device that integrally rotatably connects the output shaft and the input shaft to each other, and the one-way clutch is incorporated in the shaft coupling device.

When the one-way clutch is incorporated in the shaft coupling device connecting the output shaft and the input shaft to each other, even if the distance along the axial direction between these shafts is too small to secure a space where the one-way clutch is singly disposed, the one-way clutch can be provided between these shafts together with the shaft coupling device.

In the wind power generation device according to the fourth aspect of the present invention, the one-way clutch provided, for example, between the output shaft of the speed-up gear and the input shaft of the power generator is difficult to be affected by a salt damage or the like, and the function of the one-way clutch can be suitably retained.

Next, regarding the fifth aspect of the present invention, if it is desired to stop a power generator because of a failure or an accident of the power generator, or because of maintenance or the like, a wind turbine is generally stopped by changing the direction (the pitch angle) of a blade of the wind turbine to place it in a state where a wind force is not applied. If the one-way clutch is provided between the output shaft of the speed-up gear and the drive shaft of the power generator as described above, however, even though the output shaft of the speed-up gear is stopped by stopping the wind turbine, the drive shaft of the power generator continuously rotates due to inertia of the rotor, and hence, the power generator cannot be rapidly stopped.

Accordingly, an object of the fifth aspect of the present invention is, in consideration of the aforementioned circumstances, to provide a power generation device in which a power generator can be rapidly stopped by stopping supply of an external force even if a one-way clutch is provided between an output shaft of a reduction gear and a drive shaft of the power generator.

The fifth aspect of the present invention provides a power generation device including: a main shaft which rotates by an external force; a speed-up gear which increases a speed of rotation received from the main shaft and which outputs the rotation increased in speed from an output shaft; a power generator which includes a drive shaft which rotates by receiving the rotation of the output shaft and a rotor which rotates integrally with the drive shaft, and which generates power in accordance with the rotation of the rotor; a one-way clutch which is provided between the output shaft and the drive shaft, which integrally rotatably connects the output shaft and the drive shaft to each other in a first state in which a rotational speed of the output shaft exceeds a rotational speed of the drive shaft, and which breaks connection between the output shaft and the drive shaft in a second state in which the rotational speed of the output shaft is lower than the rotational speed of the drive shaft; connecting means which is provided between the output shaft and the drive shaft and which is capable of integrally rotatably connecting the output shaft and the drive shaft to each other at least in the second state; and a control unit which controls an operation of the connecting means to connect the output shaft and the drive shaft to each other in accordance with a prescribed condition.

In the power generation device according to the fifth aspect of the present invention, the one-way clutch is provided between the output shaft of the speed-up gear and the drive shaft of the power generator, and in the state where the rotation of the output shaft exceeds the rotational speed of the drive shaft (in the first state), the rotation of the output shaft can be suitably transmitted to the drive shaft, so as to operate the power generator. On the contrary, in the state where the rotation of the output shaft is lower than the rotational speed of the drive shaft (in the second state), the rotation of the output shaft is not transmitted to the drive shaft so as to prevent the rotational speed of the drive shaft from being lowered, and the rotor of the power generator can be rotated by inertia. Therefore, the lowering of an average rotational speed of the power generator and the lowering of power generation efficiency can be suppressed.

On the other hand, when the supply of the external force (such as a rotational force from a wind turbine) is stopped for stopping the power generator, the rotation of the output shaft of the speed-up gear is abruptly lowered in speed to stop, and hence the second state is attained and the one-way clutch breaks the connection between the output shaft and the drive shaft. Accordingly, if it is left in this state, the drive shaft continuously rotates due to the inertia of the rotor, and the power generator cannot be rapidly stopped. In the power generation device of the present invention, however, in addition to the one-way clutch, the connecting means capable of integrally rotatably connecting the output shaft and the drive shaft to each other at least in the second state is provided, and this connecting means is controlled by the control unit to connect the output shaft and the drive shaft to each other in accordance with the prescribed condition. Therefore, if it is desired to stop the power generator, the output shaft and the drive shaft are connected to each other by the connecting means to cause the speed-up gear to work as a brake, and thus, the rotation of the drive shaft can be abruptly lowered in speed so as to rapidly stop the power generator.

Preferably, the speed-up gear includes: a rotation transmission mechanism for increasing the speed of the rotation of the main shaft; the output shaft for outputting the rotation increased in speed by the rotation transmission mechanism; and a roller bearing rotatably supporting the output shaft, an input rotating body is integrally rotatably provided on the output shaft, an output rotating body disposed coaxially radially inside or radially outside the input rotating body is integrally rotatably provided on the drive shaft, and the one-way clutch is disposed between the input rotating body and the output rotating body.

Figure 23:
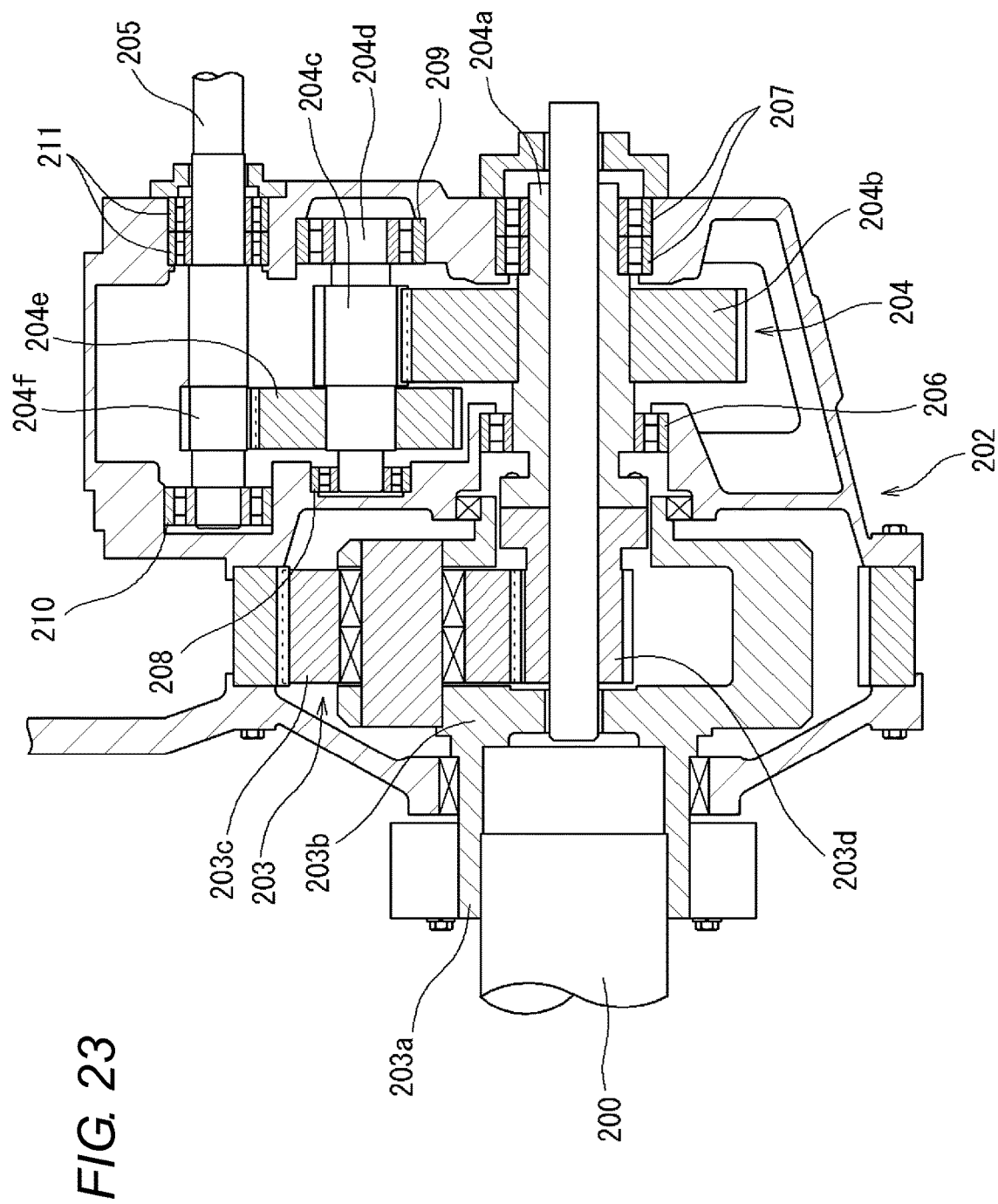
FIG. 23 is a cross-sectional view illustrating a speed-up gear according to the background art.

Since the conventional technique described above (FIG. 23, Patent Document 1) has the problem in which the lifetime is reduced because of the smearing occurring in the roller bearing, the inventors of the present application made earnest studies on the occurrence mechanism of the smearing. As a result, the following was found: When the rotational speed of the main shaft is abruptly lowered due to the lowering of the wind force, what is called a leak of torque (a leak of load) is caused because the rotational speed of the drive shaft of the power generator exceeds the rotational speed of the output shaft owing to the inertia of the rotor of the power generator having a large weight. This leak of torque reduces the radial load applied to the rolling bearing supporting the output shaft, and hence the sliding frictional resistance and the like between the roller of the roller bearing and the cage holding the rotor becomes larger than the rolling frictional resistance between the roller and the turning wheel, and as a result, the rotation of the roller is delayed. When the rotational speed of the main shaft is abruptly increased from this state due to the increase of the wind force, an inertia torque of the speed increase is applied to increase the radial load applied to the roller bearing supporting the output shaft. Therefore, the roller slides on the contact surface in contact with the turning wheel with the high load applied to the roller at this point, which increases the temperature of the contact surface, and this is the cause of the smearing.

In the fifth aspect of the present invention, owing to the one-way clutch, if the rotational speed of the input rotating body exceeds the rotational speed of the output rotating body, the input rotating body and the output rotating body can be integrally rotatably connected to each other, and if the rotational speed of the input rotating body is lower than the rotational speed of the output rotating body, the connection between the input rotating body and the output rotating body can be broken. In other words, even when the rotational speed of the output shaft is abruptly lowered via the main shaft due to the lowering of the external force, the inertial rotation of the rotor of the power generator can be prevented from being transmitted via the drive shaft to the output shaft. Therefore, the decrease of the radial load applied to the roller bearing supporting the output shaft and the delay of the rotation of the roller accompanying the decrease can be suppressed. Accordingly, if the rotational speed of the main shaft is abruptly increased from this state due to change of the external force and hence a high load is applied to the roller, the roller is difficult to slide on the contact surface in contact with the turning wheel, and thus, the occurrence of the smearing in the roller bearing can be effectively suppressed.

The prescribed condition is preferably a condition for stopping the power generator.

If the output shaft and the drive shaft are connected to each other when the condition for stopping the power generator is satisfied, the power generator can be rapidly stopped.

Besides, the power generation device according to the fifth aspect of the present invention preferably includes detection means for detecting a state of the power generation device, and the control unit preferably controls the connecting means on the basis of a detection result obtained by the detection means.

If the power generator has a problem of a failure or an accident, various states of the power generation device are changed. Therefore, the problem of the power generator can be discovered at an early stage by detecting the states of the power generation device by the detection means, and the power generator can be rapidly and automatically stopped.

The detection means may include a temperature sensor for detecting a temperature of the power generator.

If the temperature of the power generator is abnormally increased, it can be regarded that there is a possibility of a problem such as a seizure having occurred in the power generator. Therefore, if the temperature sensor is provided as the detection means, this problem can be discovered at an early stage, and the power generator can be rapidly stopped.

The detection means may include a vibration sensor for detecting vibration of the power generator.

If the vibration of the power generator is abnormally increased, it can be regarded that there is a possibility of a problem such as a damage having occurred in a shaft or a bearing included therein. Therefore, if the vibration sensor is provided as the detection means, this problem can be discovered at an early stage, and the power generator can be rapidly stopped.

The detection means may include a speed sensor for detecting the rotational speed of the output shaft, the drive shaft or the main shaft, and a power generation measuring device for detecting an amount of power generated by the power generator.

Since there is a correlation between the rotational speed of the output shaft, the drive shaft or the main shaft and the amount of power generated by the power generator, for example, if the amount of generated power is small although the rotational speed of the shaft is large, it can be regarded that there is a possibility of any problem having occurred in the power generator. Therefore, if the speed sensor and the power generation measuring device are provided as the detection means, this problem can be discovered at an early stage, and the power generator can be rapidly stopped.

The power generation device according to the fifth aspect of the present invention may include accepting means for accepting an input of a factitious stop instruction for the power generator, and the control unit may control the connecting means on the basis of whether or not the accepting means has accepted the stop instruction.

When this structure is employed, if, for example, it is desired to factitiously stop the power generator for maintenance or the like, the power generator can be rapidly stopped by inputting a stop instruction to the accepting means.

In the aforementioned structure, the one-way clutch and the connecting means are preferably disposed coaxially with the output shaft and the drive shaft.

When this structure is employed, the one-way clutch and the connecting means can be disposed compactly.

Besides, the connecting means is preferably an electromagnetic clutch.

When this structure is employed, the connection/disconnection between the output shaft and the drive shaft can be rapidly and accurately performed.

In the power generation device according to the fifth aspect of the present invention, the power generator can be rapidly stopped by stopping the supply of the external force even if the one-way clutch is provided between the output shaft of the reduction gear and the drive shaft of the power generator.

The present application is based upon the Japanese patent application (Japanese Patent Application No. 2013-048593) filed on Mar. 12, 2013, the Japanese patent application (Japanese Patent Application No. 2013-048618) filed on Mar. 12, 2013, the Japanese patent application (Japanese Patent Application No. 2013-048628) filed on Mar. 12, 2013, and the Japanese patent application (Japanese Patent Application No. 2013-048642) filed on Mar. 12, 2013, the entire contents of which are incorporated herein by reference.

DESCRIPTION OF REFERENCE SIGNS

1: wind power generation device, 2: main shaft, 3: speed-up gear, 4: power generator, 5, 105: input rotating body (inside rotating body), 6, 106: output rotating body (outside rotating body), 7, 107: one-way clutch, 8, 108: rolling bearing (cylindrical roller bearing), 9, 109: shaft coupling device, 11: blade (wind receiving member), 30: gear mechanism (rotation transmission mechanism), 35: output shaft, 38: roller bearing, 41: drive shaft, 42: rotor, 71: inner ring (ring), 71a: outer circumferential surface (inner ring outer circumferential surface), 72a: inner circumferential surface (outer ring inner circumferential surface), 73: engaging element (roller, sprag), 74: cage, 81b: inner ring flange portion, 82a: outer ring raceway surface, 83: cylindrical roller, 92: covering member (shielding means), S: wedge-shaped space, 112: control unit, 121: temperature sensor, 122: vibration sensor, 123: speed sensor, 124: power generation measuring device, 125: stop switch (accepting means)

The invention claimed is:

1. A wind power generation device comprising:
a wind receiving member which receives a wind force to rotate a main shaft;
a speed-up gear which comprises a rotation transmission mechanism which receives rotation of the main shaft to increase the rotation in speed, and a rolling bearing which rotatably supports an output shaft which outputs a running torque of the rotation transmission mechanism;
a power generator which comprises an input shaft which rotates by receiving rotation of the output shaft, and which generates power in accordance with rotation of a rotor which rotates integrally with the input shaft;
an input rotating body which is integrally rotatably provided on the output shaft;
an output rotating body which is integrally rotatably provided on the input shaft and which is coaxially disposed radially inside or radially outside the input rotating body; and
a one-way clutch which is disposed between the input rotating body and the output rotating body, which integrally rotatably connects the input rotating body and the output rotating body to each other in a state in which a rotational speed of the input rotating body exceeds a rotational speed of the output rotating body, and which breaks connection between the input rotating body and the output rotating body in a state in which the rotational speed of the input rotating body is lower than the rotational speed of the output rotating body,
wherein the input rotating body and the output rotating body are allowed to relatively move along an axial direction, and a maximum allowance of movement thereof is set to be larger than variation of a distance along the axial direction between the input shaft and the output shaft caused by state change.

2. The wind power generation device according to claim 1,
wherein the one-way clutch comprises
an inner ring outer circumferential surface provided on a side of one rotating body out of the input rotating body and the output rotating body;
an outer ring inner circumferential surface provided on a side of the other rotating body and disposed radially outside the inner ring outer circumferential surface; and
a plurality of engaging elements disposed along a circumferential direction at intervals in a space formed between the inner ring outer circumferential surface and the outer ring inner circumferential surface,
wherein the input rotating body and the output rotating body are integrally rotatably connected to each other when the engaging elements engaged with the inner ring outer circumferential surface and the outer ring inner circumferential surface, and the connection is broken when the engagement therebetween is released, and wherein a cylindrical roller bearing which relatively rotatably supports the input rotating body and the output rotating body is provided between the input rotating body and the output rotating body.

3. The wind power generation device according to claim 2, wherein the inner ring outer circumferential surface and the outer ring inner circumferential surface are formed as cylindrical surfaces, and the engaging elements are formed by sprags.

4. The wind power generation device according to claim 3, wherein the inner ring outer circumferential surface is formed by an outer circumferential surface of one rotating body disposed radially inside, out of the input rotating body and the output rotating body.

5. The wind power generation device according to claim 2, wherein a plurality of wedge-shaped spaces are formed between the inner ring outer circumferential surface and the outer ring inner circumferential surface, and each of the engaging elements is formed by a cylindrical roller disposed in each of the wedge-shaped spaces.

6. The wind power generation device according to claim 2, wherein an inner circumferential surface of one rotating body disposed radially outside, out of the input rotating body and the output rotating body, is formed as a cylindrical surface, and configures the outer ring inner circumferential surface and an outer ring raceway surface.

7. The wind power generation device according to claim 1, wherein the input rotating body and the output rotating body form a shaft coupling device which integrally rotatably connects the output shaft and the input shaft to each other, and the one-way clutch is incorporated in the shaft coupling device.

* * * * *